(12) United States Patent
Martinez

(10) Patent No.: US 10,106,980 B2
(45) Date of Patent: Oct. 23, 2018

(54) BLOCK INTERLOCKING MODULE AND SYSTEM TO BUILD ARCHITECTURAL STRUCTURES

(71) Applicant: Lazaro A. Martinez, Lakeland, FL (US)

(72) Inventor: Lazaro A. Martinez, Lakeland, FL (US)

(*) Notice: Subject to any disclaimer, the term of this patent is extended or adjusted under 35 U.S.C. 154(b) by 0 days.

(21) Appl. No.: 15/130,972

(22) Filed: Apr. 16, 2016

(65) Prior Publication Data

US 2018/0044914 A1    Feb. 15, 2018

(51) Int. Cl.
| | | |
|---|---|---|
| *E04B 2/18* | (2006.01) | |
| *E04B 2/08* | (2006.01) | |
| *E04C 1/39* | (2006.01) | |
| *F16B 2/06* | (2006.01) | |
| *E04B 2/02* | (2006.01) | |

(52) U.S. Cl.
CPC ............ *E04B 2/18* (2013.01); *E04B 2/08* (2013.01); *E04C 1/39* (2013.01); *F16B 2/06* (2013.01); *E04B 2002/0208* (2013.01); *E04B 2002/0217* (2013.01); *E04B 2002/0226* (2013.01); *E04B 2002/0263* (2013.01); *E04B 2103/04* (2013.01)

(58) Field of Classification Search
CPC ...... E04B 2/08; E04B 2/32; E04B 2002/0252; E04B 2/18; E04B 2103/04; E04B 2002/0263; E04B 2002/0226; E04B 2002/0208; E04B 2002/0217; E04B 1/40; E04C 1/39
See application file for complete search history.

(56) References Cited

U.S. PATENT DOCUMENTS

| | | | | |
|---|---|---|---|---|
| 868,838 | A * | 10/1907 | Brewington | E04B 2/18 |
| | | | | 52/590.1 |
| 2,077,750 | A * | 4/1937 | Fish | E04H 7/28 |
| | | | | 52/592.1 |
| 2,619,829 | A * | 12/1952 | Tatum | E04B 2/14 |
| | | | | 446/127 |

(Continued)

FOREIGN PATENT DOCUMENTS

| | | | |
|---|---|---|---|
| KR | 101308201 B1 * | 9/2013 | |
| WO | WO 0177456 A1 * | 10/2001 | E04B 2/18 |

*Primary Examiner* — Rodney Mintz
(74) *Attorney, Agent, or Firm* — Jacqueline Tadros, Esq.; Jacqueline Tadros, P.A.

(57) ABSTRACT

An interlocking module including a panel and one or more trapezoidal elongations extending from any of the first end face, the second end face, the first side face, the second end face, the upper face or the lower face of the panel, wherein the one or more trapezoidal elongations each include a dovetail joint. The interlocking module further including one or more members, wherein each of the one or more members emanates from each of the one or more trapezoidal elongations, and wherein each of the one or more members emanates in a perpendicular direction relative to each of the upper and the lower faces of the panel. The upper face includes a plurality of apertures, wherein each of the plurality of apertures is configured for receiving a pin from a member of a second module for interlocking the second module and a first module. The panel and the one or more members of the interlocking module define a void space for receiving a standard sized building block within the void space.

25 Claims, 34 Drawing Sheets

(56) References Cited

U.S. PATENT DOCUMENTS

| | | | | |
|---|---|---|---|---|
| 3,299,599 A * | 1/1967 | Zachar | E04B 2/20 | 52/592.4 |
| 3,305,982 A * | 2/1967 | Steele | E04B 2/18 | 446/106 |
| 3,479,782 A * | 11/1969 | Muse | E04B 2/26 | 52/438 |
| 3,906,665 A * | 9/1975 | Medlin | A01G 9/027 | 47/86 |
| 3,936,987 A * | 2/1976 | Calvin | E04B 2/08 | 52/309.1 |
| 4,091,587 A * | 5/1978 | Depka | E04B 2/24 | 52/421 |
| 4,124,961 A * | 11/1978 | Habegger | E04B 2/06 | 52/592.6 |
| 4,136,498 A * | 1/1979 | Kanigan | E04B 2/08 | 52/438 |
| 4,426,815 A * | 1/1984 | Brown | A63H 33/088 | 52/100 |
| 4,551,110 A * | 11/1985 | Selvage | A63H 33/10 | 24/DIG. 53 |
| 4,922,678 A * | 5/1990 | Scheiwiller | E01F 8/0082 | 52/570 |
| 5,471,808 A * | 12/1995 | De Pieri | E04B 2/18 | 446/128 |
| 5,715,635 A * | 2/1998 | Sherwood | E04B 2/16 | 52/286 |
| 5,771,654 A * | 6/1998 | Moore | E04B 2/54 | 52/437 |
| 5,887,331 A * | 3/1999 | Little | E04B 1/003 | 29/509 |
| 6,050,044 A * | 4/2000 | McIntosh | A63H 33/082 | 446/124 |
| 6,105,330 A * | 8/2000 | Nanayakkara | E04B 2/14 | 52/590.2 |
| 6,550,208 B2 * | 4/2003 | Nanayakkara | E04B 2/14 | 52/223.7 |
| 6,578,338 B1 * | 6/2003 | Nanayakkara | E04B 2/14 | 52/603 |
| 6,889,479 B2 * | 5/2005 | Thorpe | E04B 2/18 | 52/596 |
| 7,344,334 B2 * | 3/2008 | Thorkelson | E01C 5/18 | 404/28 |
| 7,429,144 B1 * | 9/2008 | Lai | E01C 9/004 | 404/34 |
| 7,704,011 B2 * | 4/2010 | Marshall | E01C 3/006 | 404/29 |
| 8,790,037 B2 * | 7/2014 | Culleton | E01C 5/22 | 404/29 |
| 9,309,667 B2 * | 4/2016 | Thompson | E04B 2/08 | |
| 2002/0046529 A1 * | 4/2002 | Nanayakkara | E04B 2/14 | 52/606 |
| 2003/0070383 A1 * | 4/2003 | Heinle | E04B 2/08 | 52/582.1 |
| 2003/0188505 A1 * | 10/2003 | Marshall | E01C 3/006 | 52/606 |
| 2007/0006542 A1 * | 1/2007 | Duke | E04B 2/06 | 52/561 |
| 2007/0186499 A1 * | 8/2007 | Marshall | E01C 3/006 | 52/295 |
| 2007/0269265 A1 * | 11/2007 | Thorkelson | E01C 5/18 | 404/34 |
| 2012/0163911 A1 * | 6/2012 | Culleton | E01C 5/22 | 404/41 |
| 2013/0213846 A1 * | 8/2013 | Hendrickson | B65D 21/0216 | 206/509 |
| 2013/0333313 A1 * | 12/2013 | Alsayed | E04B 2/54 | 52/220.1 |
| 2014/0106108 A1 * | 4/2014 | Lin | A63H 33/082 | 428/58 |
| 2016/0194868 A1 * | 7/2016 | DeBoer | E04B 2/32 | 52/604 |

* cited by examiner

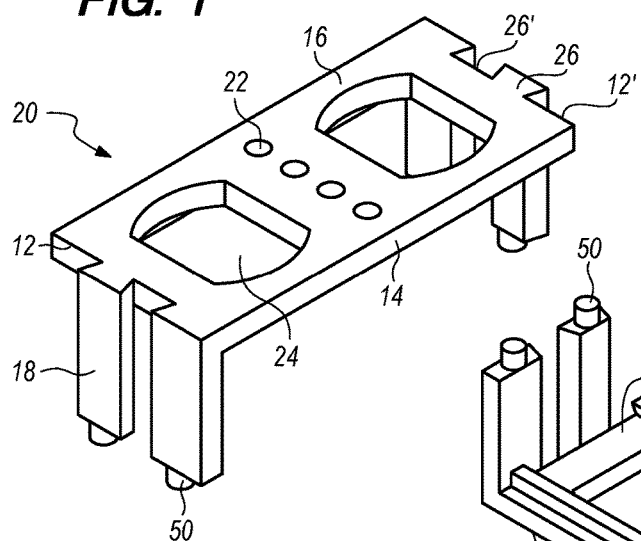
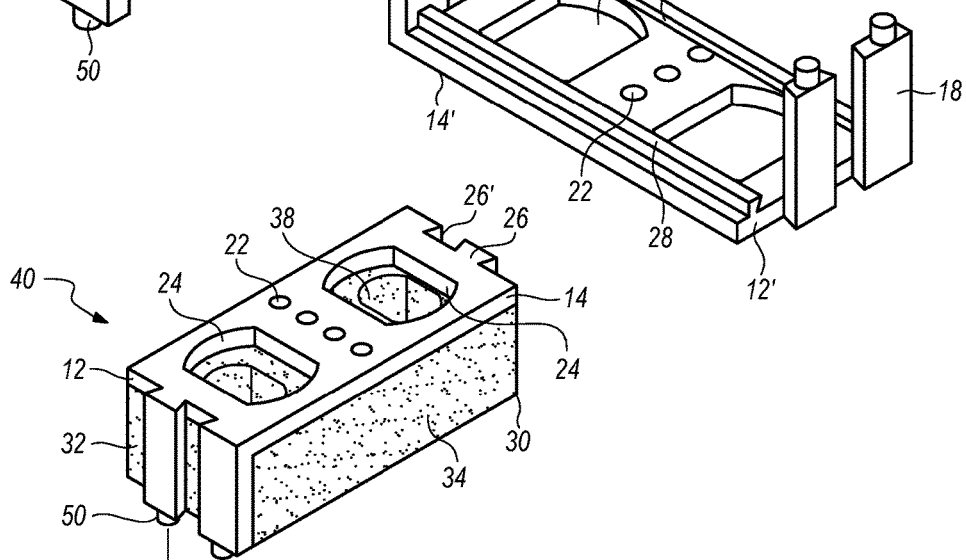
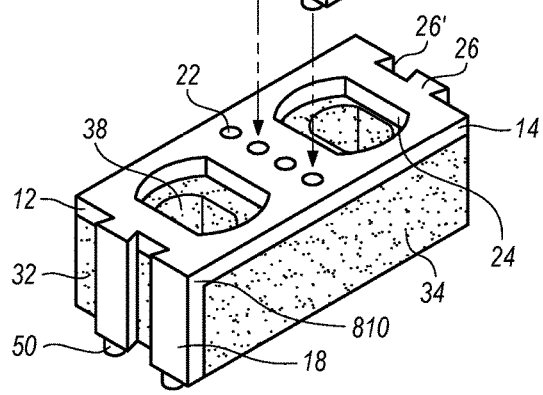

US 10,106,980 B2

BLOCK INTERLOCKING MODULE AND SYSTEM TO BUILD ARCHITECTURAL STRUCTURES

BACKGROUND OF THE INVENTION

1. Field of the Invention

The present invention pertains to masonry construction. More specifically, the present invention pertains to an improved system to build structures like the walls and columns of a single family residential home or other residential or commercial buildings as well as fences, circular and semi-circular and other architectural structures. The present invention also pertains to building block units, installation of building block units and/or methods of manufacturing and utilizing such. In particular, the present invention pertains to a unique building block unit or modular building unit in which a standard brick or other type of building block is placed in a mold and a block interlocking module (BIM) that utilizes trapezoidal joints is applied to three of the faces of the brick or other type of building block and allowed to set as an additional manufacturing step to form a single building block unit.

DESCRIPTION OF THE PRIOR ART

Masonry construction, is one of the traditional methods of building, that has been utilized for many centuries. Masonry, simply stated, is the assembly of building block units, such as bricks, stone, concrete, marble, granite, travertine, glass block, cob, and the like, by laying such units adjacent to each other in a composite wall, column or other structure. These units are typically joined by some type or mortar that is wet and mixed and applied to the surface of one building unit or block adjacent thereto. The mortar set up, cementing the building units together as it hardens. Such masonry construction has distinctive architectural characteristics, which has been desired throughout the ages, and is still the type of construction preferred by many today.

Because of its strength, relative uniformity, appearance and other characteristics, the brick, and especially the fired clay brick, has been one of the most used and desired building units for masonry construction. The typical brick is in the shape of a rectangular box. When building a wall with bricks, layers of bricks are laid in stepped or staggered relationships so that an overlying brick straddles the joint of a pair of underlying bricks. While the typical rectangular box-like brick is most common, a number of brick and other building block shapes have been developed over the years to obtain enhanced appearances, more uniform construction, or other characteristics sought for masonry construction. Examples of such specially designed bricks or building blocks may be seen in U.S. Pat. Nos. 3,299,599; 3,479,782; 3,936,987; 4,091,587; 4,124,961 and 5,715,635. In fact, there are countless shapes and designs in bricks and other building blocks.

The typical kiln fired bricks utilized in masonry construction are made of clay or shale. The bricks are typically molded, dried and burned in kilns. There are several methods of molding bricks and other building blocks. There are several qualities of bricks and other building blocks, quality being determined by strength, durability, and the like. One of the major problems associated with masonry construction is the non-uniformity of building block dimensions due to shrinkage, warping, twisting, and the like. Because of these characteristics, mortar is necessary not only to bond the bricks or other building blocks together, but to smooth out the irregularities of the bricks or other building blocks.

Another major problem associated with masonry construction is the mortar utilized to bond the bricks or other building blocks together. In many respects, mortar is the weak link in masonry construction. Mortar normally has less compressive and tensile strength than the building blocks it joins. The shear strength of masonry is a function of the bond strength of mortar to the associated brick or other building block and frictional resistance at the building block-mortar interface. The water tightness of masonry construction is primarily dictated by the characteristics of the mortar. Mortar is more water permeable than brick and most other building block materials. Thus, much depends on the quality of mortar used. Mortar is typically mixed at the job site and can easily be incorrectly mixed or used beyond its useful mix life. Thus, even though masonry construction has been utilized for centuries, there are still some inherent problems pertaining to the lack of uniformity of quality and dimensions in the brick or other building blocks and to the weaknesses associated with the mortar used therewith. Accordingly, the search continues for improved masonry construction.

The prior art is generally directed to building units that have blocks in a flush relation to each other and do not include a separate block interlocking module extending about the periphery of a block for separating adjacent blocks from each other. U.S. Pat. No. 2,077,750 dated Apr. 20, 1937 shows a mounting border along opposed sides of a building block but not a block interlocking module. U.S. Pat. No. 4,426,815 dated Jan. 24, 1984 likewise does not show a separate block interlocking module secured about the periphery of a block and adjacent blocks are in flush relation to each other, not separated by a block interlocking module or the like.

SUMMARY OF THE INVENTION

Masonry building blocks such as bricks, have non-uniform dimensions resulting from shrinkage, warping, etc., and it is, necessary in preformed masonry building units including such blocks to have precise predetermined dimensions so that a uniform wall or the like is constructed. The method of this invention includes a process for securing the block interlocking modules (BIM's) to the blocks so that precise dimensions are obtained from the predetermined length between the parallel surfaces of the block interlocking module on the end faces of the block and the predetermined height of the polymer layer on the upper face of the block. The term "parallel planar surfaces" for the block interlocking module or BIM is interpreted herein as the planar surfaces parallel to the associated faces of the block.

Thus, the primary object of the present invention is to provide a dimensionally accurate building block unit with predetermined dimensions established within specified tolerances based on historically successful building blocks, such as brick. The building blocks, in combination with new materials with predictable performance properties and advanced technology, result in a building block unit from which the resulting construction will be stronger, more watertight and more dimensionally accurate than the prior art. Many other objects and advantages of the invention will be apparent from reading the description which follows in conjunction with the accompanying drawings.

Another object of the present invention is to provide an improved system to build structures like the walls and columns of a single family residential home or other residential and commercial buildings as well as fences, circular and semi-circular structures and other architectural structures.

Another object of the present invention is to provide a unique dimensionally accurate building block unit and method of manufacturing such.

The terms "building block unit" or "modular building unit" as used herein refer to a brick or other building block in combination with a separate block interlocking module (BIM) preferably formed of polymer which together form a manufactured building block unit (or a BIM-Ready manufactured building block unit) for delivery to a building site. Throughout this application, the terms "block interlocking module" and "BIM" are used interchangeably.

These and other aspects and advantages of the present disclosure will become apparent from the following detailed description of preferred embodiments of the invention considered in conjunction with the accompanying drawings, in which like drawings represent like components. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE DRAWINGS

FIG. 1 illustrates a perspective view of a block interlocking module (BIM).

FIG. 2 illustrates a bottom perspective view of the block interlocking module (BIM) of FIG. 1.

FIG. 3 illustrates a perspective view of two of the legs of the block interlocking module BIM-ready brick of a top layer about to interlock with two of the circular perforations in a layer below.

DETAILED DESCRIPTION OF THE INVENTION

Figure 60:
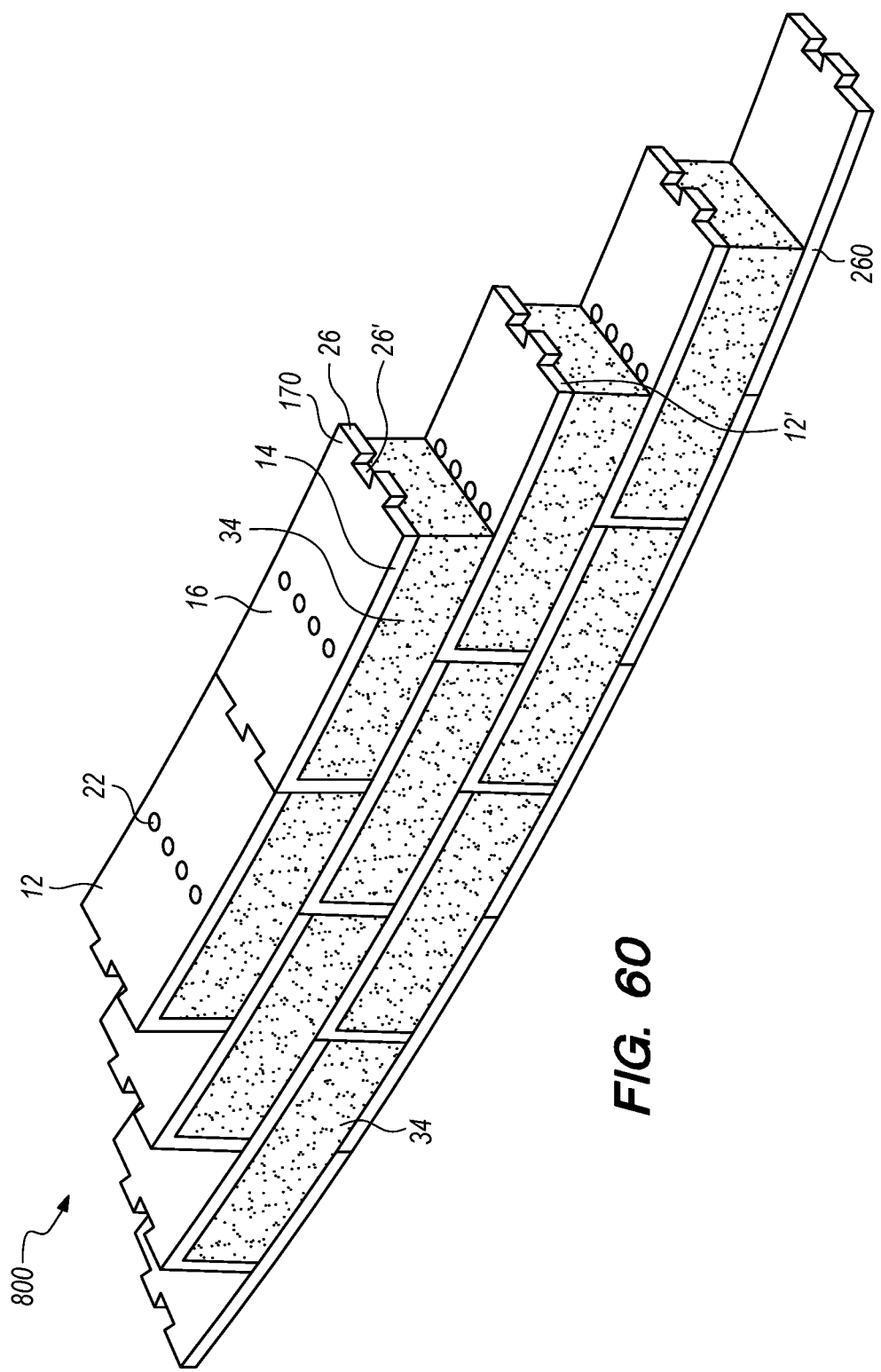
FIG. 60 illustrates a perspective view of a Single Wythe arc shaped wall.

Referring now to FIGS. 1-60, a layout block interlocking module (Layout BIM) 10, including two end faces 12, 12', two side faces 14, 14' and an upper face 16 and a lower face 16'. A block interlocking module (BIM) 20 comprises or consists of the Layout BIM 10, further including one or more legs 18, wherein the legs 18 are generally perpendicular relative to the upper face 16 and the lower face 16'.

In an embodiment, the upper and lower faces 16, 16' of the Layout BIM 10 extend over a face of a block 30. The block 30 has two end faces 32, 32', two side faces 34, 34', an upper face 36 and a lower face 36'. The block 30 may for example be a clay brick with dimensions of 194×92×57 mm.

In an embodiment, the upper and lower faces 16, 16' of the BIM 20 extend over the face 36 of the block 30.

When the BIM 20 is joined with the block 30 a modular building unit 40 is formed. Thus, the modular building unit 40 comprises or consists of a BIM 20 affixed to a block 30. The terms block interlocking modular (BIM) building unit, BIM ready building unit, BIM ready unit, BIM ready brick and modular building unit 40 are all used interchangeably throughout the application.

The BIM building unit 40 is adapted to inter-fit/interlock and mate with adjacent BIM building units 40.

In an embodiment, the upper face 16, or both the upper and lower faces 16, 16' of the Layout BIM 10 and/or BIM 20 include one or more perforations 22. In an embodiment, the upper face 16 includes four aligned perforations 22. In a preferred embodiment, the upper and lower faces 16, 16' of the Layout BIM 10 and/or BIM 20 include four aligned perforations 22.

It is contemplated that the upper face 16 of the Layout BIM 10 and/or BIM 20 include additional cut-out perforations 24. The upper and lower faces 16, 16' of the Layout BIM 10 and/or BIM 20 may include additional cut-out perforations 24, whereby the additional cut-out perforations 24 are positioned on either side of the aligned perforations 22. As will be appreciated by one reasonably skilled in the art, the cut-out perforations 24 may save material and cost during manufacture or production.

The BIM 20 may include one or more trapezoidal extensions 26 emanating from the one or more faces 12, 12', 14, 14', 16, 16' of the BIM 20. The trapezoidal extensions 26 form a trapezoidal or dovetail joint 26' including a dovetail-tail and dovetail-socket. A leg 18 may extend from the one or more trapezoidal extensions 26 of the BIM 20, wherein the legs 18 extend in a generally perpendicular direction relative to the upper face 16 and the lower face 16'.

The trapezoidal joints 26 of the Layout BIM 10 or BIM 20 allow for interlocking of the Layout BIMs 10 or BIMs 20 respectively. Thus, a plurality of BIM building units 40 may interlock and be mounted on, or to, adjacent BIM building units 40 in one or more layers, with each layer including a plurality of BIM building units 40.

Each of the vertical legs 18 may further include a pin 50 positioned at one end of each of the vertical legs 18, such that the pin 50 of a first BIM 20 connects with an aperture 22 of the upper or lower faces 16, 16' of a second BIM 20. Thus, the one or more perforations 22 of the upper and/or lower faces 16, 16' of the second BIM 20 receive the one or more pins 50 of the vertical legs 18 of a first BIM 20 to interconnect or interlock the BIMs 20 or BIM building units 40.

A feature of the invention is that the pin 50 at the end of each leg 18 may interlock permanently or lock in the aperture 22 in a manner that is secure while still allowing disassembly of the BIM building units 40, thus allowing for disassembling several layers.

The Layout BIM 10 may include one or more trapezoidal extensions 26 on each of the faces 12, 12', 14, 14', 16, 16'. The trapezoidal extensions 26 form trapezoidal joints 26' including dovetail-tails and dovetail-sockets on the faces 12, 12', 14, 14', 16, 16' of the Layout BIM 10.

The trapezoidal joints 26' of the Layout BIMs 10 allow interlocking of the Layout BIMs 10 to create a pattern that allows Layout BIMs 10 to interlock for mounting of Layout BIMs 10 in a layer including a plurality of Layout BIMs 10.

In an embodiment, the BIM 20 may be configured as a b-BIM 60, such that two vertical legs 18 extend from side face 14, such that the b-BIM 60 resembles the letter "b" in lowercase. The b-BIM 60 also includes two legs 18 on end face 12'. The b-BIM 60 may additionally also include two legs 18 on end face 12.

In an embodiment, the BIM 20 may be configured as a C-BIM 70, such that four legs 18 extend from side face 14, such that the C-BIM 20 resembles the letter "C".

In an embodiment, the BIM building unit 40 includes an electronic block interlocking module or e-BIM 80. The e-BIM 80 may comprise a polymer material and include or consist of a Layout BIM 10 including a pair of end faces 12, 12', a pair of side faces 14, 14', and upper and lower faces 16, 16'. The upper and lower faces 16, 16' of the Layout BIM 10 may include one or more perforations 22. In a preferred embodiment, the upper and lower faces 16, 16' of the Layout BIM 10 and/or BIM 20 include four aligned circular perforations 22. The upper and lower faces 16, 16' of the Layout BIM 10 may include additional cut-out perforations 24, whereby the additional cut-out perforations 24 are positioned on either side of the aligned perforations 22 and may be included for the purpose of saving material and cost during manufacture of production. Cut-out perforations 24 of the BIM 20 are aligned with cavities 38 on a brick or other building block 30. Thus, as will be appreciated by one reasonably skilled in the art, reinforced bars, pipes, or cables, may be run down via the aligned cut-out perforations 24 and cavities 38 of the bricks 30 or other building blocks.

The e-BIM 80 further includes a vertical face 82 having an opening 84 that allows the installation of a residential grade duplex or single electrical outlet or a residential grade duplex or single electrical switch 86.

An interior 88 of the e-BIM 80 includes an electrical outlet box 81, such as a 1-gang box that is wide enough for a switch or duplex receptacle 86.

A back of the 1-gang box 81 may include an aperture 85 that allows electricians to pass through electric wires to reach the duplex receptacle or single electrical outlet or a residential grade duplex or single electrical switch 86 in the e-BIM 80.

The BIM 20 may also be configured as an F-BIM 90. The F-BIM 90 includes two legs 18 extending from side face 14 in a generally perpendicular direction relative to the upper face 16, such that the F-BIM 90 resembles the letter "F". The F-BIM 90 may also include two legs 18 on each of the end faces 12, 12', wherein the legs extend in a generally perpendicular direction relative to the upper face 16.

The BIM 20 may also be configured as an i-BIM 100. The i-BIM 100 has two legs 18 extending from one of the end face 12', such that the legs extend in a generally perpendicular direction relative to the upper face 16, such the when the i-BIM 100 is in an upright position, the i-BIM 100 resembles the letter "i".

The BIM 20 may also be configured as a J-BIM 110. The J-BIM 110 has two legs 18 extending from a side face 14', such that the legs extend in a generally perpendicular direction relative to the upper face 16, such that the J-BIM 110 resembles the letter "J". The J-BIM 110 may also include two legs 18 on an end face 12'.

The BIM 20 may also be configured as an L-BIM 120. The L-BIM 120 has two legs 18 extending from a side face 14, such that the legs extend in a generally perpendicular direction relative to the upper face 16, such that the L-BIM 120 resembles the letter "L". The L-BIM 120 may also include two legs 18 on an end face 12'.

The BIM 20 may also be configured as an X-BIM 130. The X-BIM 130 has two sets of four legs 18, with a first set of four legs 18 extending from side face 14 and a second set of four legs 18 extending from side face 14', such that the legs extend in a generally perpendicular direction relative to the upper face 16, such that the X-BIM 130 resembles the letter "X".

The Layout BIM 10 may be configured as a Layout b-BIM 200 in which the Layout b-BIM 200 has two trapezoidal extensions 26 that extend from a bottom section of the side face 14, such that the Layout b-BIM 200 resembles the letter "b" in lowercase. The Layout b-BIM 200 also includes two trapezoidal extensions 26 on end face 12'. The Layout b-BIM 200 may also additionally include two trapezoidal extensions 26 on end face 12.

The Layout BIM 10 may be configured as a Layout C-BIM 210 in which the Layout C-BIM 210 has four trapezoidal extensions 26 that extend from face 14, such that the Layout C-BIM 210 resembles the letter "C".

The Layout BIM 10 may be configured as a Layout F-BIM 220 in which the Layout F-BIM 220 has two trapezoidal extensions 26 that extend from a top section of face 14, such that the Layout F-BIM 220 resembles the letter "F". The Layout F-BIM 220 may additionally also includes two trapezoidal extensions 26 on end face 12'.

The Layout BIM 10 may be configured as a Layout i-BIM 230 in which the Layout i-BIM 230 has two trapezoidal extensions 26 extending from one of the end faces 12, such that when the Layout i-BIM is in an upright position, the Layout i-BIM 230 resembles the letter "i".

The Layout BIM 10 may be configured as a Layout J-BIM 240 in which the Layout J-BIM 240 has two trapezoidal extensions 26 extending from a bottom section of face 14'. The Layout J-BIM 240 may additionally also includes two trapezoidal extensions 26 on end face 12'.

The Layout BIM 10 may be configured as a Layout L-BIM 250 in which the Layout L-BIM 250 has two trapezoidal extensions 26 that extend from a bottom section of face 14, such that the Layout L-BIM 250 resembles the letter "L". The Layout L-BIM 250 may additionally also includes two trapezoidal extensions 26 emanating from end face 12'.

A vertical T-shape intercepting Double Wythe Wall 400 may be created wherein a first layer of the T-Shape intercepting Double Wythe Wall 400 is built starting with a Layout F-BIM 220 interlocked with a Layout BIM 10, which interlocks to a Layout F-BIM 220, which in turn interlocks to a Layout b-BIM 220 rotated 180 degrees, which interlocks to a Layout J-BIM 240, which interlocks to a Layout F-BIM 220, which in turn interlocks to a Layout b-BIM 220 which interlocks to a Layout L-BIM 250, which in turn interlocks to a Layout b-BIM 220 which interlocks to the 1$^{st}$ element in the layout, namely the Layout F-BIM 220.

In another example, a window opening may be formed by a plurality of interlocking X-BIMs 130 placed as the bottom side of an opening. L-BIMs 120 and J-BIMs 110 may form both sides of the window's opening combined with yet another layer that forms both sides of the window's opening made of C-BIMs 70 and a single layout layer placed at the top side of the window's opening formed by a plurality of Layout b-BIMs 200 and Layout F-BIMs 220.

In another example, a rectangular window opening for a Double Wythe Wall 400 may be formed wherein a first layer of the window's opening is built using a plurality of sets formed by interlocking X-BIMs 130 interlocked to yet another X-BIM rotated 180 degrees. At the end of each side of the bottom opening the set interlocks with the end of a Double Wythe Wall 400 made with a plurality of b-BIMs 60 and F-BIMs 90. A second layer of the windows opening is built utilizing a plurality of C-BIMs 70 where interlocking with the end of a Double Wythe Wall 400 made with a plurality of b-BIMs 60 and F-BIMs 90.

A third layer of the windows opening is built utilizing a plurality of L-BIMs 120 and J-BIMs 110 sets wherein each set is created by interlocking the L-BIMs 120. The L-BIM 120 and J-BIM 110 set interlock with the end of a Double Wythe Wall 400 made with a plurality of b-BIMs 60 and F-BIMs 90.

Subsequent windows opening layers forming the left and right side of the opening are formed by using various BIM 20 types and repeating the steps described to create the second and third layer of the windows opening until the desired height of the opening is reached.

The final layer of the windows opening is built utilizing a plurality of Layout b-BIMs 200 and Layout F-BIMs 220 sets wherein each layout set is created by rotating the Layout b-BIM 200, 180 degrees and interlocking its side tails and pins with the side tails and pins of the Layout F-BIM 90.

A plurality of Lintel-BIMs 140 and Lintel-End-BIMs 150 span the space or opening between two vertical sides of a window's opening and interlock with ends of a Double Wythe wall 400.

In another example, a door opening for Double Wythe Wall 400 is formed of multiple layers which are formed by L-BIMs 120 and J-BIMs 110 as one of the layers that forms both sides of the door opening combined with another layer that forms both sides of the door opening made of C-BIMs 70 and finally a single layout layer placed at the top side of the door opening formed by a plurality of Layout b-BIMs 200 and Layout F-BIMs 220.

In another example, a method of forming a rectangular door opening for Double Wythe Wall 400 wherein a first layer of the door opening is built utilizing a plurality of C-BIMs 70 where the C-BIMs 70 interlock with the end of a Double Wythe Wall 400 made with a plurality of b-BIMs 60 and F-BIMs 90.

A second layer of the door opening is built using a plurality of L-BIMs 120 and J-BIMs 110 sets wherein each set is created by interlocking L-BIMs 120. L-BIMs 120 and J-BIMs 110 interlock with an end of a Double Wythe Wall 400 made with a plurality of b-BIMs 60 and F-BIMs 90.

Subsequent door opening layers forming the left and right side of the opening are formed by using various BIM 20 types and repeating steps described to create the first and second layer of the windows opening until the desired height of the opening is reached.

The final layer of the door opening is built utilizing a plurality of Layout b-BIMs 200 and Layout F-BIMs 220 sets wherein each layout set is created by rotating the Layout b-BIM 200, 180 degrees and interlocking the Layout b-BIM 200 with the Layout F-BIM 220.

A plurality of Lintel-BIMs 140 and Lintel-End-BIMs 150 span the space or opening between two vertical sides of the door opening and interlock with ends of a Double Wythe Wall 400, may or may-not be utilized. In this case it is utilized since the actual structure of the door frame is not designed to support the load of layers of BIMs 20 that are placed right on top of the door opening.

A box BIM 160 may be made of polymer. The box BIM 160 includes end faces, 12, 12' side faces, 14, 14' and upper and lower faces, vertical end faces extending vertically from each of the end faces 12, 12', lateral faces 17, 17'.

A cover plate 162 for the box-BIM 160 made of polymer includes end faces, side faces and upper and lower supporting faces.

The lateral faces 17, 17' include perforations that allow for the installation of construction items that would need to fit inside a space created once the cover plate 162 is attached to the box-BIM 160. Uses for the box-BIM 160 include a point of exit for plumbing pipes from a Single Wythe Wall 300 or a Double Wythe wall 400.

The upper and lower faces 16, 16' of the box BIM 160 may further include aligned perforations 22 located generally in a center position of the upper face 16. In addition, cut-out perforations 24 may be positioned on either side of the aligned perforations 22. In a preferred embodiment, there are four aligned perforations 22 and two cut-out perforations 24. As will be appreciated by one reasonably skilled in the art, reinforced bars, pipes, or cables, may also be run down via the cut-out perforations 24. The cut-out perforations 24 may save material during the production process.

An arc BIM 170 may be used in conjunction with an arc shaped block 30 to form a modular BIM building unit 40. The arc shaped block 30 may be formed of a homogenous material including end faces 32, 32', arc shaped side faces 34, 34' and arc shaped upper and lower faces 16, 16'. The arc BIM 170 may also be made of a polymer including end faces, 12, 12', arc shaped side faces 14, 14' and arc shaped upper and lower faces 16, 16'.

The upper and lower supporting faces 16, 16' of the arc-BIM 170 extend across the entire upper face 36 of the block 30.

In an embodiment, the upper and lower support faces 16, 16' of the arc BIM 170 surface include one or more perforations 22 positioned along a width of the upper and lower faces at a center point of the upper and lower support 16, 16'. In a preferred embodiment, there are four aligned perforations 22 positioned along a width of the upper and lower faces 16, 16' at a center point of the upper and lower faces 16, 16'.

In an embodiment, the upper and lower faces 16, 16' of the arc BIM 170 include cut-out perforation 24 positioned on either side of the aligned perforations 22.

The arc BIM 170 may further include two vertical legs 18 extending from end faces 12, 12', wherein the legs 18 extend in a generally perpendicular direction relative to the upper face 16.

The vertical legs 18 each include a trapezoidal extension 26, wherein the trapezoidal extensions 26 form trapezoidal joints 26' having dove-tails and dove-sockets.

The trapezoidal extensions 26 and trapezoidal joints 26' allow for the interlocking of BIM building units 40 incorporating arc BIMs 170 and other BIMs 20 for mounting of adjacent BIM building units 40.

A Layout arc BIM 260 made of polymer includes end faces 12, 12', sides faces 14, 14' and upper and lower faces 16, 16'. The side faces 14, 14' of the Layout arc BIM 26 are arc shaped and the upper and lower faces 16, 16' are also arc shaped. The upper and lower faces 16, 16' of the Layout arc-BIM extend over the face 36 of a block 30.

In an embodiment, the upper and lower support faces 16, 16' of the Layout arc BIM 260 surface include one or more perforations 22 positioned along a width of the upper face 16 and lower face 16' at a center point of the upper and lower support faces 16, 16'. In a preferred embodiment, there are four aligned perforations 22 positioned at a center point of the faces 16, 16'.

In an embodiment, the upper and lower faces 16, 16' of the arc Layout arc BIM 260 include cut-out perforation 24 positioned on either side of the aligned perforations 22.

The Layout arc BIM 260 may further include trapezoidal extensions 26 extending from the end faces 12, 12', wherein the trapezoidal extensions form trapezoidal joints 26' having dove-tails and dove-sockets.

The trapezoidal extensions 26 and trapezoidal joints 26 allow for the interlocking of Layout arc BIMs 260 to create a pattern.

The modular building unit 40 may include the block 30 and the Lintel BIM 140, wherein the Lintel BIM 140 is made of polymer.

The upper and lower faces 36, 36' of the Lintel-BIM 140 extend over the entire upper face of the block 36.

The upper faces 36 of the Lintel-BIM 140 include a plurality of perforations 22 generally positioned along a width of the upper and lower faces, 16, 16', in a center of the upper face 36 of the Lintel BIM 140. In a preferred embodiment, eight perforations 22 are generally aligned in a center of the upper faces 36, of the Lintel BIM 140.

The Lintel-BIM 140 includes one or more vertical legs 18 extending from end faces 12, 12', wherein the legs 18 extend in a generally perpendicular direction relative to the upper and lower faces 16, 16'.

Each vertical leg 18 includes a trapezoidal extensions 26 having a dovetail joint 26' including tails and sockets.

The trapezoidal joints 26' allow the Lintel-BIMs 140 to interlock with adjacent Lintel-BIMs 140 to create a pattern. The Lintel-BIMs 140 may interlock to create a horizontal layer.

The modular building unit 40, may include a Lintel End BIM 150 made of a polymer material and the block 30 formed of a homogenous material.

The Lintel End-BIM includes upper and lower faces 16, 16' that extend over and across the upper face 36 of the block 30.

The upper face 16 of the Lintel End-BIM 150 includes a plurality of perforations 22 positioned generally along a width at the center of the Lintel End-BIM 150. In a preferred embodiment, eight generally aligned perforations 22 are generally aligned along a width at the center of the upper face 16 of the Lintel End-BIM 150.

In an embodiment, the Lintel End-BIM 150 includes a total of six vertical legs 18 extending from the end faces 12, 12'. In one embodiment, the Lintel End-BIM 150 includes four legs 18 on end face 12 and two vertical legs 18 on end face 12', wherein the legs extend generally in a perpendicular direction relative to the upper face 16.

The vertical legs 18 of the Lintel End-BIM 150 each include a trapezoidal extension 26, wherein each trapezoidal extension 26 has a trapezoidal joint 26' forming dove-tails and dove-joints.

The Lintel End-BIMs 150 interlock via the trapezoidal joints 26'. The Lintel End-BIMs 150 may interlock with adjacent BIMs via the trapezoidal joints 26' to form horizontal layers.

A method of forming a generally vertical Single Wythe arc shaped wall 800 wherein a first layer 810 of the Single Wythe arc shaped wall 800 is a layout layer built using a plurality of Layout arc-BIMs 260.

Subsequent wall layers are built using of a plurality of arc-BIMs 170 wherein the pins 50 interlock with one or more of the aligned perforations 22 of Layout arc-BIMs 260 of the first arc-BIM layer 310 or of an arc-BIM 170. Each arc-BIM 170 interlocks by its trapezoidal joints 26' and pins 50 to the trapezoidal joints 26 and pins 50 of the next arc-BIM 170 down the row.

As indicated, the polymer forming the block interlocking module 20 of the building block unit 40 of the present invention is pre-applied to the building block 30 by a molding process and preset prior to shipment to the field or place of installation. The block interlocking module 20 of one building block unit 40 inter-fits/inter-locks with the block interlocking module 20 of an adjacent building block unit 40. Methods of manufacturing the building block BIM units 40 will be more fully described hereafter.

The pre-application and presetting of polymer on each building block 30 (prior to installation) assures a dimensionally accurate composite building block 30 and when inter-fitted to adjacent building block BIM units 40 results in a predetermined dimensionally accurate construction. Not only is the final construction dimensionally accurate, it is much stronger, much more water tight and has characteristics which are improved over the prior art, particularly in terms of the aesthetics. Due to the fact that the polymer block interlocking module (BIM) 20 is pre-applied and preset under conditions much more favorable than in the field, the polymer block interlocking module (BIM) 20 is stronger, less permeable to water, more uniform in appearance, and not susceptible to creep. The trapezoidal joints 26' formed by the polymer block interlocking modules (BIM) 20 of the present invention are stable and strong and substantially eliminate water infiltration. The joints formed by the polymer block interlocking modules also eliminate the need for "striking" or "working" the mortar in the usual masonry sense.

The building interlocking modular block BIM unit 40 of the present invention is self-aligning, self-leveling and self-plumbing. It lends itself to semi-skilled labor or automatic machine installation and eliminates the delay required for curing of wet mortar as in the prior art. The BIM-ready building unit 40 includes a block 30, such as a brick, and a separate block interlocking module (BIM) 20 secured about the periphery of the block 30. The block 30 is a rectangular parallelepiped including a pair of parallel rectangular end faces 32, 32' a pair of parallel rectangular side faces 34, 34', and a parallel rectangular upper 36 and a lower face 36'. The upper face 36 and sometimes one or both of the ends 32, 22' are covered with a block interlocking module (BIM) 20 made of a solid layer of a polymer material. A side of the block interlocking module (BIM) 20 has trapezoidal joints 26'. The trapezoidal extensions 26 and trapezoidal joints 26' in a preferred embodiment have a trapezoidal or generally trapezoidal shape. The trapezoidal extensions 26 and trapezoidal joints 26' on opposed block interlocking modules 20 and the trapezoidal joints 26' on adjacent block interlocking modules 20 inter-fit/inter-lock for mounting of adjacent modular BIM building units 40 in precise horizontal layers with each horizontal layer including a plurality of modular BIM building units 40 in end to end relation. Each block interlocking module (BIM) 20 has a planar surface extending over an entire upper face 36 of the block 30. The parallel planar surface extending over the entire upper face 16 has one or more aligned circular perforations 22 positioned such that legs 18 of a first block interlocking module 20 to interlock with the circular perforations 22 of a second block interlocking module 20 positioned below the first block interlocking module 20. In a preferred embodiment, the upper face 16 of the BIM 20 has four circular perforations 22. In addition the upper face 16 can also contain two large perforations 24 to conserve material. The four perforations 22 and the end of the legs 18 of the block interlocking modules 20 can be manufactured in a way that the BIMs 20 lock permanently or are engaged in a fixedly removable manner. When engaged in a fixedly removable manner the block interlocking modules 20 are securely locked while still allowing disassembly of the block interlocking modules 20.

The first step in the manufacturing process is to fuse the block interlocking module or BIM 20 with a building block 30, such as a brick.

The first step in the manufacturing process is to make two parallel trapezoidal cuts 39 along an upper planar rectangular face 36 of the block 30. The length of each trapezoidal cut 39 should not exceed the total length of the upper planar face 36 thereby keeping the pair of parallel rectangular side supporting faces 34, 34' without any visible cuts. This is important as it will keep the aesthetics of walls and other structures built utilizing the present invention.

The second step in the manufacturing process follows.

Now with the two trapezoidal cuts 39 along the upper face 36 the brick 30 is placed in a dimensionally accurate mold (not shown). The brick 30 may be generally centered in the mold and held in this disposition in any number of known ways, such as with a force applied against the pair of parallel rectangular side supporting faces 34, 34'. It is, of course, noted that voids may surround the end faces 32, 32' and upper face 36 of the brick 30. No void or space is provided to the side faces 34, 34' or the lower supporting face 36'.

The third step in the manufacturing process follows.

Injection molding is among the most commonly used manufacturing process for the fabrication of plastic parts. The injection molding process is generally based on the molten die-casting method. The injection-molding unit consists of two elements: the injection unit, and the mold. Unlike extrusion, injection molding forms three-dimensional shapes making this process ideal to cast the block interlocking modules 20 of the present invention.

With the block or brick 30 in place and the mold closed a flowing polymer mix is injected into the voids surrounding end faces 32, 32' and upper face 36 of the brick 30 through suitable openings in the mold. After dispensing of the polymer within openings the openings will be plugged.

The fourth step in the manufacturing process follows:

At this stage the polymer is allowed to set. The outside surfaces of the resulting BIM unit 40 conform to the dimensionally accurate inside surfaces of the mold. After the polymer has cured and hardened, it is described as being "pre-applied", "preset" or "fused".

The fifth step in the manufacturing process follows:

Human inspectors check the output of the molds, to eliminate significant variations in thickness.

Factories should be able to recycle almost all the plastic waste from the manufacturing process. If the plastic cannot be re-used in the block interlocking modules or BIM's 20, it should be processed and sold on to industries that can make use of it.

The results of the manufacturing process follow:

The pre-application and presetting of a polymer on each building block 30 (prior to installation) assures a dimensionally accurate composite building block 30 and when interlocked to adjacent BIM ready manufactured building block units 40 results in a predetermined dimensionally accurate construction. Not only is the final construction dimensionally accurate, it is much stronger and has characteristics which are improved over the prior art, particularly in the mortar area. Due to the fact that the polymer is pre-applied and preset under conditions much more favorable than in field mixing operations, the polymer is stronger, less permeable to water, more uniform in appearance, and not susceptible to creep. The joint formed with the present invention is stable and strong and substantially eliminates water infiltration. It also eliminates the need for "striking" or "working" the mortar in the usual masonry sense.

Regardless of which polymer materials are selected and even if the building blocks 30 to which they are applied are non-uniform, it can be understood that the polymer, by being pre-applied in a dimensionally accurate mold within specified tolerances, will result in extremely accurate outside to outside dimensions so that inter-fitting/inter-locking BIM ready manufactured building block units 40 will be in a predetermined dimensionally accurate relationship.

Polymers

ABS (Acrylonitrile Butadiene Styrene)

In a preferred embodiment, a polymer such as ABS (acrylonitrile butadiene styrene) is used. ABS (acrylonitrile butadiene styrene) is a common thermoplastic polymer. The most important mechanical properties of ABS are impact resistance and toughness. A variety of modifications can be made to improve impact resistance, toughness, and heat resistance of this polymer therefore it can be considered a satisfactory polymer material for manufacturing block interlocking modules or BIMs 20 and arc-BIMs 170.

During the process the ABS plastic is heated to 232° C. (450° F.) until it reaches a dough-like consistency. It is then injected into the molds at pressures between 25 and 150 ton. ABS takes approximately 15 seconds to cool. The mold is permitted a tolerance of up to two micrometers, to ensure the BIMs 14 remain connected.

Other polymers may also be considered suitable to manufacture BIMs 20 and arc-BIMs 170. A large variety of plastic materials are often used for outdoor applications such as architectural glazing, mass transportation interiors, and marine dock fenders. Certain plastics such as acrylic, Ultem, PVDF, and PTFE are inherently UV stable. However, most plastic materials exhibit color change and loss of elongation when exposed to UV light. Weathering resistance of some plastics can be improved by adding UV stabilizers or UV resistant caps to protect the base polymer.

Acrylic may be used to formulate BIMs 20.

Acrylic is a transparent thermoplastic material with outstanding strength, stiffness, and optical clarity. Acrylic sheet is easy to fabricate, bonds well with adhesives and solvents, and is easy to thermoform. It has superior weathering properties compared to many other transparent plastics. Acrylic sheet exhibits glass-like qualities, such as clarity, brilliance, and transparency—but at half the weight and many times the impact resistance of glass. From durable signs and skylights, to eye-catching retail store fixtures, displays and shelves, acrylic provides outstanding versatility, durability, and aesthetic qualities.

Regardless of which polymer materials is selected it can be understood that the polymer will have the versatility, durability, and aesthetic qualities required.

Fire-safe polymers may also be used to formulate BIMs 20.

Some fire-safe polymers naturally exhibit an intrinsic resistance to decomposition, while others are synthesized by incorporating fire-resistant additives and fillers. The present invention does not provide details as of what kind of fire-resistant additives and fillers can be utilized to form the block interlocking modules; however it is understood that this topic will be considered as part of the research process that goes before selecting the polymer(s) utilized to manufacture the BIMs 20.

Joints and Joint Profile and Images

The joints in brickwork have a significant influence on the overall appearance. Joints have a marked effect on the appearance of brickwork. The color and texture of the block interlocking module 20 and the joint profile are all important factors. A variety of joint profiles can be used. Some reveal the edges of the bricks 30 and so accentuate their individual forms, others obscure the edges and merge bricks 30 and the block interlocking module 20 to a homogeneous surface.

The most popular joint profiles are: Raked (or Recessed) Joint 810, Flush Joint 820, V Joint 830, Concave Joint 840, Weathered Joint 850, Struck Joint 860, Beaded Joint 870 and the Extruded Joint 880. The block interlocking module 20 can be fused using any of joint profiles to achieve the aesthetics and/or weather resistant required.

Figure 6:
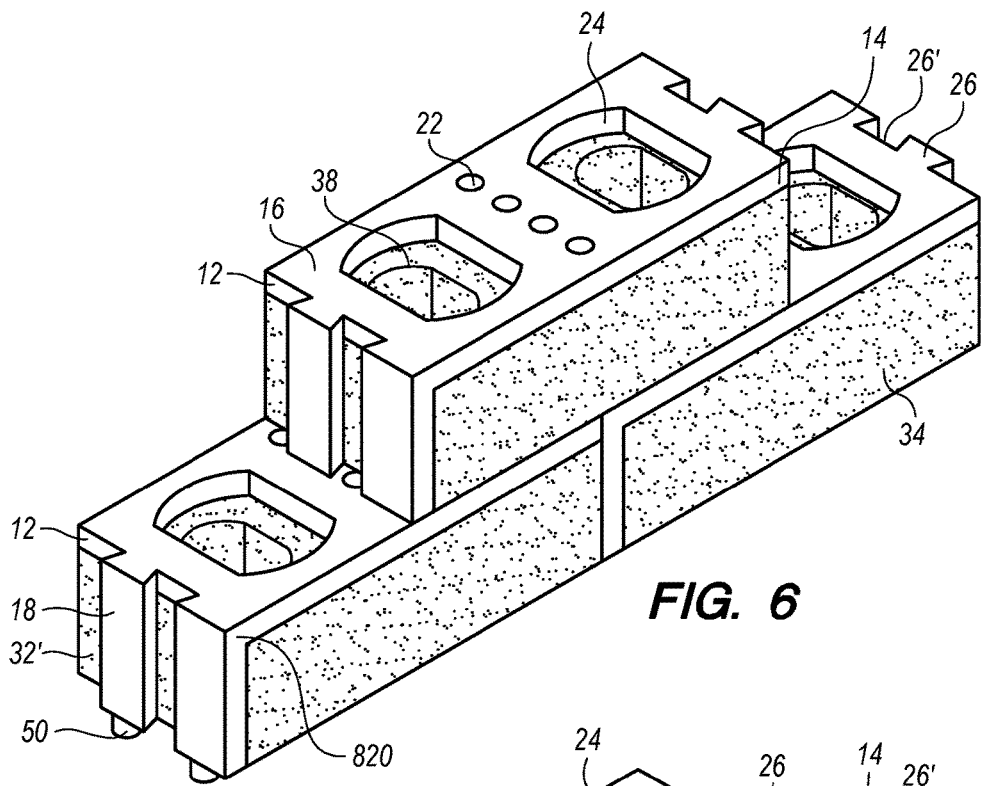
FIG. 6 illustrates a perspective projection of a flush joint.
Figure 7:
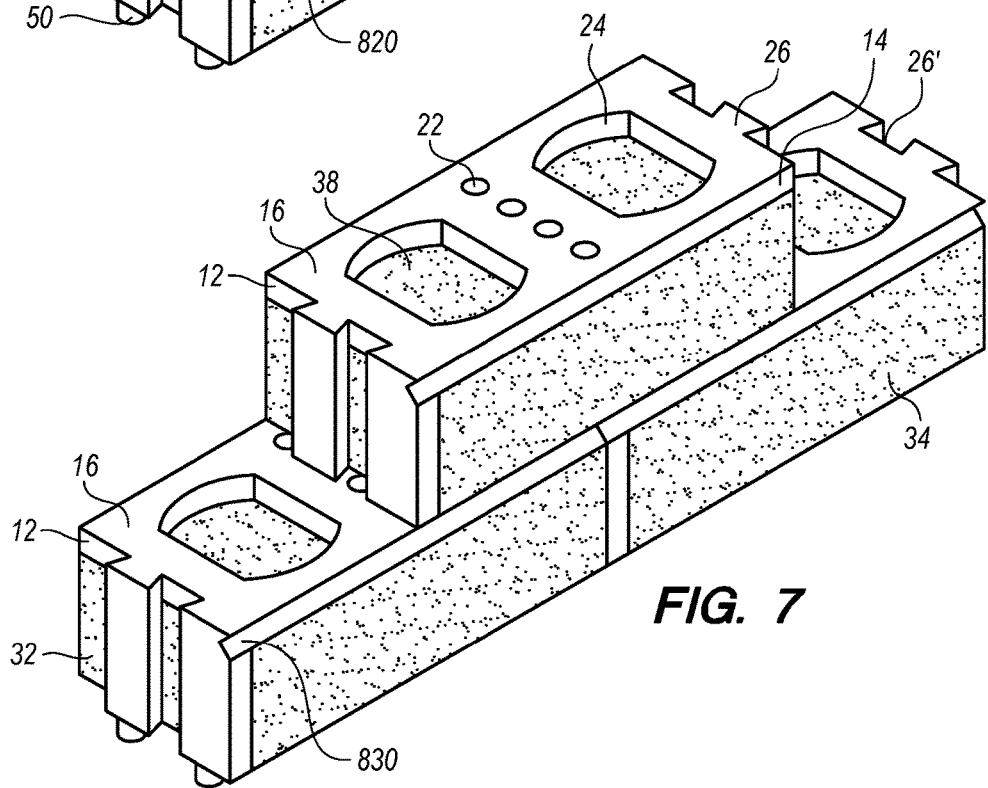
FIG. 7 illustrates a perspective projection of a V joint.
Figure 8:
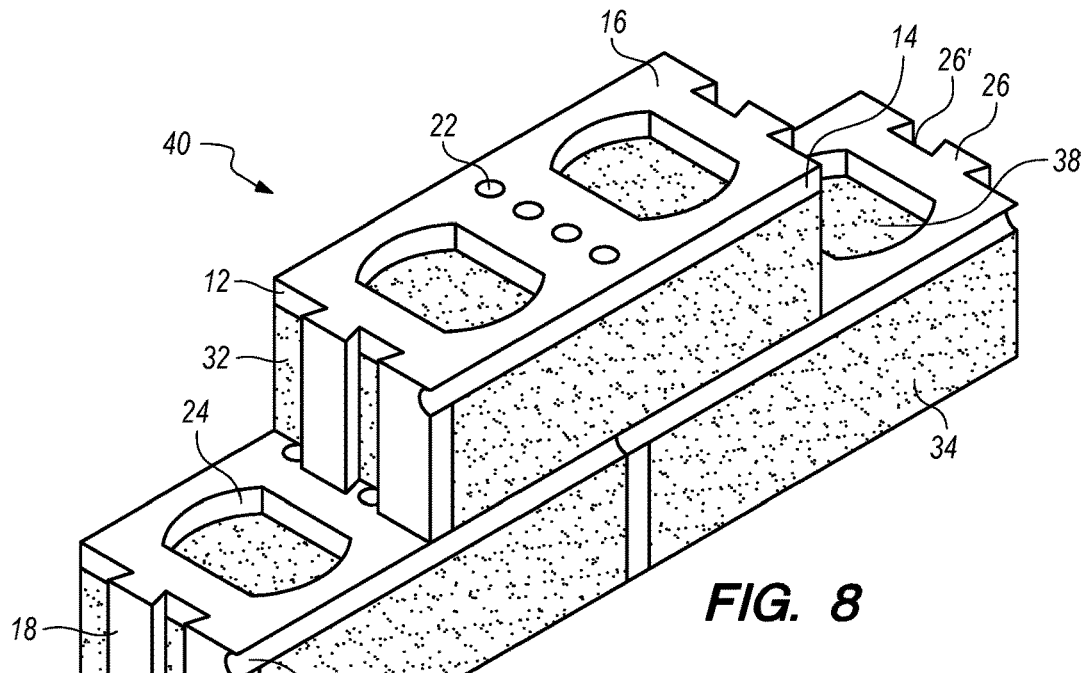
FIG. 8 illustrates a perspective view of a concave joint.
Figure 9:
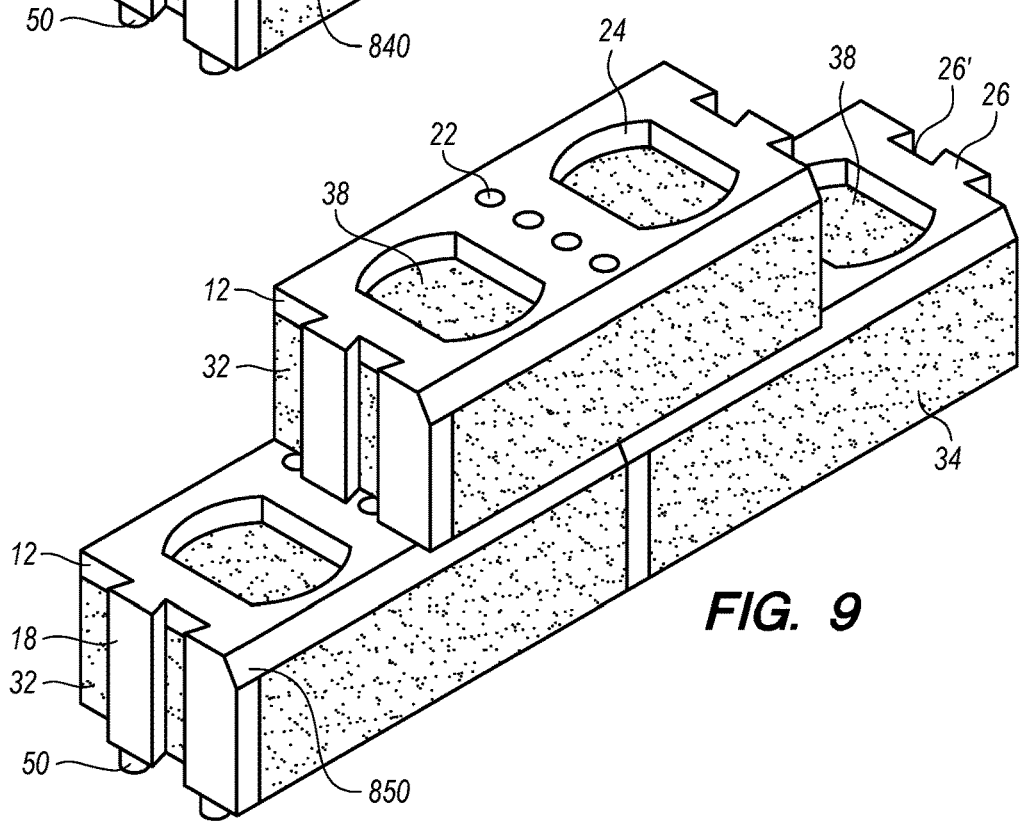
FIG. 9 illustrates a perspective view of a weathered joint.
Figure 10:
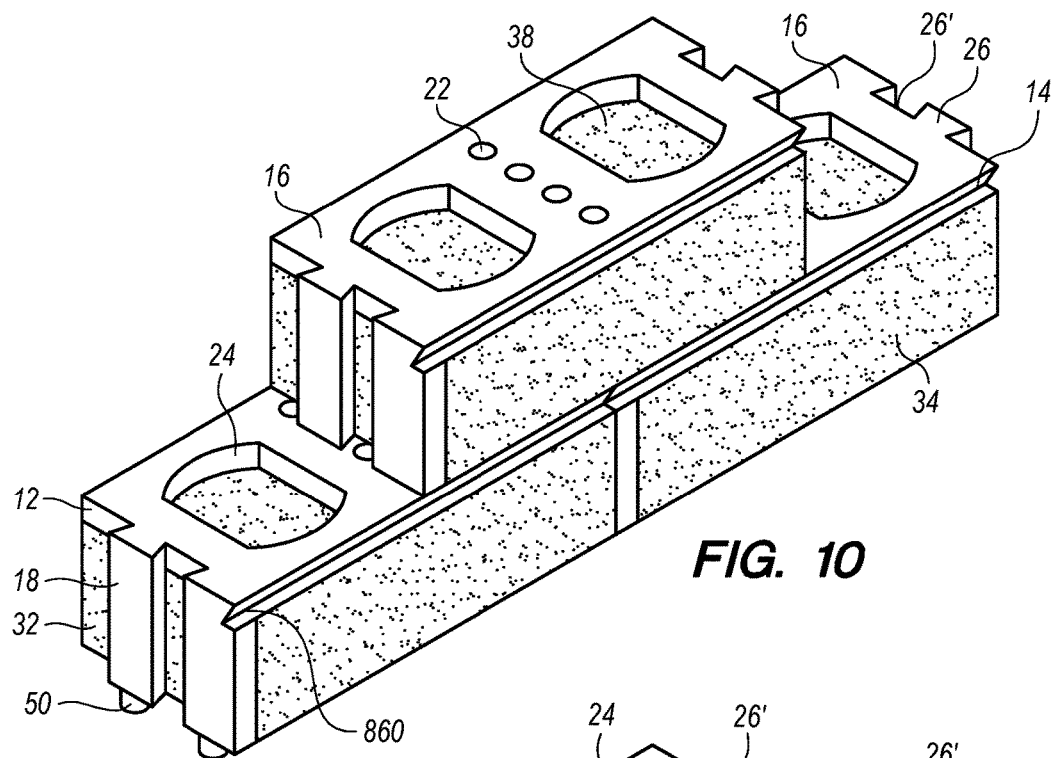
FIG. 10 illustrates a perspective view of a struck joint.
Figure 11:
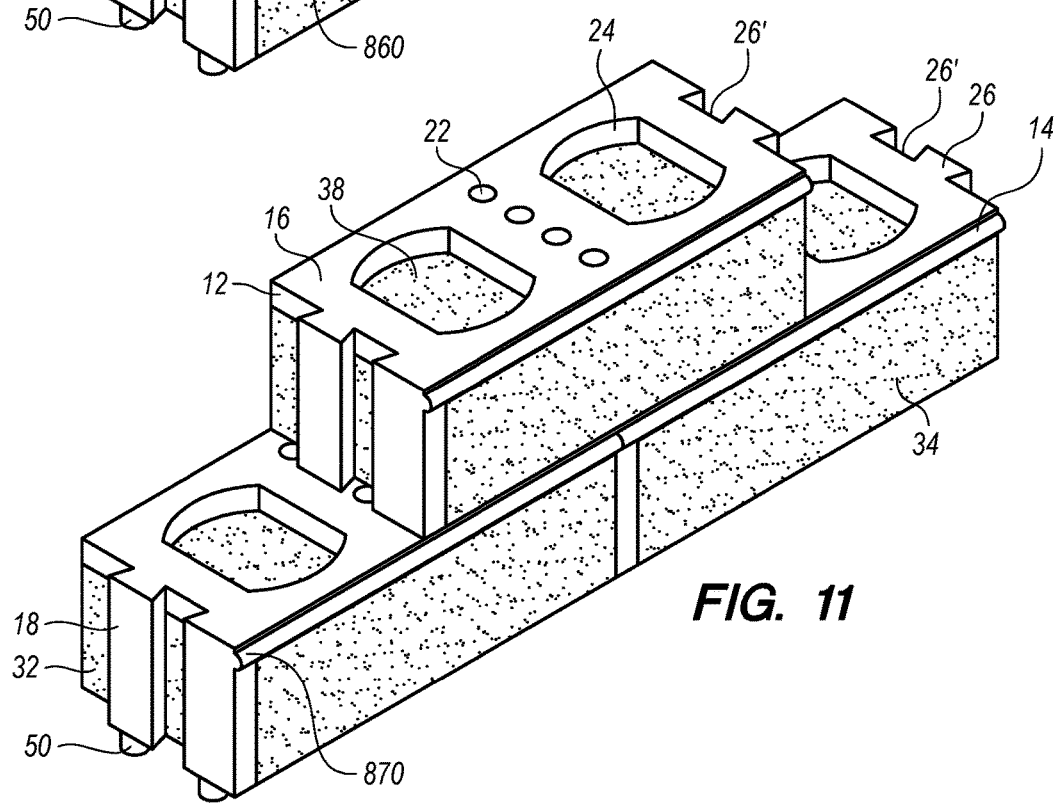
FIG. 11 illustrates a perspective view of a beaded joint.
Figure 12:
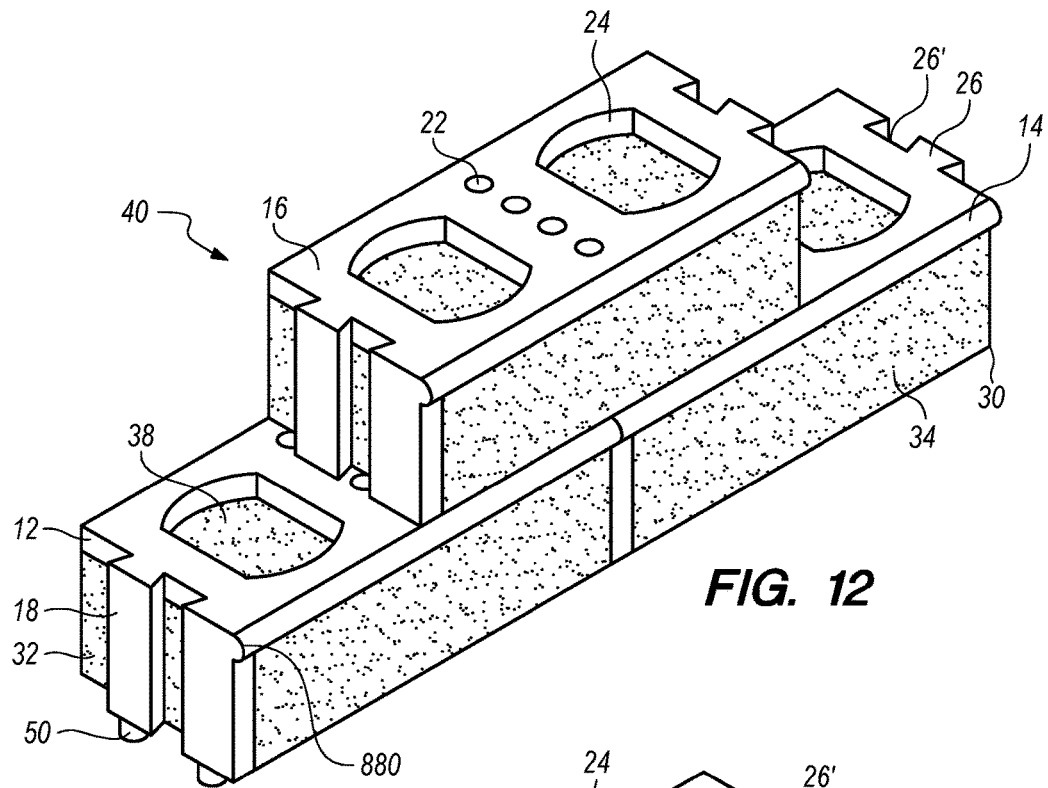
FIG. 12 illustrates a perspective view of an extruded joint.

A Raked (or Recessed) Joint 810 is shown in FIG. 6. The Concave 840 and the V Joint 830 are the most watertight joints. The Weathered Joint 850, Struck Joint 860 and Flush joint 820 fall in the middle, with the Raked joint 810 being the least weathertight of all. There are several types of block interlocking modules 20 to cover a variety of installations.

Referring now to FIGS. 1-4, there is shown a perspective view of the block interlocking module (BIM) 20 of the invention. The BIM 20 includes two end faces 12, 12', two side faces 14, 14', the upper face 16 and lower face 16'. The upper face 16 includes one or more apertures 22. In a preferred embodiment, the upper face 16 includes four apertures 22 aligned and generally positioned in a center of the upper face 16. The end faces 12, 12' of the BIM 20 include trapezoidal extensions 26 and trapezoidal joints 26'. The BIM 20 further includes legs 18 extending from the trapezoidal extensions 26, wherein the legs are generally perpendicular relative to the upper face 16 and lower face 16'. In a preferred embodiment, as shown, the end faces 12, 12' of the BIM 20 each include two trapezoidal extensions 26 and two legs 18. As shown, the pin 50 is positioned at a bottom end of the leg 18, most distal to the upper and lower faces 16, 16'. The upper and lower faces 16, 16' may further include cut-out perforations 24. As shown, the cut-out perforations 24 are positioned on either side of the generally aligned perforations 22.

In FIG. 1 there is shown a perspective view of the BIM-Ready manufactured building block unit 40. While the building block unit 40 of the present invention may utilize a brick or other building block 30, the goal is not to redesign the building block 30 per se but to combine the building block 30 with new materials and technology to produce a unique combination. The result of the design and control of building block unit 30 is to make it modular, self-aligning, self-leveling and self-plumbing. The dimensional control of the building block unit 40 is essential for its use in modular construction including a plurality of inter-fitting/inter-locking building block units 40. The product is to be a dimensionally accurate building block unit 40 with a separate block interlocking module (BIM) 20 secured to the block 30 in an additional manufacturing step. The term BIM throughout this application refers to a block interlocking module.

FIG. 2 shows a bottom perspective view of the block interlocking module 20 of the invention. There is shown two ribs 28 positioned on the lower face 16' of the BIM 20. The ribs 28 may be used to secure a block, such as for example a brick 30 as shown in FIG. 3.

FIG. 2 is a Block Interlocking Module (BIM) 20 (Perspective projection). The building block unit 40 of the present invention may include a brick or other building block 30 defining a rectangular parallelepiped having a parallel rectangular upper face 36 and a lower face 36', parallel rectangular side faces 34, 34', and parallel rectangular end faces 32, 32'. The upper face 36 and sometimes one or both of the end faces 32, 32' are covered with a block interlocking module 20 made of a solid layer of a polymer. Throughout this description, the terms "pre-applied" and "fused" and joined may be used interchangeably.

As used herein, the term "pre-applied" means block interlocking module 20 is applied as a manufacturing step and not in the field. The term "preset" means that the block interlocking module 20 is applied and allowed to set prior to use in the field. The preset block interlocking module 20 of the building block unit 40 inter-fits/inter-locks with all block interlocking modules 20 of mating building block units 40 to connect the building block units 40 together in a predetermined dimensionally accurate relationship.

Figure 39:
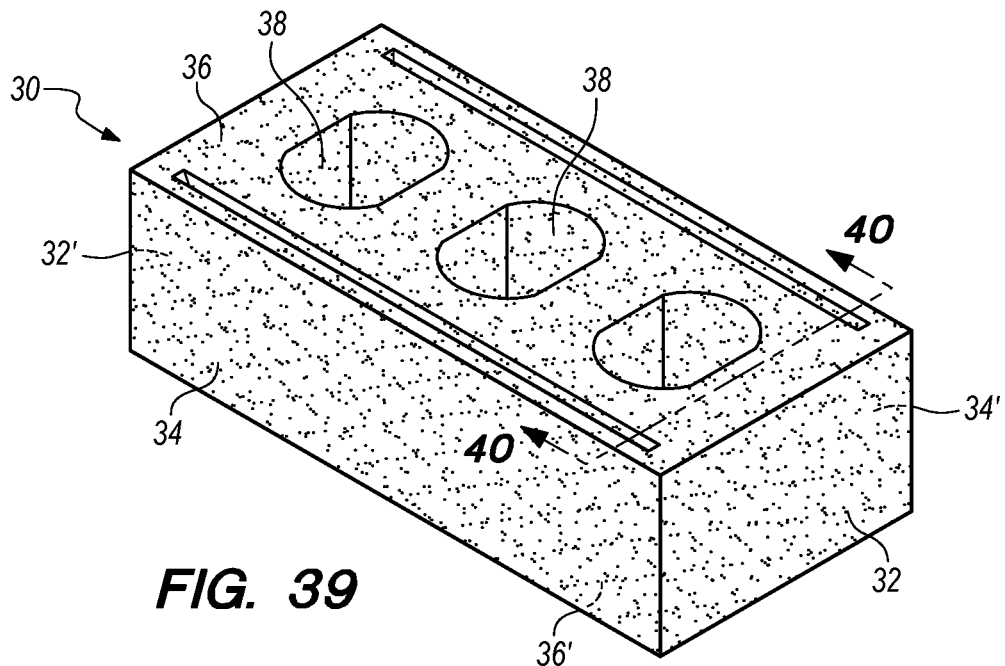
FIG. 39 illustrates a perspective view of a brick with two trapezoidal cuts along the upper planar surface.
Figure 40:
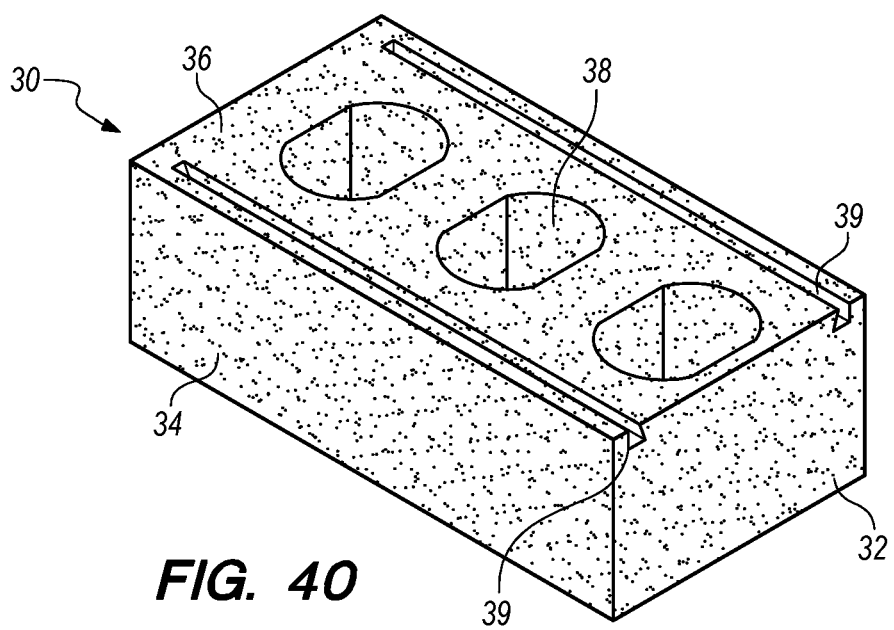
FIG. 40 illustrates a perspective view of a cross section showing two trapezoidal cuts along an upper face of a brick.

FIG. 3 shows a perspective view of two legs 18 of the block interlocking module (BIM) ready building block units 40 of a top layer about to interlock with two of the circular perforations 22 in a layer below. As shown, the pins 50 of a first BIM ready brick 40 are about to interlock with two of the perforations 22 of a second BIM ready brick 40. The BIM ready brick 40 includes the BIM 20 and the block 30, wherein the block 30 is joined to the BIM 20. As illustrated in FIGS. 3, 39 and 40, the block 30 is a brick 30 and includes end faces 32, 32', side faces 34, 34' and upper face 36 and lower face 36'. FIG. 3 further illustrates the raked or recessed joint 810. The brick 30 includes cavities 38. As shown, the cavities 38 are aligned with the cut-out perforations 24 of the BIM 20.

FIG. 3 shows two inter-locked BIM-ready building block units 40. Block Interlocking modules 20 of adjacent mating BIM ready units 40 are secured to each other by the dove tail design of the block interlocking module 20.

Figure 4:
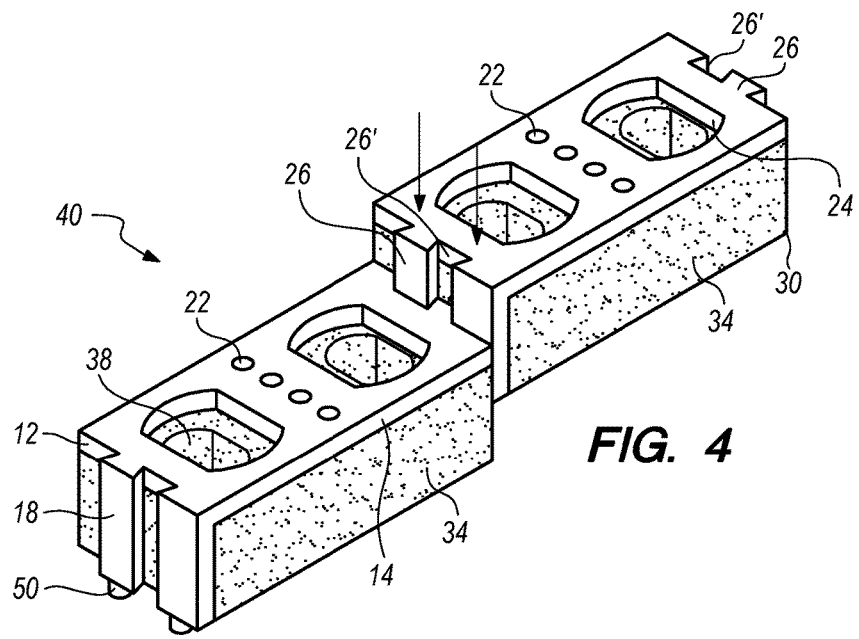
FIG. 4 illustrates a perspective view of two dovetail pins and two tails of the adjacent block interlocking module (BIM) ready unit.

FIG. 4 illustrates a perspective view of two BIM ready building block units 40 about to interlock in side by side relation. As shown the legs 18 on the end 12' of a first BIM ready brick 40 interlock with the trapezoidal joints 26' on the end 12 of a second BIM ready brick 40.

FIGS. 3 and 4 show two of the legs 18 of the BIM-Ready building unit 40 of a top layer about to interlock with two of the circular perforations 22 in the layer below. The outer exposed perpendicular surfaces on opposed block interlocking modules 20 of adjacent blocks 30 are secured together by the two dovetail pins and two dovetail tails of the trapezoidal extensions 26 and joints 26' of adjacent BIM Ready building units 40. Thus, a smooth joint extends about the entire periphery of the block 30 to provide a smooth uniform appearance between adjacent BIM Ready building units 40.

Figure 5:
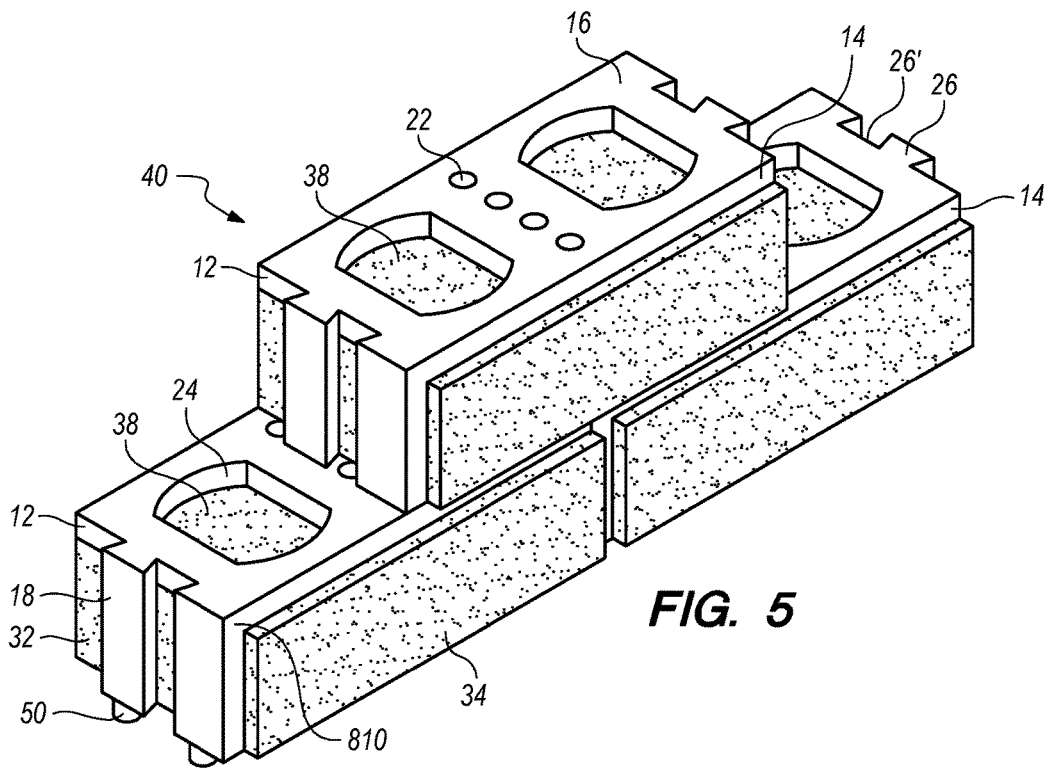
FIG. 5 illustrates a perspective view of a raked (or recessed) joint.

FIG. 5 illustrates a perspective view of a raked (or recessed) joint 810. As shown two BIM ready building units 40 are joined in s side by side configuration having been connected as illustrated in FIG. 4. Additionally a BIM ready brick 40 is joined to two BIM ready bricks 40 on a layer below when the pins 50 interlock with the apertures 22 of the BIM ready bricks 40 on the layer below as illustrated in FIG. 3.

FIG. 5 shows a perspective view of two dovetail pins and two dovetail tails of the trapezoidal extensions 26 and trapezoidal joints 26' of adjacent BIM building block units 40 half way in the inter-locking process.

Referring now to FIGS. 6-12, there is shown a plurality of interlocking BIM ready building units 40. FIGS. 6-12 illustrate respectively a perspective view of a flush joint 820, a V joint 830, a concave joint 840, a weathered joint 850, a struck joint 860, a beaded joint 870, and an extruded joint 880.

Figure 13:
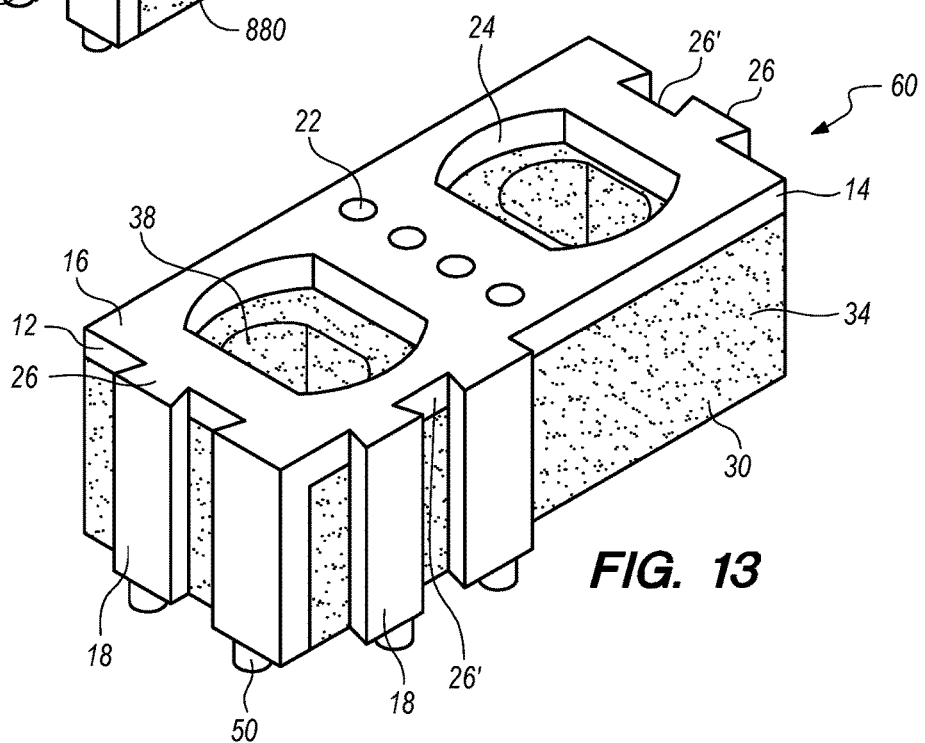
FIG. 13 illustrates a perspective view of a b-BIM.

FIG. 13 illustrates a perspective view of a BIM 20 configured to a b-BIM 60 joined with a block 30 to form a BIM ready building unit 40. As shown, two vertical legs 18 extend from side face 14, wherein the legs 18 extend are generally perpendicular relative to the upper face 16, such that the b-BIM 60 resembles the letter "b" in lowercase. As shown, the b-BIM 60 may also include two legs 18 extending from end face 12'. The b-BIM 60 may additionally also include two legs 18 extending from end face 12.

Figure 14:
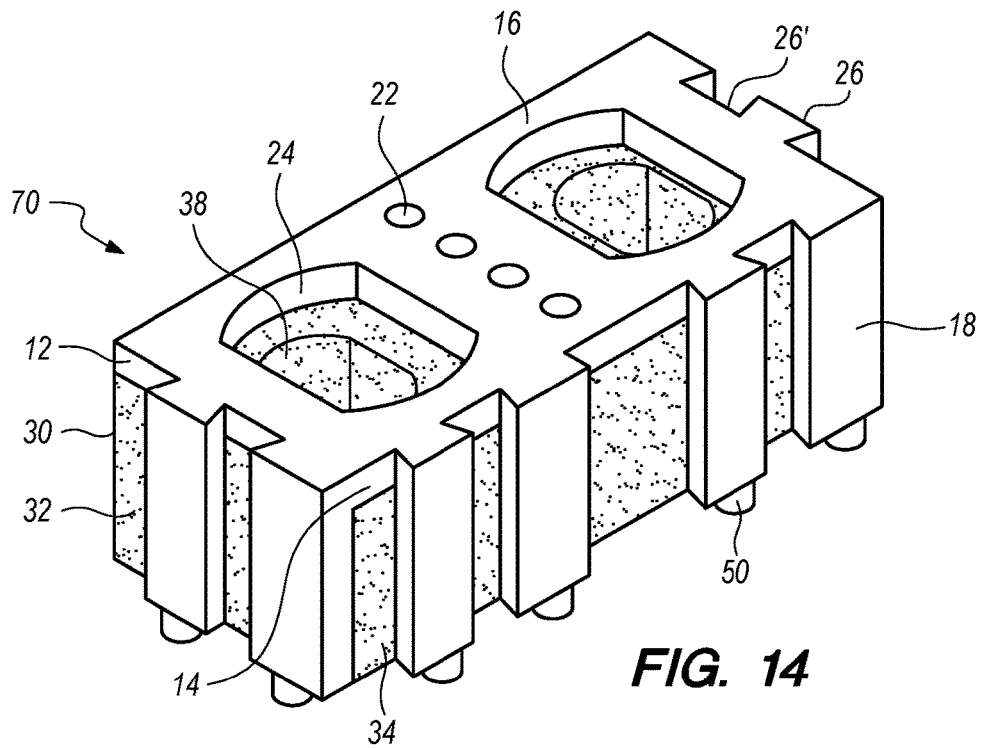
FIG. 14 illustrates a perspective view of a C-BIM.

FIG. 14 illustrates a perspective view of a BIM 20 configured to a C-BIM 70 joined with a block 30 to form a BIM ready building unit 40. As shown, four legs 18 extend from side face 14, wherein the legs 18 extend are generally perpendicular relative to the upper face 16, such that the C-BIM 20 resembles the letter "C". As shown, the C-BIM 70 may also include two legs 18 extending from end face 12'. The C-BIM 70 may additionally also include two legs 18 on end face 12.

Figure 15:
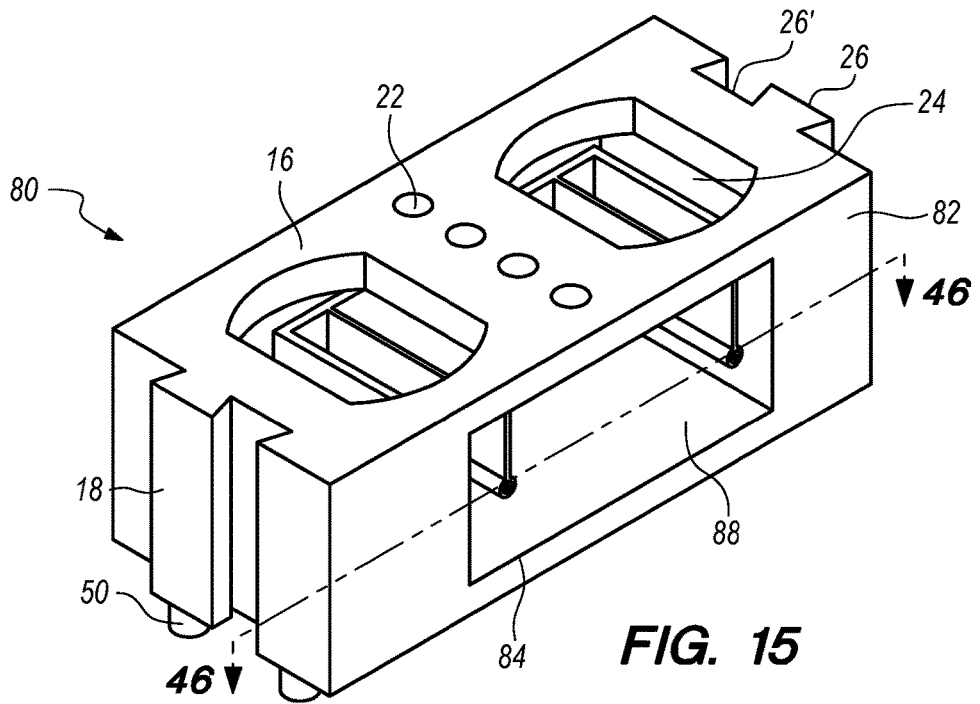
FIG. 15 illustrates a perspective view of an e-BIM.
Figure 16:
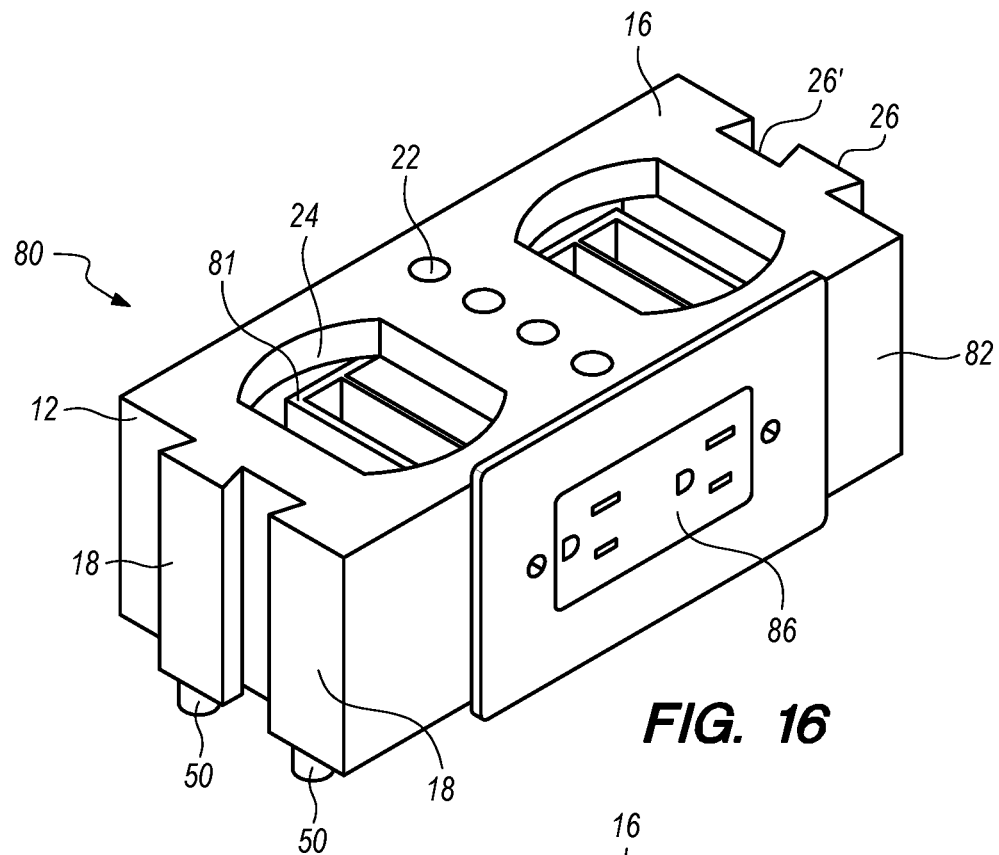
FIG. 16 illustrates a perspective view of an e-BIM with electric outlet installed.
Figure 45:
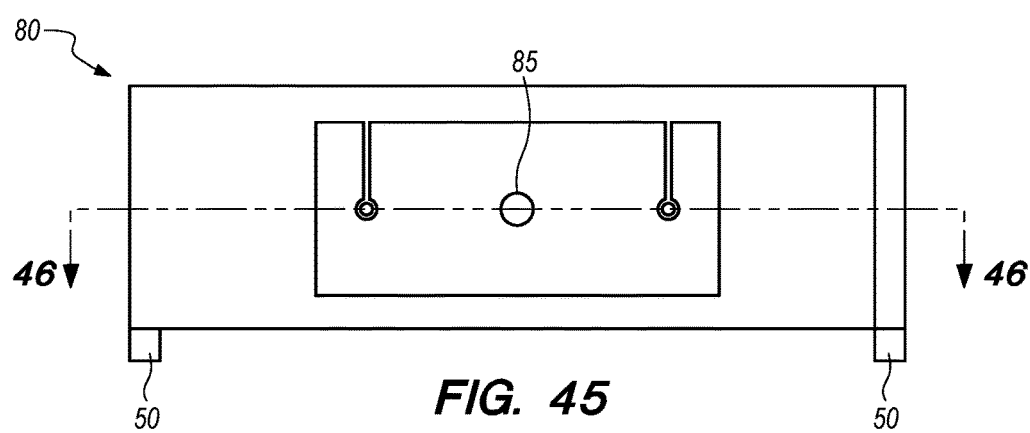
FIG. 45 illustrates a front view of the e-BIM of FIGS. 15 and 16.
Figure 46:
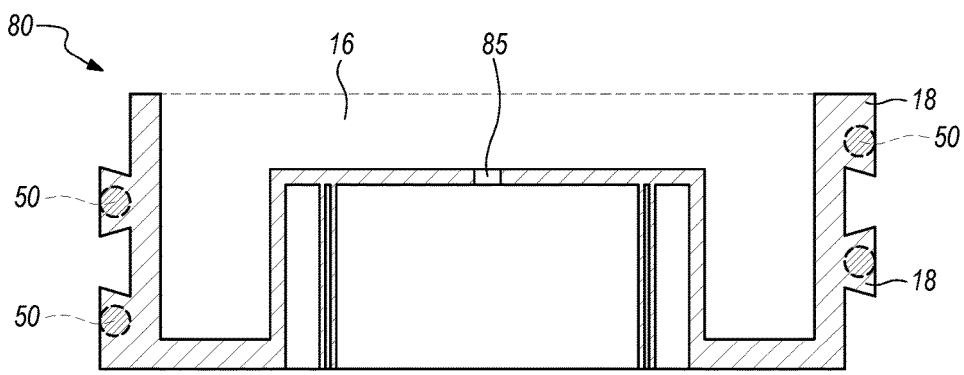
FIG. 46 illustrates a top sectional view of the e-BIM of FIG. 45.

Referring now to FIGS. 15-16 illustrates a perspective view of an e-BIM 80 and a perspective view of an e-BIM 80 with electric outlet 86 installed. The e-BIM 80 further includes a vertical face 82 having an opening 84 that allows the installation of a residential grade duplex or single electrical outlet or a residential grade duplex or single electrical switch 86. The interior 88 of the e-BIM 80 includes the electrical outlet box 81, such as a 1-gang box that is wide enough for a switch or duplex receptacle 86. A back of the 1-gang box 81 may include aperture 85 (as shown in FIGS. 45, 46) that allows electricians to pass through electric wires to reach the duplex receptacle or single electrical outlet or a residential grade duplex or single electrical switch 86 in the e-BIM 80.

Figure 17:
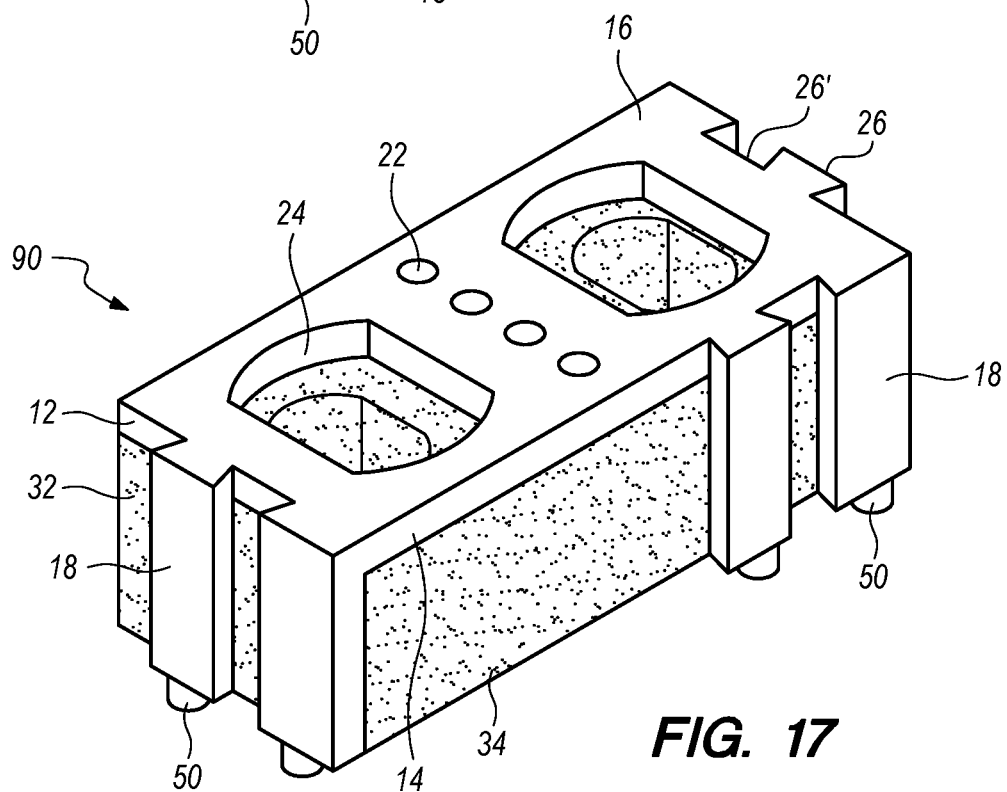
FIG. 17 illustrates a perspective view of an F-BIM.

FIG. 17 illustrates a perspective view of an F-BIM 90. As shown, the BIM 20 is configured as an F-BIM 90. The F-BIM 90 includes two legs 18 extending from an upper portion of side face 14, wherein the legs 18 extend are generally perpendicular relative to the upper face 16, such that the F-BIM 90 resembles the letter "F". The F-BIM 90 may also include two legs 18 on each of the end faces 12 and 12'.

Figure 18:
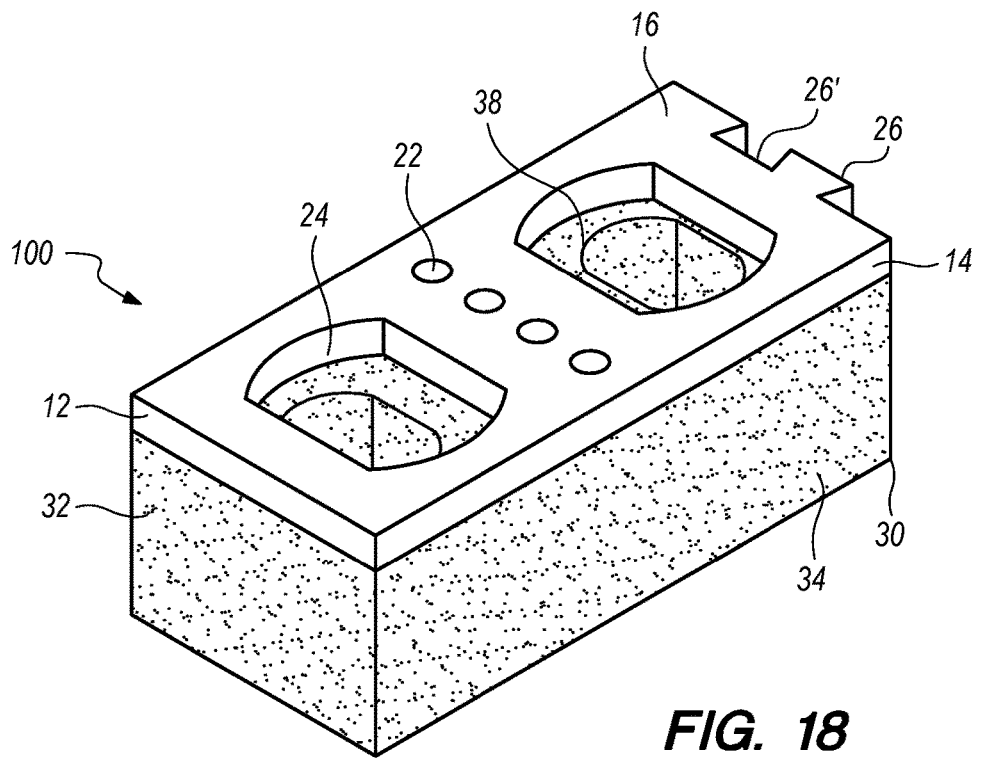
FIG. 18 illustrates a perspective view of an i-BIM.

FIG. 18 illustrates a perspective view of an i-BIM 100 joined with a block 30 to form a BIM ready building unit 40. As shown, the BIM 20 is configured as an i-BIM 100. The i-BIM 100 has two legs 18 extending from end face 12', wherein the legs 18 extend are generally perpendicular relative to the upper face 16, such the when the i-BIM 100 is in an upright position, the i-BIM 100 resembles the letter "i".

Figure 19:
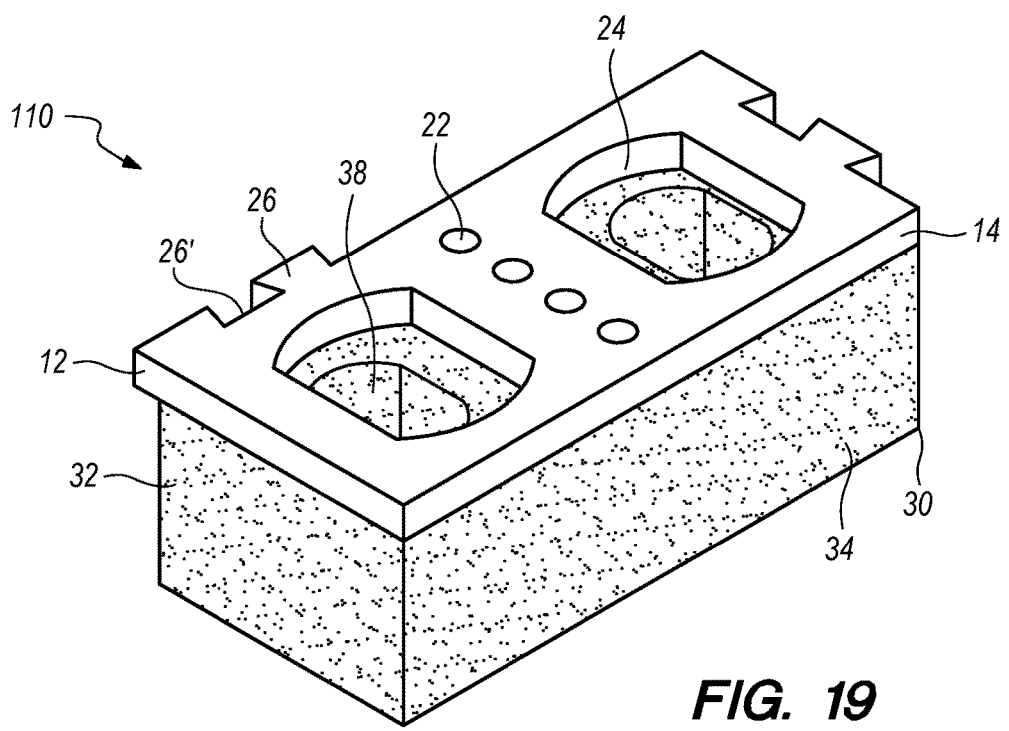
FIG. 19 illustrates a perspective view of a J BIM.

FIG. 19 illustrates a perspective view of a J-BIM 110 joined with a block 30 to form a BIM ready building unit 40. As shown, the BIM 20 is configured as an J-BIM 110. The J-BIM 110 has two legs 18 extending from a side 14', wherein the legs 18 extend are generally perpendicular relative to the upper face 16, such that the J-BIM 110 resembles the letter "J". The J-BIM 110 may also include two legs 18 on end face 12'.

Figure 20:
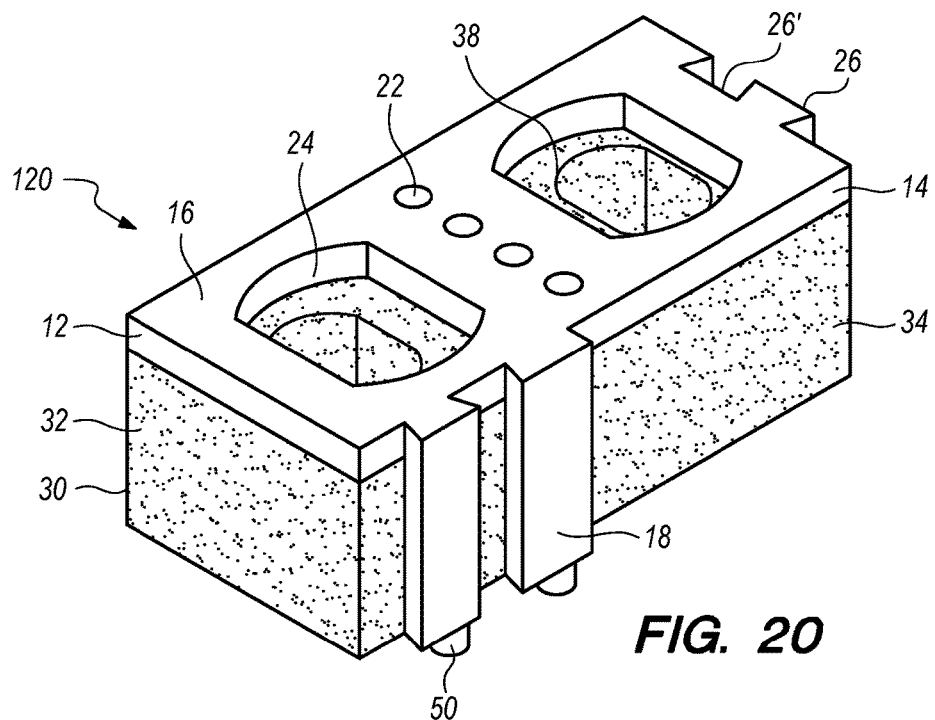
FIG. 20 illustrates a perspective view of an L-BIM.

FIG. 20 illustrates a perspective view of an L-BIM 120 joined with a block 30 to form a BIM ready building block unit 40. As shown, the BIM 20 is configured as an L-BIM 120. The L-BIM 120 has two legs 18 extending from a bottom portion of side 14, such that the L-BIM 120 resembles the letter "L". The L-BIM 120 may also include two legs 18 on an end face 12'.

Figure 21:
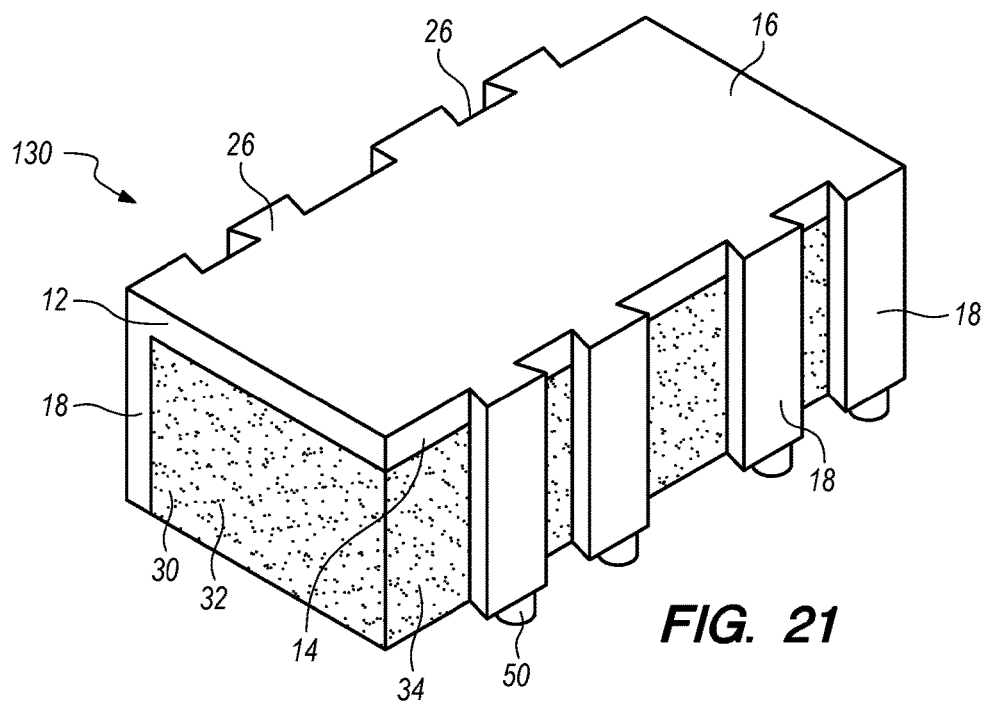
FIG. 21 illustrates a perspective view of an X-BIM right side.

FIG. 21 illustrates a perspective view of an X-BIM 130 joined with a block 30 to form a BIM ready building unit 40. As shown the BIM 20 is configured as an X-BIM 130. The X-BIM 130 has two sets of four legs 18, with a first set of four legs 18 extending from side 14 and a second set of four legs 18 extending from side 14', wherein the legs 18 extend are generally perpendicular relative to the upper face 16, such that the X-BIM 130 resembles the letter "X".

Figure 22:
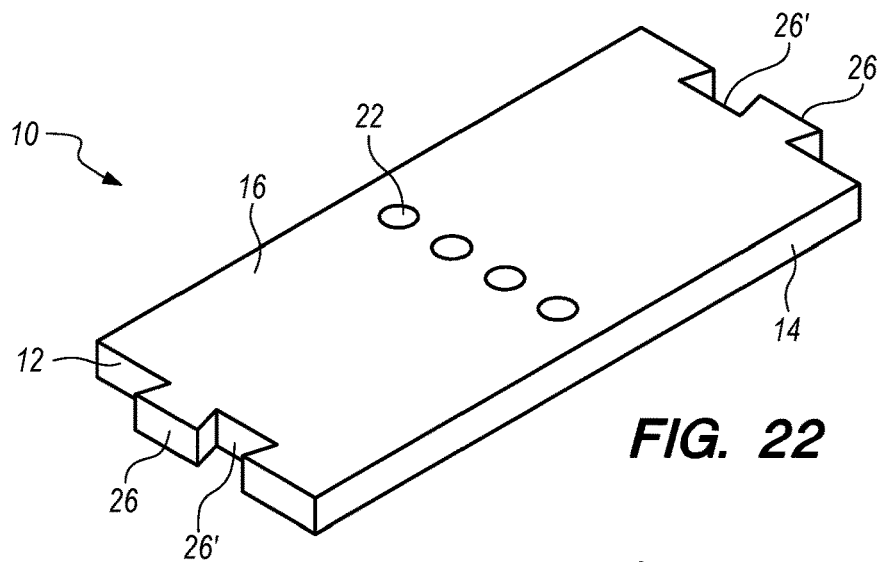
FIG. 22 illustrates a perspective view of a Layout BIM.

FIG. 22 illustrates the Layout BIM 10 comprising two end faces 12, 12', two side faces 14, 14' and an upper face 16 and a lower face 16'. The Layout BIM 10 as shown further includes four aligned apertures positioned generally in the center of the upper face 16, along a width of the center of the upper face 16. The Layout BIM 10 further includes trapezoidal extensions 26 and trapezoidal joints extending from end faces 12, 12'.

Figure 23:
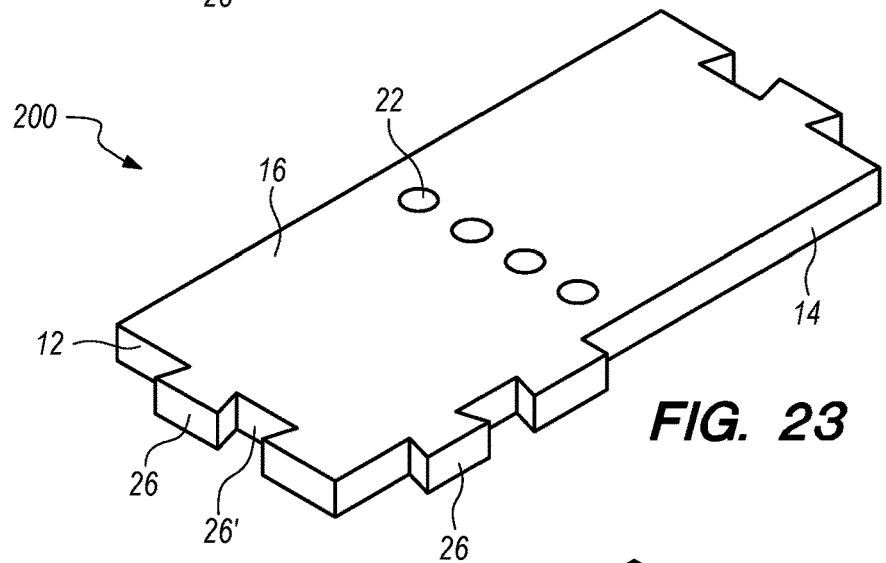
FIG. 23 illustrates a perspective view of a Layout b-BIM.

FIG. 23 illustrates a perspective view of a Layout b-BIM 200. As shown, the b-Layout BIM 200 has two trapezoidal extensions 26 that extend from a bottom section of the side face 14, such that the Layout b-BIM 200 resembles the letter "b" in lowercase. The Layout b-BIM 200 also includes two trapezoidal extensions 26 on end face 12'. The Layout b-BIM 200 may also additionally include two trapezoidal extensions 26 on end face 12. The Layout b-BIM 200 further includes four aligned apertures 22 positioned generally in the center of the upper face 16, along a width of the center of the upper face 16. The Layout b-BIM 200 further includes trapezoidal joints 26' extending from end faces 12, 12' and bottom section of the side face 14. The trapezoidal extensions 26 form trapezoidal joints 26'.

Figure 24:
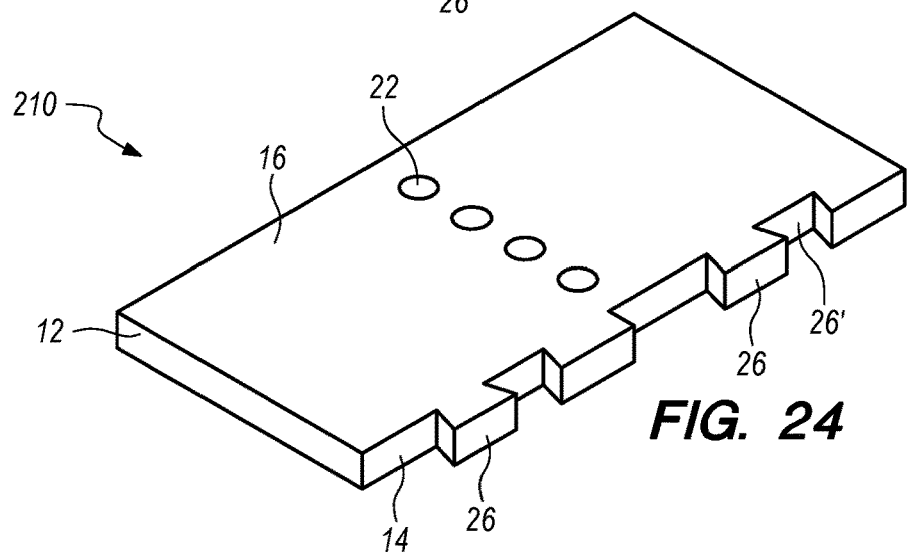
FIG. 24 illustrates a perspective view of a Layout C-BIM.

FIG. 24 illustrates a perspective view of a Layout C-BIM 210. As shown, the Layout C-BIM 210 has two trapezoidal extensions 26 that extend from a top portion of side face 14 and two trapezoidal extensions 26 that extend from a bottom portion of side face 14, such that the Layout C-BIM 210 resembles the letter "C". The trapezoidal extensions 26 form trapezoidal joints 26'.

Figure 25:
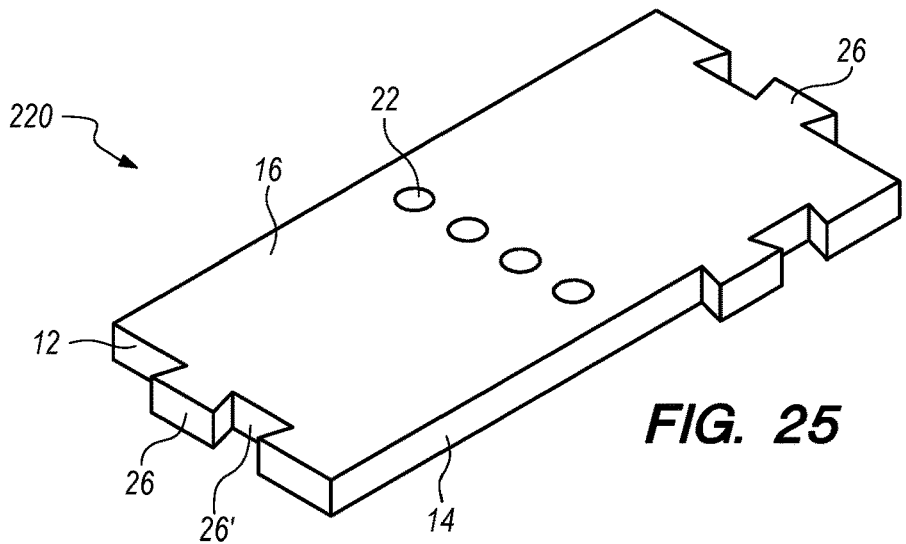
FIG. 25 illustrates a perspective view of a Layout F-BIM.

FIG. 25 illustrates a perspective view of a Layout F-BIM 220. The Layout F-BIM 220 has two trapezoidal extensions 26 that extend from a top section of side face 14, such that the Layout F-BIM 220 resembles the letter "F". The Layout F-BIM 220 may additionally also include two trapezoidal extensions 26 on end face 12' and two trapezoidal extensions 26 on end face 12. The trapezoidal extensions 26 form trapezoidal joints 26'

Figure 26:
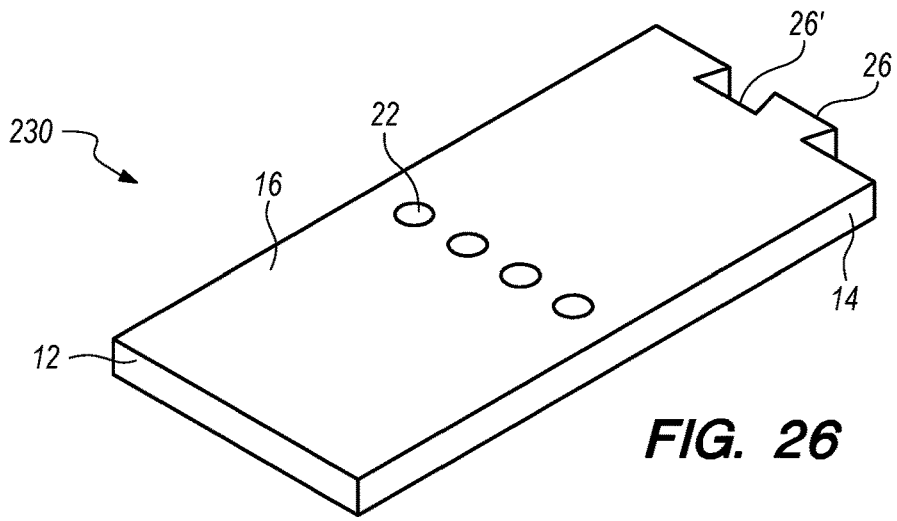
FIG. 26 illustrates a perspective view of a Layout i-BIM.

FIG. 26 illustrates a perspective view of a Layout i-BIM 230. The Layout i-BIM 230 has two trapezoidal extensions 26 extending from one of the end faces 12, such that when the Layout i-BIM 230 is in an upright position, the Layout i-BIM 230 resembles the letter "i". The trapezoidal extensions 26 form trapezoidal joints 26'.

Figure 27:
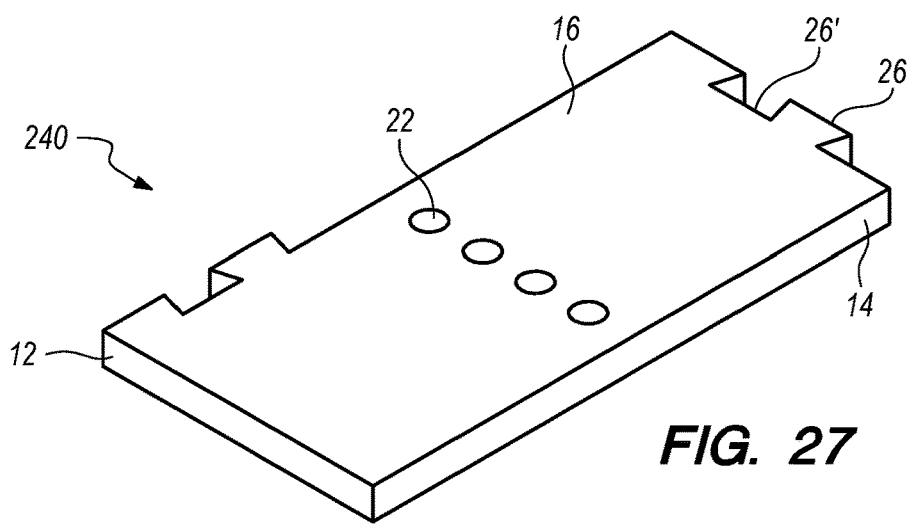
FIG. 27 illustrates a perspective projection of a Layout J-BIM.

FIG. 27 illustrates a perspective projection of a Layout J-BIM 240. The Layout J-BIM 240 has two trapezoidal extensions 26 extending from a bottom section of side face 14', such that the Layout J-BIM 240 resembles the letter "J". The Layout J-BIM 240 may additionally also includes two trapezoidal extensions 26 on end face 12'. The trapezoidal extensions 26 form trapezoidal joints 26'.

Figure 28:
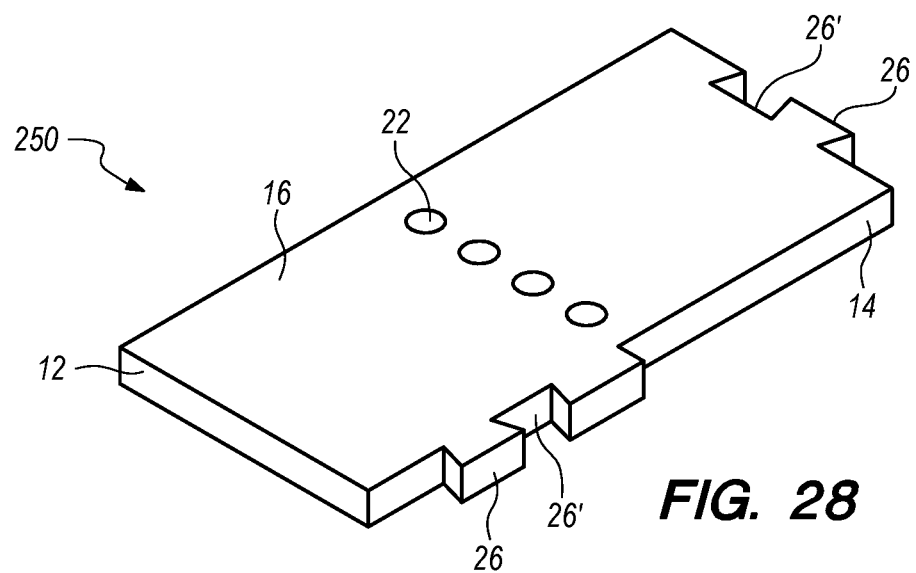
FIG. 28 illustrates a perspective projection of a Layout L-BIM.

FIG. 28 illustrates a perspective projection of a Layout L-BIM 250. The Layout L-BIM 250 has two trapezoidal extensions 26 that extend from a bottom section of side face 14, such that the Layout L-BIM 250 resembles the letter "L". The Layout L-BIM 250 may additionally also includes two trapezoidal extensions 26 emanating from end face 12'.

Figure 29:
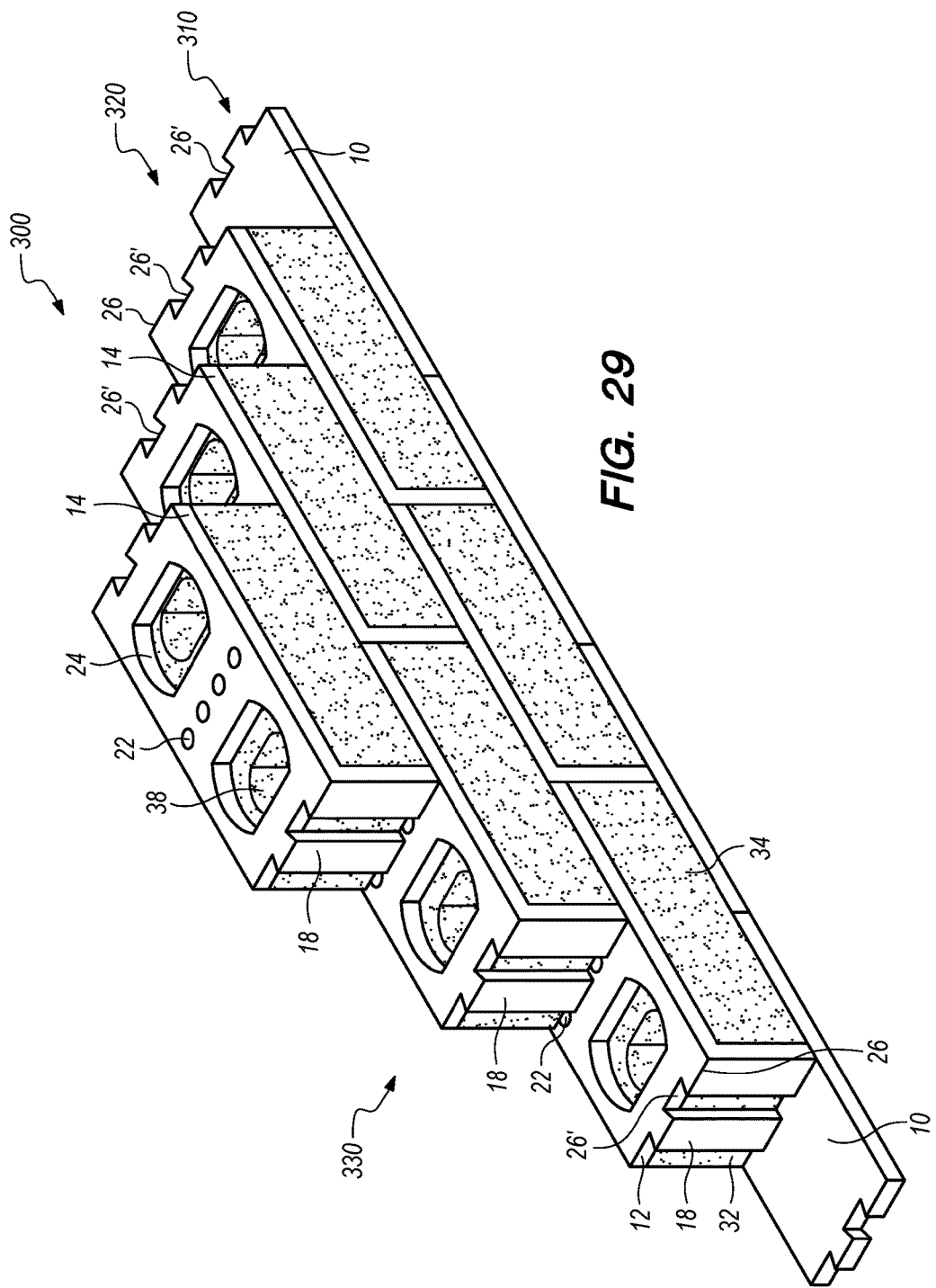
FIG. 29 illustrates a perspective projection of a Single Wythe Wall formed with a plurality of layout and block interlocking modules.
Figure 30:
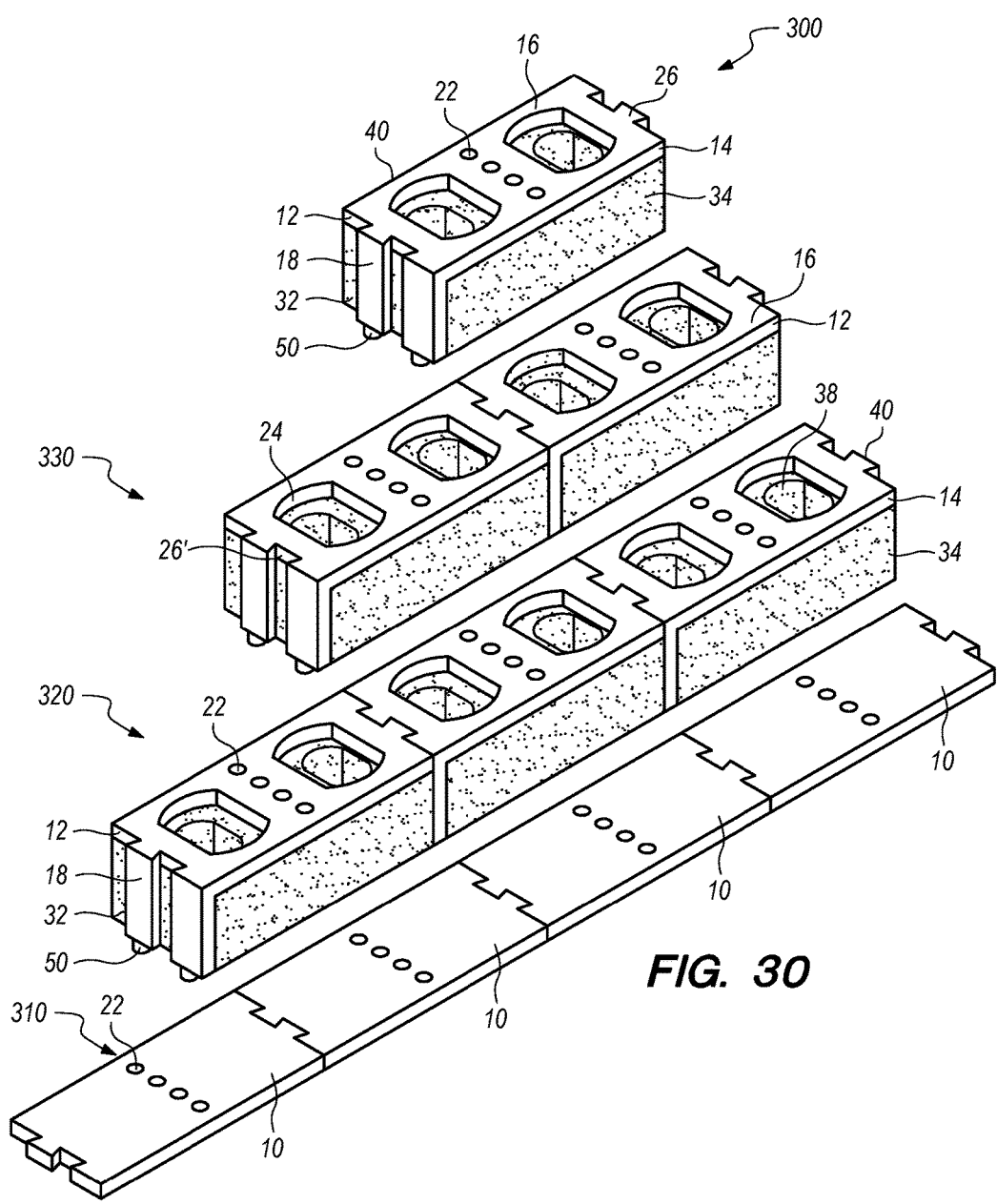
FIG. 30 illustrates an exploded perspective projection of the Single Wythe Wall of FIG. 29.

FIGS. 29-30 illustrate a perspective view and exploded view respectively, of a Single Wythe wall 300 formed with a plurality of interlocking Layout BIMs 10 and BIM ready building units 40.

Referring now to FIGS. 29-30, there is shown a Single Wythe wall 300 formed of multiple layers of block interlocking modular (BIM) ready building units 40 and a layer of interlocking Layout BIMs 10. As illustrated, a first layer 310 of the Single Wythe Wall 300 is formed using a plurality of interlocking Layout BIM's 10. As will be understood by one reasonably skilled in the art, the first layer 310 may be anchored to a flooring surface.

The Layout BIMs 10 interlock via the trapezoidal extensions 26 and trapezoidal joints 26' including dovetail-tails and dovetail-sockets. A second layer 320 of the Single Wythe wall 300 is formed using a plurality of block interlocking modular (BIM) building units 40. Each block interlocking modular (BIM) building unit 40 includes a building block 30, such as a brick, glass block or the like and a BIM 20. The BIM's 20 of each block interlocking modular (BIM) ready building unit 40 interlock via the trapezoidal extensions 26 and trapezoidal joints 26' including dovetail-tails and dovetail-sockets. The pins 50 at the end of the legs 18 of the BIM's 20 are inserted into the perforations 22 of the Layout BIM's 10. The pins 50 interlock permanently or lock in a manner that is secure while still allowing disassembly of the BIM units 40. The third layer 330 of the Single Wythe wall 300 is similarly formed using a plurality of block interlocking modular building (BIM) units 40. Pins 50 at the end of the legs 18 of the BIM's 20 of the third layer 330 are inserted into the perforations 22 of the BIM's 20 of the second layer 320. As shown in FIG. 3, a first block interlocking modular (BIM) building unit 40 interlocks with a second block interlocking modular (BIM) building unit 40 beneath the first modular building unit 40, when pins 50 of legs 18 of the first BIM unit 40 interlock with one or more perforations 22 of the second BIM unit 40. As will be appreciated by one reasonably skilled in the art two parallel Single Wythe walls 300 separated at a distance of half a building, or one building unit, provides the space necessary to install plumbing of a residential or commercial building.

Figure 31:
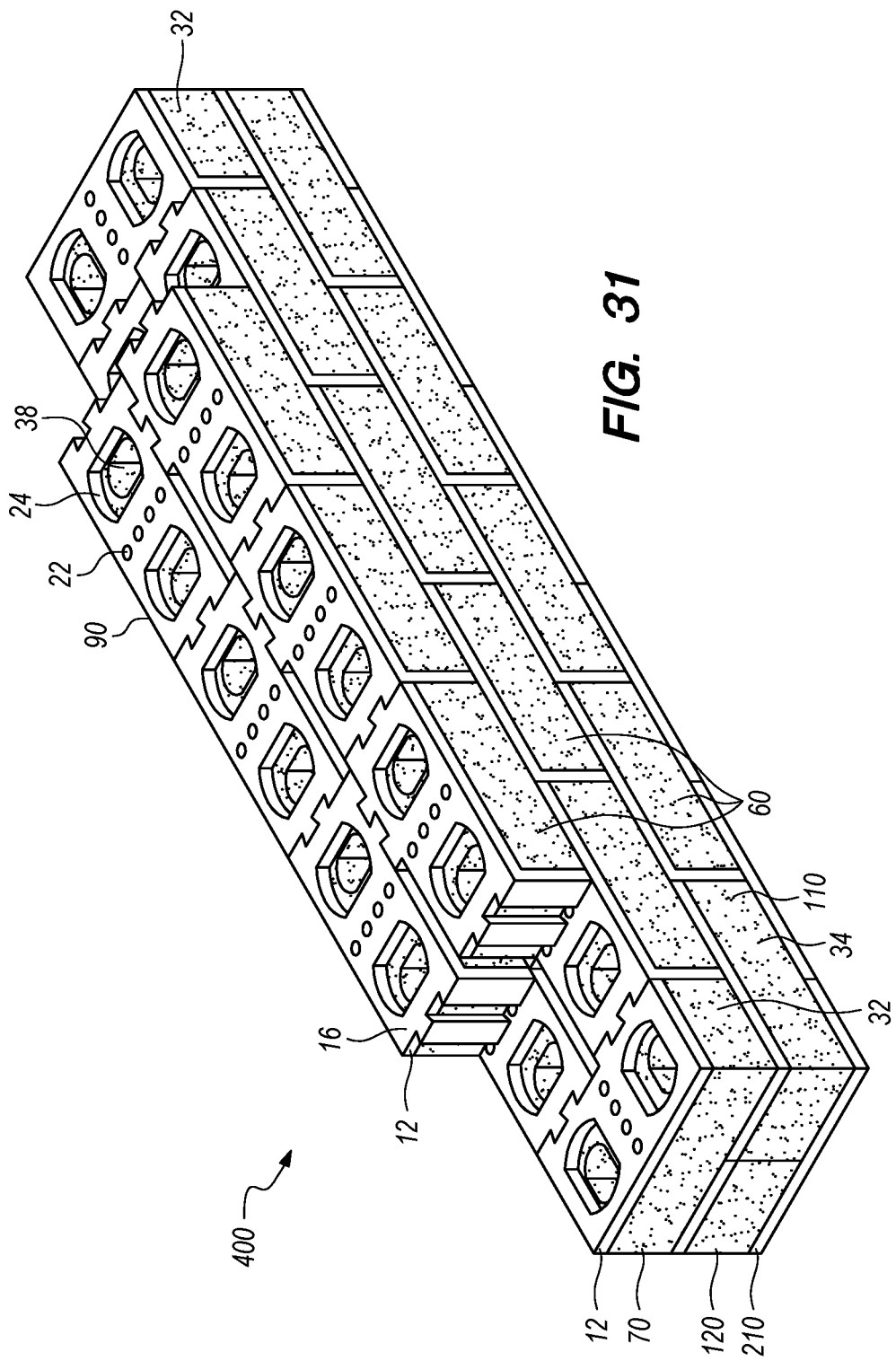
FIG. 31 illustrates a perspective view of a Double Wythe Wall formed with a plurality of layout and block interlocking modules.
Figure 32:
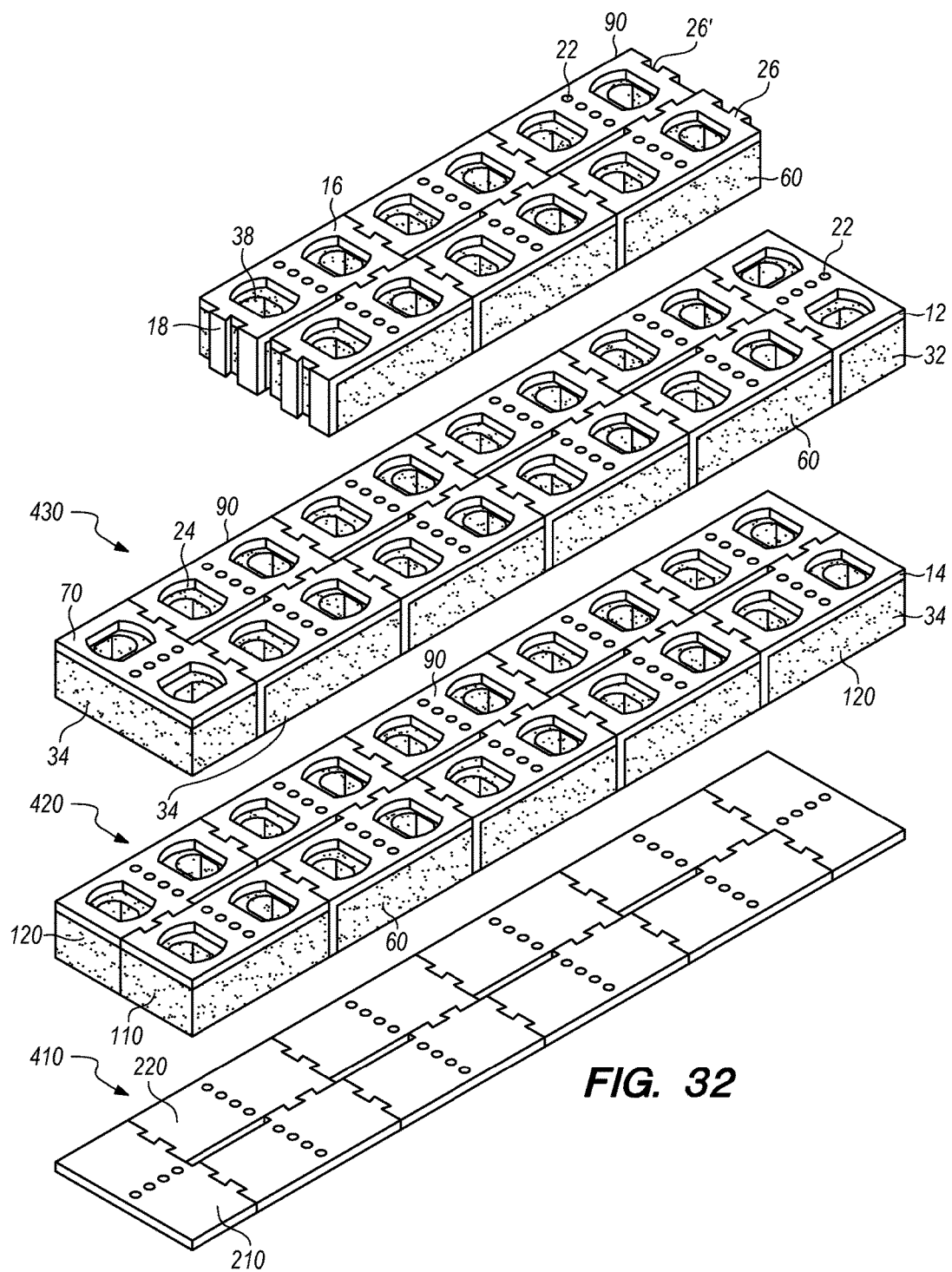
FIG. 32 illustrates an exploded perspective view of the Double Wythe Wall of FIG. 31.

FIGS. 31-32 illustrate a perspective view and an exploded view respectively of a Double Wythe Wall 400 formed with a plurality of interlocking Layout BIMs 10 and BIM ready building block units 40.

Referring now to FIGS. 31 and 32, there is shown a generally vertical Double Wythe wall 400 wherein a first layer 410 of the Double Wythe wall 400 is built using a plurality of Layout b-BIMs 200 and Layout F-BIMs 220 and wherein the first layer 410 is created by rotating the Layout b-BIM 200, at an angle of 180 degrees and wherein the trapezoidal extensions 26 and trapezoidal joints 26' of the Layout b-BIMs 200 and Layout F-BIMs 220 are arranged to interlock. As will be appreciated by one reasonably skilled in the art, the first layer 410 can be anchored to a flooring surface. A Layout C-BIM 70 rotated at an angle of 90 degrees is used at an end of the first layer 410. The second 420, third 430 and subsequent layers are built using a plurality of BIM units 40 comprising b-BIMs 60 and F-BIMs 90 wherein the b-BIMs are rotated at an angle of 180 degrees and wherein the trapezoidal extensions 26 and trapezoidal joints 26' of the BIM ready building units 40 comprising b-BIMs 60 and F-BIMs 90 interlock. As will be appreciated by one reasonably skilled in the art, ends of side layers built with a plurality of b-BIM 60 BIM ready building units 40 and F-BIM 90 BIM ready building units 40 will alternate between ending with a C-BIM 70 BIM ready building unit 40 rotated at an angle of 90 degrees or a J-BIM 110 BIM ready building unit 40 and an L-BIM 120 BIM ready building unit 40.

As will be appreciated by one reasonably skilled in the art, a Double Wythe wall 400 has an opening between the two vertical BIM layers that form a wall that allows the installation of wiring. For example, The Romex brand of Non- Metallic Building Wire ("NM") originated in 1922 developed by the former Rome Wire Company, in combination with the e-BIM can be utilized to perform the electrical wiring of a residential or commercial building that utilizes Double Wythe wall as part of its structure.

Figure 33:
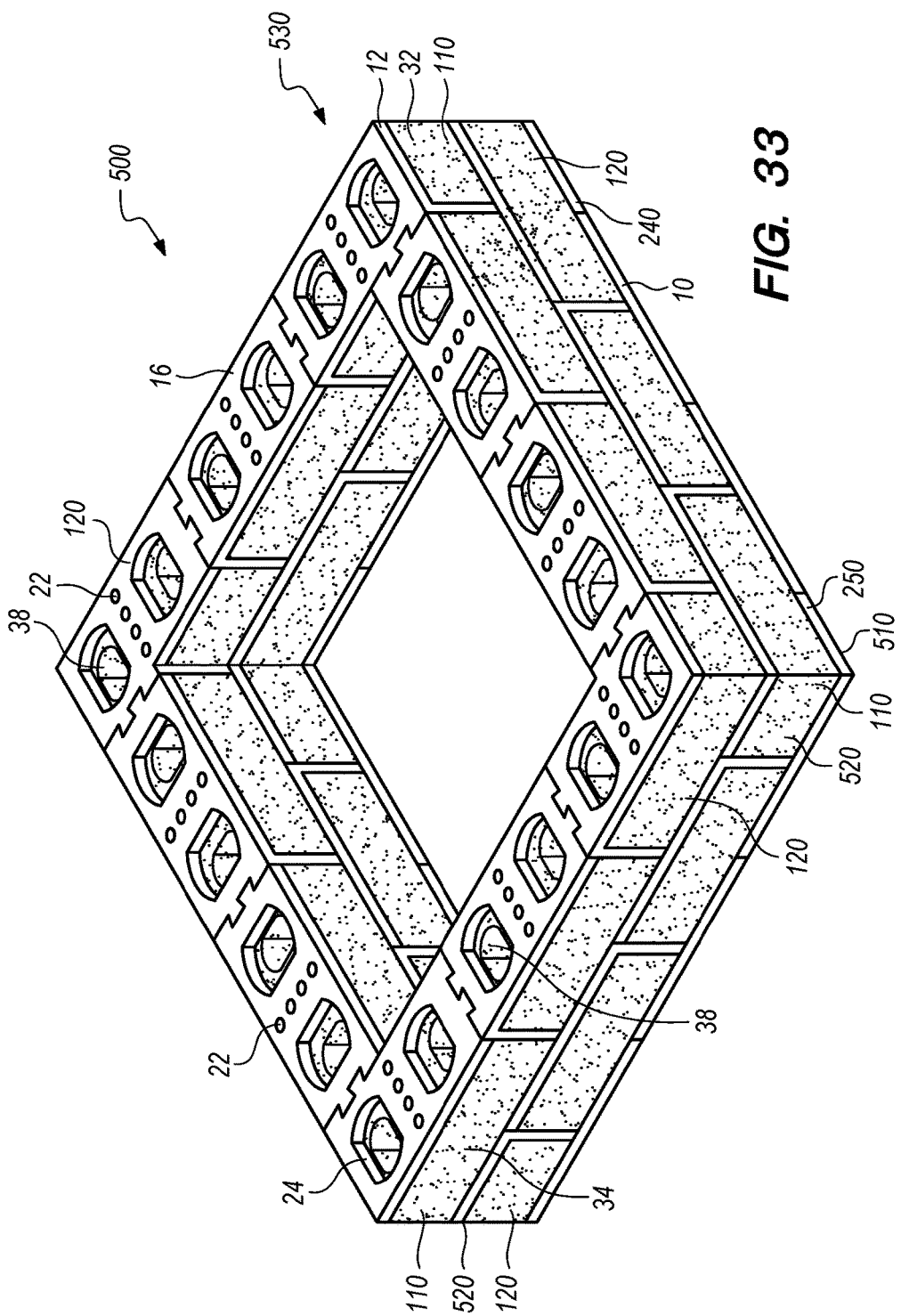
FIG. 33 illustrates a perspective view of a column formed with a plurality of layout and block interlocking modules.
Figure 34:
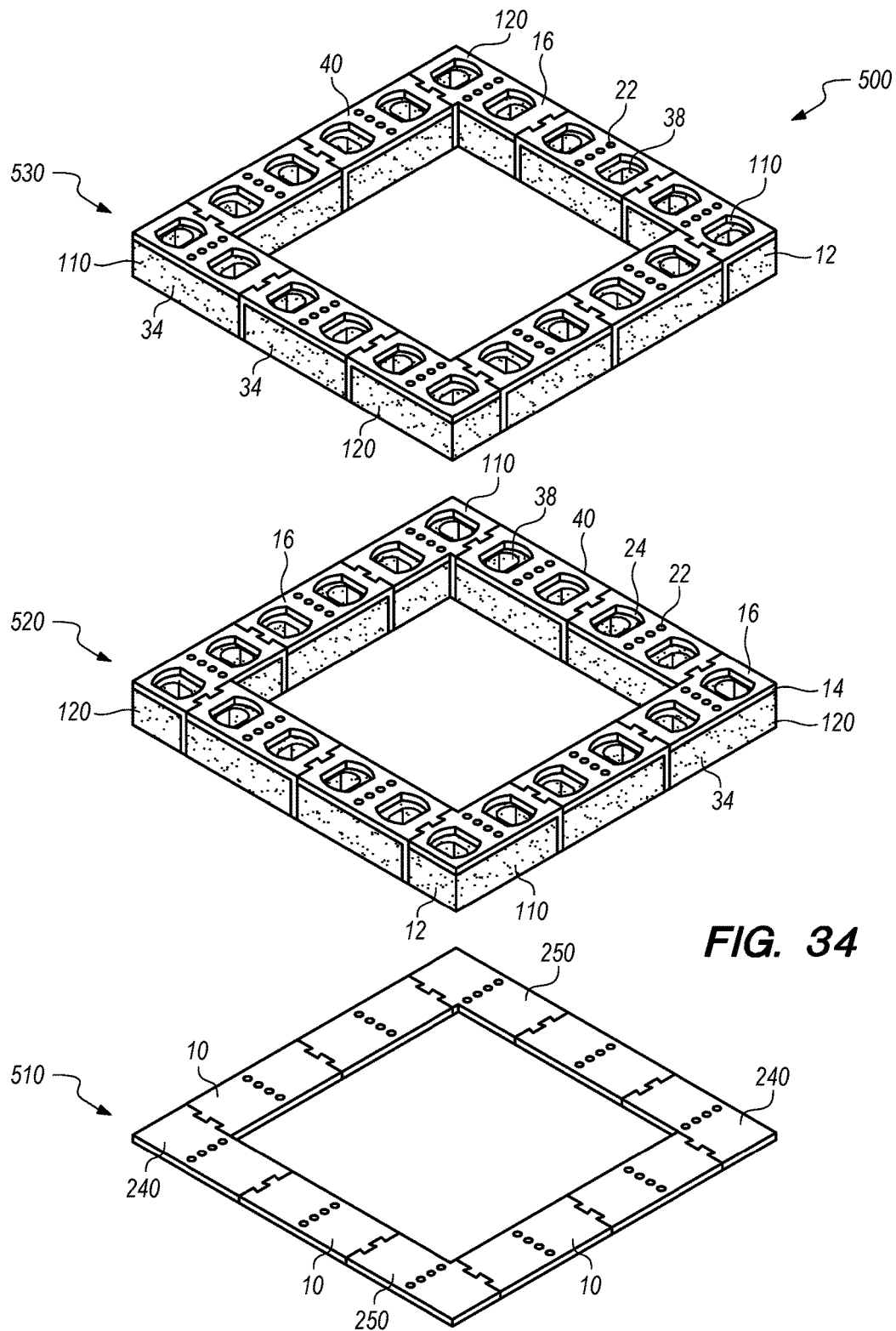
FIG. 34 illustrates an exploded perspective view of the column of FIG. 33.

FIGS. 33-34 illustrate a perspective view and an exploded view respectively of a column 500 formed with a plurality of interlocking Layout BIMs 10 and BIM ready building units 40.

Referring now to FIGS. 3, 33 and 34, there is shown a generally vertical Single Wythe Column 500, wherein a first layer 510 begins with a Layout L-BIM 250, interlocked with a first Layout BIM 10, a Layout J-BIM 240, a second Layout BIM 10, a third Layout BIM 10, a Layout L-BIM 250, a fourth Layout BIM 10, a Layout J-BIM 240, a fifth Layout BIM 10, a sixth Layout BIM 10, and Layout L-BIM 250.

The first layer 510 can be anchored to a flooring surface. The square footage of the column can be increased by adding Layout BIMs 10 in the same quantity to each opposite side of the layout layer 510.

The second layer 520 may be built starting with a BIM ready building unit 40 including a J-BIM 240 to interlock with a Layout L-BIMs 250 and a Layout BIM 10. It is appreciated that pins 50 of the J-BIM 240 will interlock with perforations 22 of the Layout L-BIM 250 while pins 50 at an end face 12 may interlock with perforations 22 of the Layout BIM 10.

When the Layout J-BIM 240 is interlocked within the layout layer 510 then the trapezoidal extensions 26 and trapezoidal joints 26' and pins 50 of a BIM 20 of the BIM ready building unit 40 are interlocked to the trapezoidal extensions 26 and trapezoidal joints 26' and pins 50 of a neighboring BIM 20 of a BIM ready building unit 40, etcetera.

The third layer 530 of the Single Wythe column 500 can be created by forming a second layer 520 of the Single Wythe column 500 and rotating the second layer 520 until the pins 50 of the BIM ready building unit 40 comprising for example a L-BIM 120 interlock with the perforations 22 of the BIM ready building unit 40, comprising for example a J-BIM 110.

Subsequent layers of the Single Wythe column 500 are created repeating the steps detailed to create the second and third layer 520, 530 of the column 500.

Figure 35:
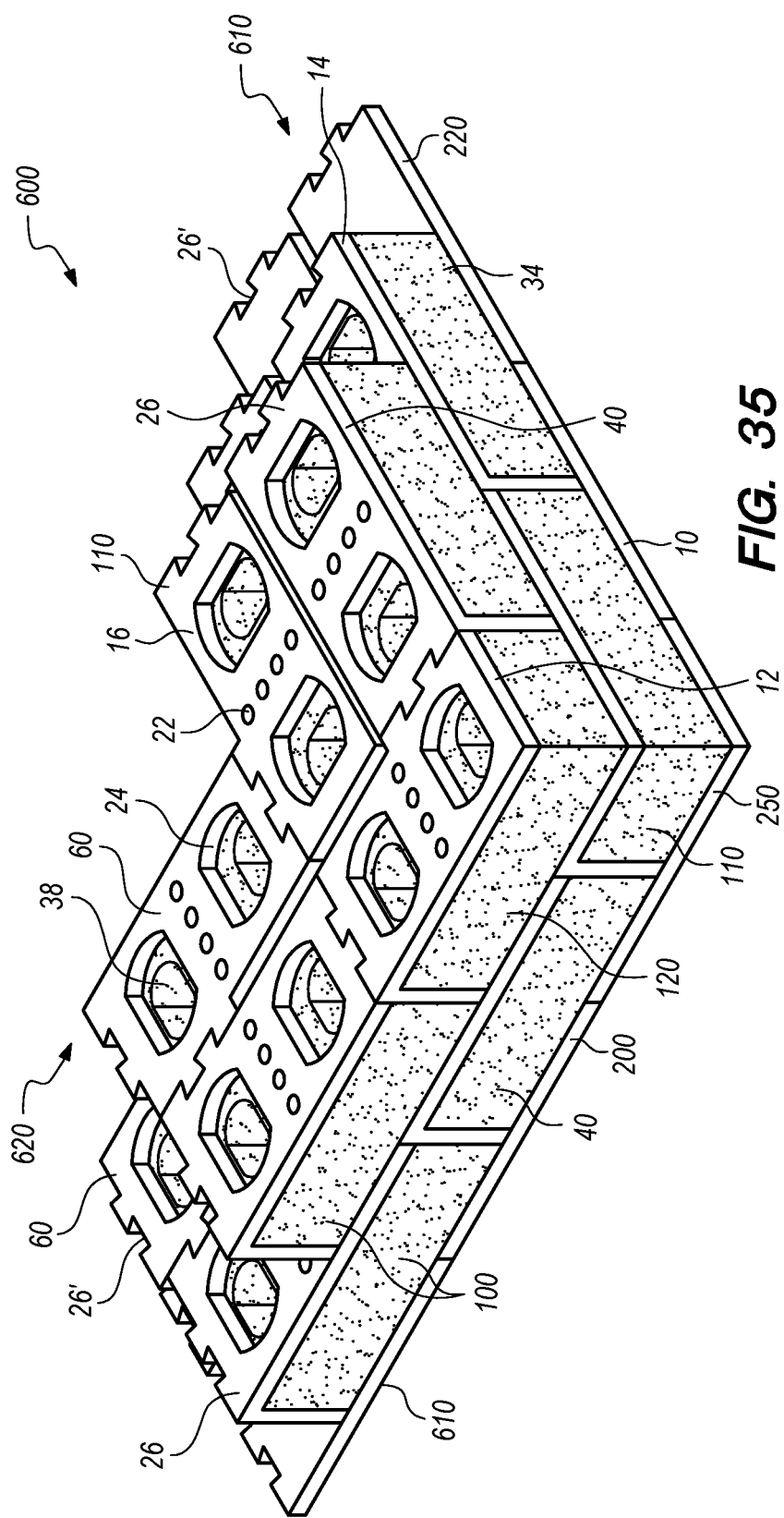
FIG. 35 illustrates a perspective view of a Double Wythe corner formed with a plurality of layout and block interlocking modules.
Figure 36:
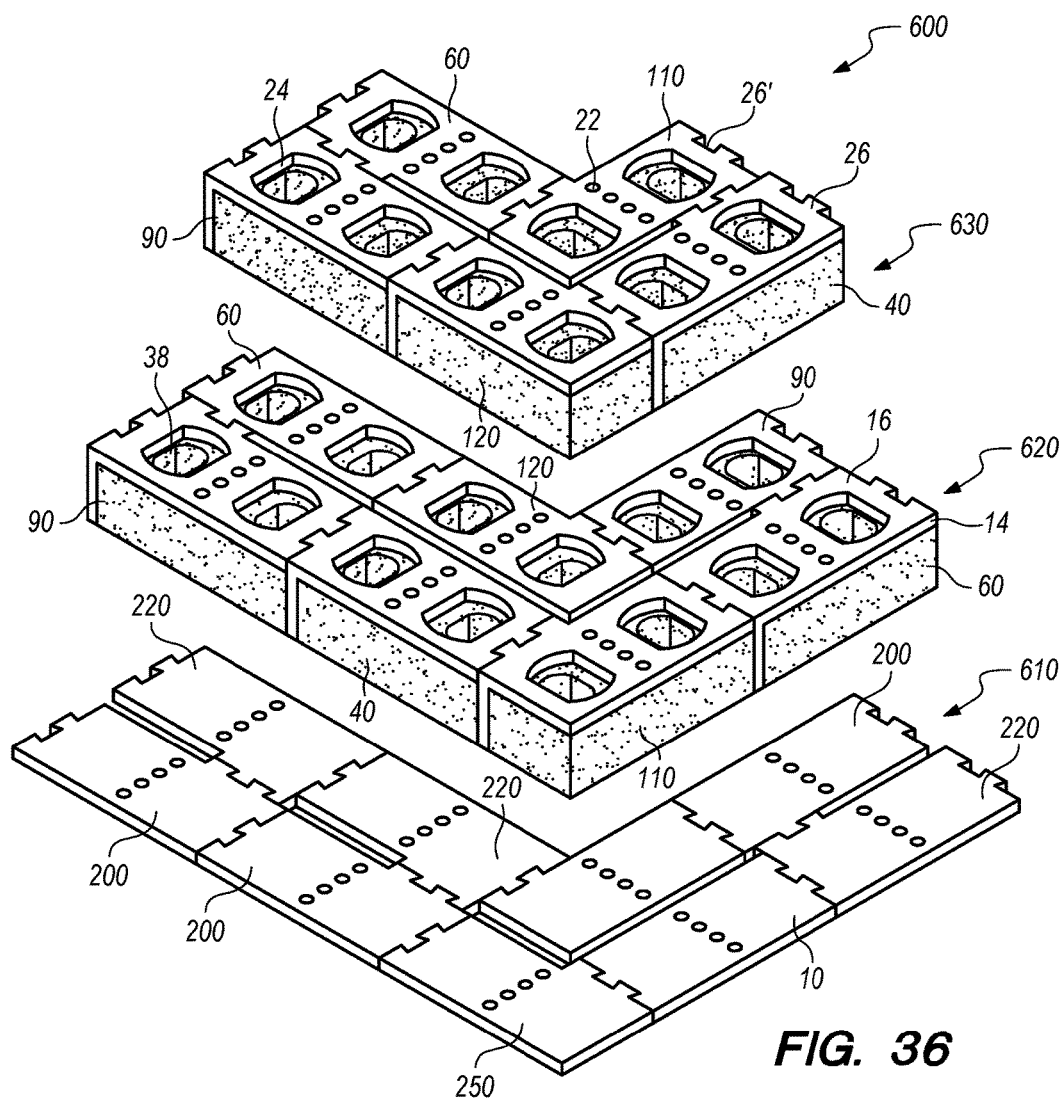
FIG. 36 illustrates an exploded perspective view of the Double Wythe walls corner of FIG. 35

FIGS. 35-36 illustrate a perspective view and an exploded view respectively of a Double Wythe Corner 600 formed with a plurality of interlocking Layout BIMs 10 and BIM ready building units 40.

Referring now to FIGS. 35 and 36, a Double Wythe wall corner 600 is shown being formed of multiple layers of BIM building units 40 comprising BIM's 20 and Layout BIM's 10. The Double Wythe Wall corner 600 as shown, utilizes L-BIMs 120, b-BIMs 60, F-BIMs 90 and J-BIMs 110.

A first layer 610 of the Double Wythe wall corner 600 may be built using a combination of Layout L-BIMs 250, Layout b-BIMs 200, Layout F-BIMs 220 Layout J-BIMs 240 and Layout BIMs 10.

A second layer 620 of the Double Wythe wall corner 600 may be built starting with a modular building unit 40 comprising a J-BIM 110 which interlocks with perforations 22 of a Layout L-BIM 250. Trapezoid extensions 26 and trapezoidal joints 26' of the J-BIM 110 may interlock with a BIM 20 of a first BIM ready building unit 40 and a b-BIM 200 of a second BIM ready building unit 40. The b-BIM 200 of the second BIM ready building unit 40 may interlock with a F-BIM 220 of a third BIM ready building unit 40, which in turn interlocks with an L-BIM 250 of a fourth BIM ready building unit 40.

A third layer of the Double Wythe corner 630 may be built starting with a BIM ready building unit 40 comprising an L-BIM 120 wherein pins 50 of the L-BIM 120 interlock with perforations 22 of the J-BIM 240 of a BIM ready building unit 40 of the second layer 620.

The L-BIM 120 of the BIM ready building unit 40 may also be interlocked to an F-BIM 220 of the BIM ready building unit 40 of the second layer 620, which in turn interlocks to a BIM unit 40 comprising a b-BIM 60 which in turn interlocks to a BIM ready building unit 40 comprising a J-BIM 240 of the second layer 620.

Subsequent layers of the Double Wythe corner 600 are created repeating the aforementioned steps detailed to create the second and third layer of the Double Wythe corner 600.

Figure 37:
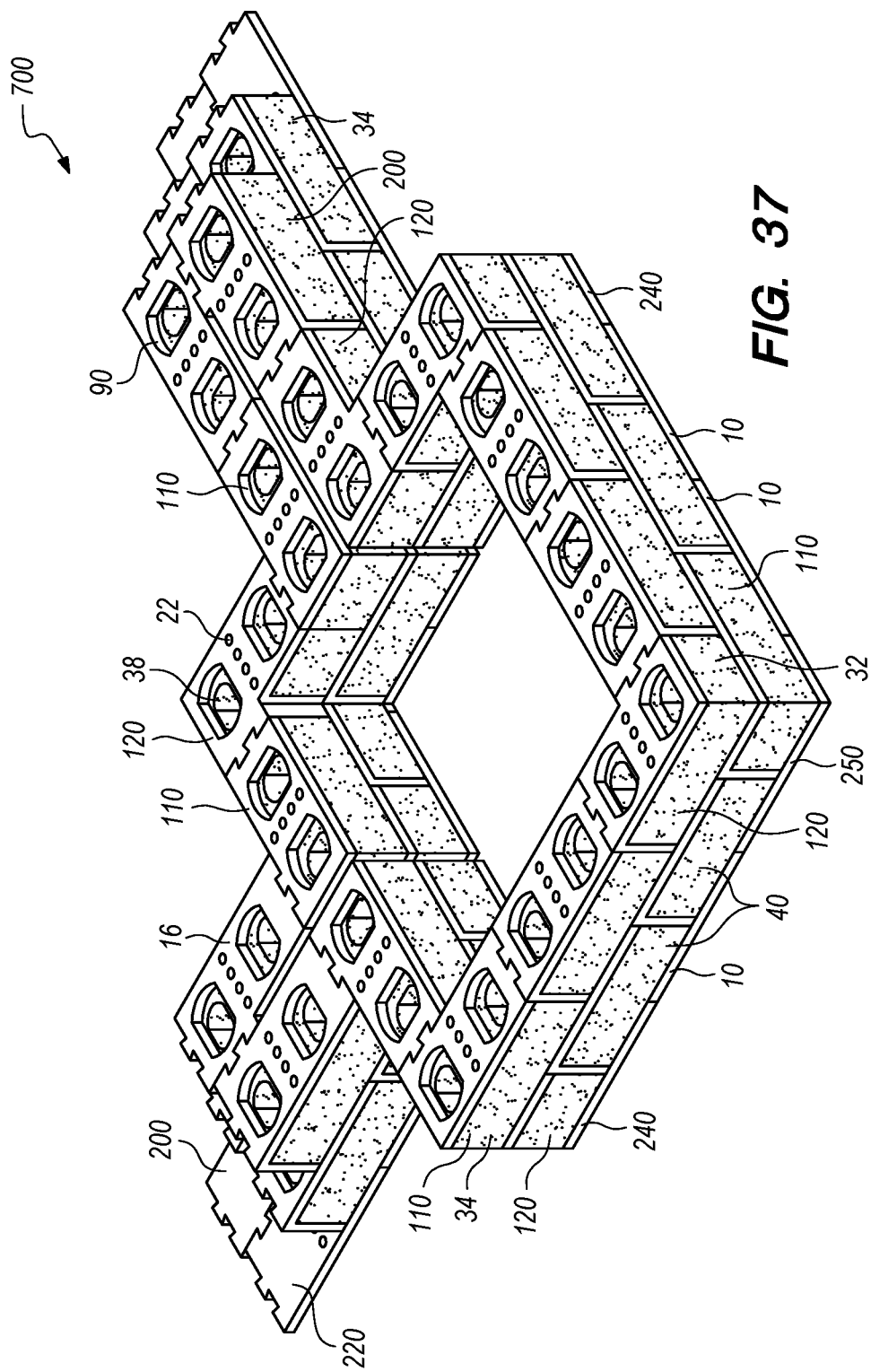
FIG. 37 illustrates a perspective view of a column attached to a single or several Double Wythe walls formed with a plurality of layout and block interlocking modules.
Figure 38:
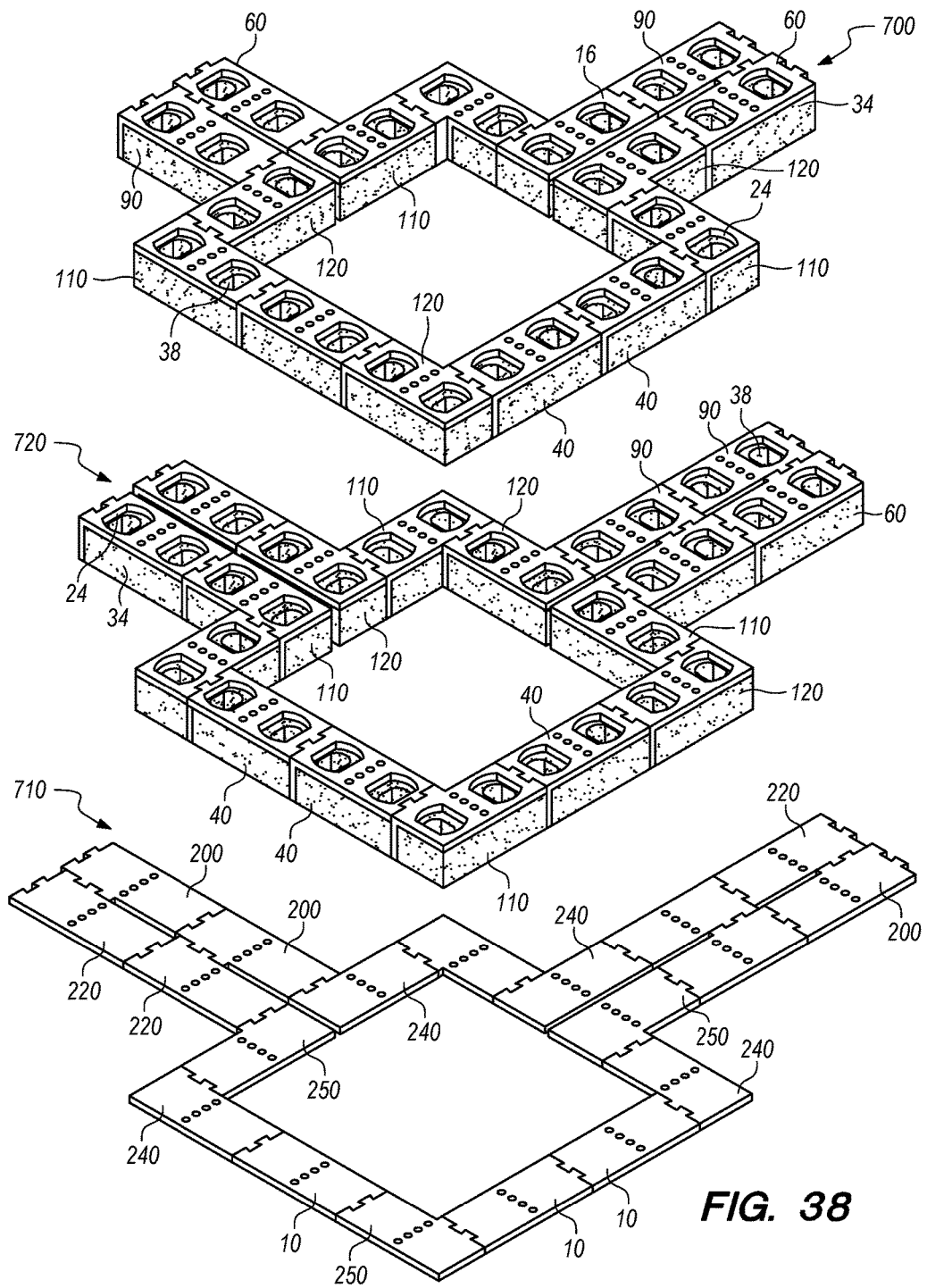
FIG. 38 illustrates an exploded perspective view of columns attached to the Single or several Double Wythe walls formed with a plurality of layout and block interlocking modules of FIG. 37.

FIGS. 37-38 illustrate a perspective view and an exploded view respectively of a column attached to a Single or several Double Wythe Walls 700 formed with a plurality of interlocking Layout BIMs 10 and BIM ready building units 40.

There is shown the column 700 attached to one or more Single 300 or one or more Double Wythe walls 400. As shown, a plurality of BIM ready building units 40 including b-BIMs 60 and a plurality of BIM ready building units 40 including F-BIM's 90 may be used in a second 720 and subsequent layers. A first layer 710 is formed of a plurality of Layout BIMs 10, Layout b-BIMs 200 and Layout F-BIMs 220.

The column 700 may comprise a plurality of BIM ready building units 40 further comprising interlocking J-BIMs 110, L-BIMs 120.

The first layer 710 may include a Layout L-BIM 250 interlocked to a Layout BIM 10, which in turn is interlocked to a Layout J-BIM 240, which in turn is interlocked to a Layout L-BIM 250, which in turn is interlocked to a Layout F-BIM 220, which in turn is interlocked to a Layout b-BIM 200 rotated 180 degrees, which in turn is interlocked to a Layout J-BIM 240 rotated 90 degrees, which in turn is to a Layout L-BIM 250 rotated 180 degrees, which in turn is interlocked to a Layout J-BIM 240 which in turn is interlocked to a Layout F-BIM 220 which in turn is interlocked to a Layout b-BIM 200 rotated 180 degrees, which in turn is interlocked to a Layout L-BIM 250 which in turn is interlocked to a Layout J-BIM 240 which in turn is interlocked to a Layout BIM 10 which in turn is interlocked to another Layout BIM 10 which in turn is interlocked to the Layout L-BIM 250.

The second layer 720 may be built starting with the BIM ready building unit 40 comprising a J-BIM 240 where the J-BIM 240 locks with perforations 22 of the Layout L-BIM 250 and the J-BIM 240 of the modular building unit 40 locks into perforations 22 of the Layout BIM 10.

For example, once the Layout J-BIM 240 is interlocked with the first layer 710, a first BIM building unit 40 comprising the J-BIM 110 interlocks to a second BIM building unit 40 comprising a BIM 20 and a block 30 which in turn interlocks to a third BIM ready building unit 40 comprising a BIM 20 and a block 30 which in turn interlocks to a fourth BIM ready building unit 40 comprising an L-BIM 120, which in turn interlocks to a fifth BIM ready building unit 40 comprising a J-BIM 110.

As will readily be appreciated by one reasonably skilled in the art, the first layer 710, second layer 720 and any subsequent layers may be extended by adding and interlocking one or more of each of, Layout BIMs 10 including but not limited to, Layout b-BIM 200, Layout C-BIM 210, Layout F-BIM 220, Layout i-BIM 230, Layout J-BIM 240, Layout L-BIM 250, and BIM ready building units 40 comprising BIMs 20, including but not limited to, b-BIM 60, C-BIM 70, e-BIM 80, F-BIM 90, i-BIM 100, J-BIM 110, L-BIM 120, X-BIM 130. Thus, walls, columns and other structures may be created by combining the aforesaid Layout BIMs 10 and BIMs 20 in a variety of patterns.

FIGS. 39-40 illustrates a perspective view and a cross sectional view, respectively of a brick 30. The brick 30 includes upper and lower faces 36, 36', end faces 32, 32' and side faces 34, 34'. The brick 30 further includes one or more cavities 38. As shown, the brick 30 includes three cavities 38 on the upper face 36. The brick 30 further includes two trapezoidal cuts 39 along a length of an upper face 36 of the brick 30, wherein a first trapezoidal cut 39 is positioned along the length of the upper face 36 proximate to the side face 34 of the brick 30. A second trapezoidal cut 39 is positioned at a distance from the first trapezoidal cut 39 and is positioned along the length of the upper face 36 proximate to side 34' of the brick 30.

Figure 41:
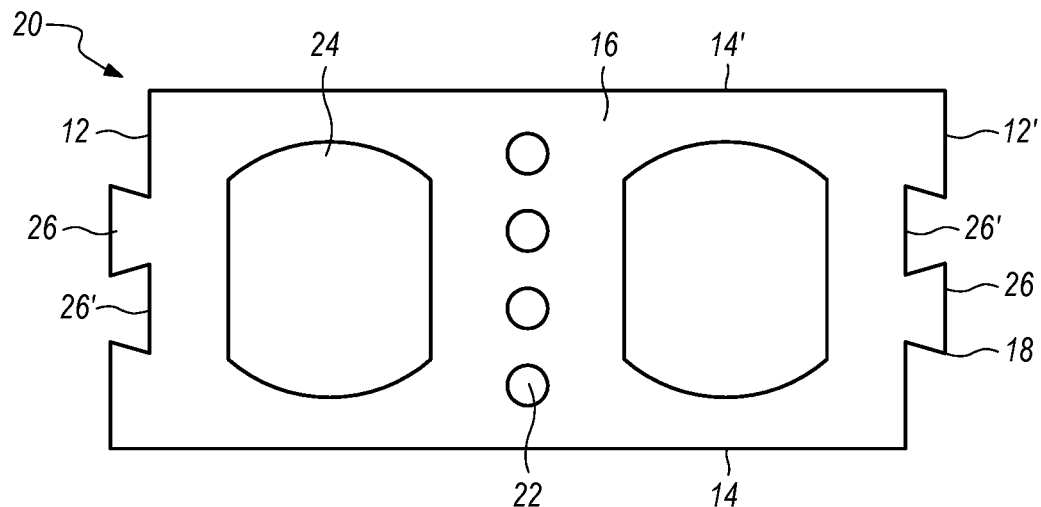
FIG. 41 illustrates a top view of a BIM.

FIG. 41 illustrates a top view of the BIM 20. There is shown the upper face 16, side faces 14, 14' and end faces 12, 12'. Apertures 22 are aligned and positioned generally in the center of the upper face 16 along a width of the center of the upper face 16. The end faces 12, 12' of the BIM 20 include trapezoidal extensions 26 and trapezoidal joints 26'. Cut-out perforations 24 are positioned on either side of the perforations 22.

Figure 42:
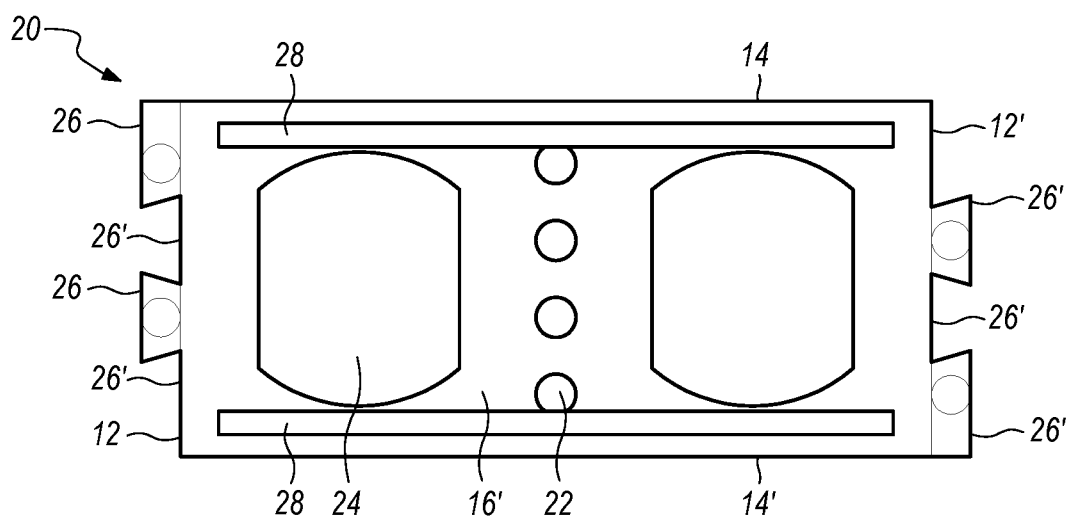
FIG. 42 illustrates a bottom view of a BIM.

FIG. 42 illustrates a bottom view of the BIM 20. There is shown the lower face 16', side faces 14, 14' and end faces 12, 12'. Apertures 22 are aligned and positioned generally in the center of the upper face 16 along a width of the center of the upper face 16. The end faces 12, 12' of the BIM 20 include trapezoidal extensions 26 and trapezoidal joints 26'. Cut-out perforations 24 are positioned on either side of the perforations 22. Ribs 28 are positioned on the lower face 16'. The ribs 28 are positioned along a length of the lower face 16' wherein a first rib 28 is positioned along the length of the lower face 16' proximate to side face 14 and a second rib 28 is positioned at a distance from the first rib 28 and is positioned along the length of the lower face 16' proximate to side dace 14' of the BIM 20.

Figure 43:
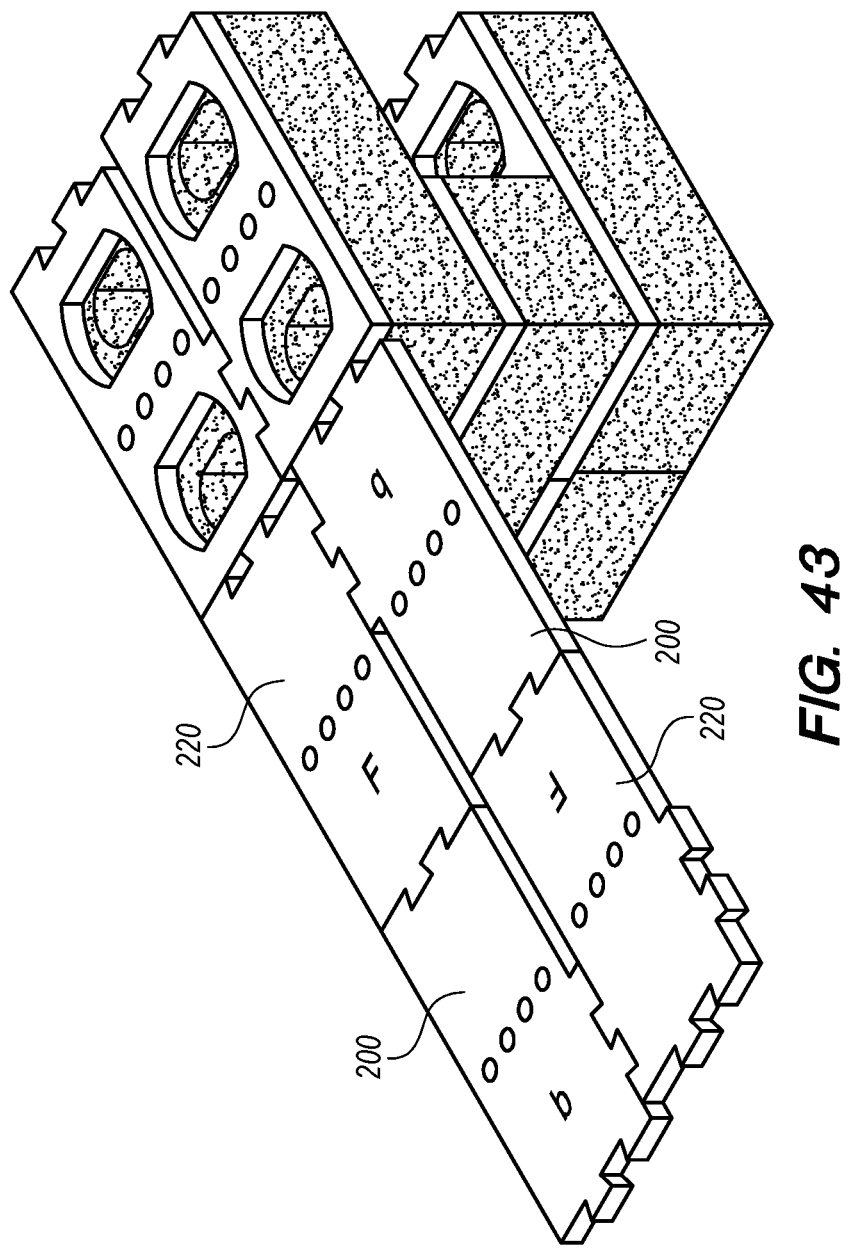
FIG. 43 illustrates a perspective view of a window opening for Double Wythe wall.

FIG. 43 illustrates a door opening for a Double Wythe Wall 400 formed by a plurality of lintel BIMs 140 and two Lintel End-BIMs 150.

Figure 44:
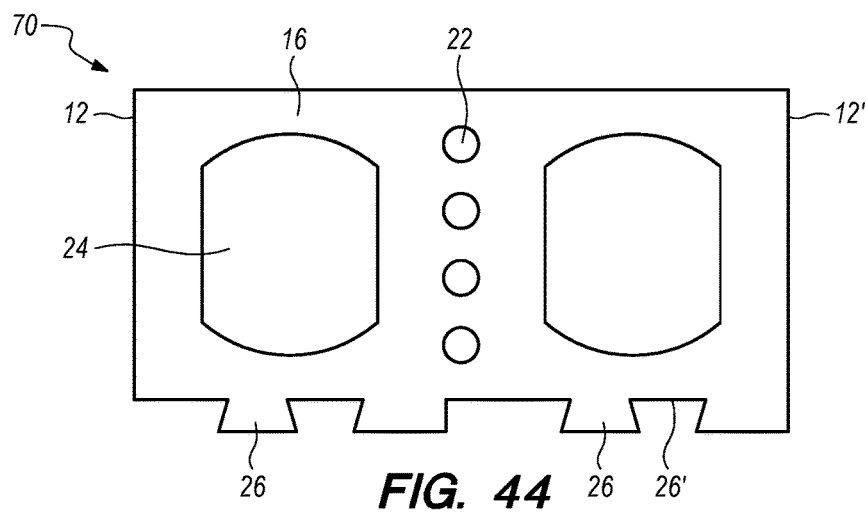
FIG. 44 illustrates a top view of a C-BIM.

FIG. 44 illustrates a top view of a Layout C-BIM 210. The Layout C-BIM 210 has two trapezoidal extensions 26 that extend from a top portion of side face 14 and two trapezoidal extensions 26 that extend from a bottom portion of side face 14, such that the Layout C-BIM 210 resembles the letter "C". The trapezoidal extensions 26 form trapezoidal joints 26'.

FIGS. 45-46 illustrate a front view and a top sectional view of the e-BIM 80 of FIGS. 15 and 16.

Figure 47:
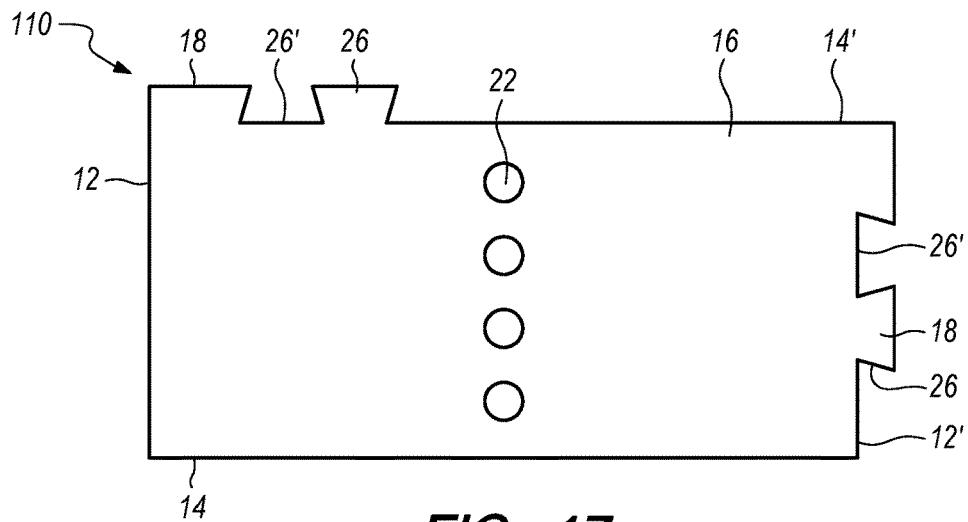
FIG. 47 illustrates a top view of a J-BIM.

FIG. 47 illustrates a top view of a J-BIM 110. The J-BIM 110 includes trapezoidal extensions 26 and trapezoidal joints 26'. Two legs 18 emanate from trapezoidal joints 26. The legs extend in a perpendicular direction relative to the upper face 16. The legs 18 and trapezoidal joints 26 extend from a bottom side 14', in a perpendicular direction relative to the upper face 16, such that the J-BIM 110 resembles the letter "J". The J-BIM 110 may also include two legs 18 emanating from trapezoidal joints 26 extending on end face 12'. The legs 18 extend in a perpendicular direction relative to the upper face 16.

Figure 48:
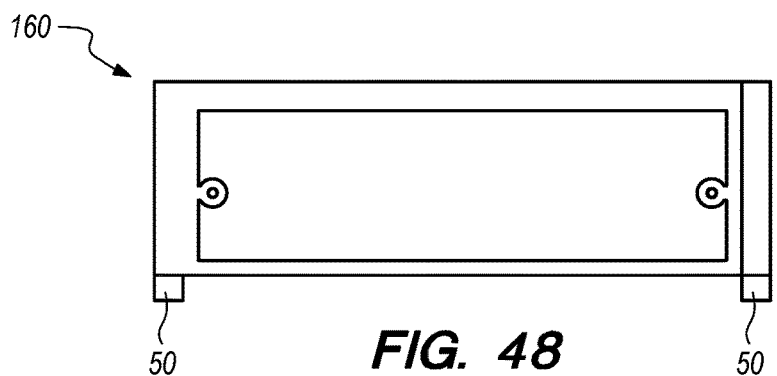
FIG. 48 illustrates a front view of the box-BIM of FIG. 53.
Figure 49:
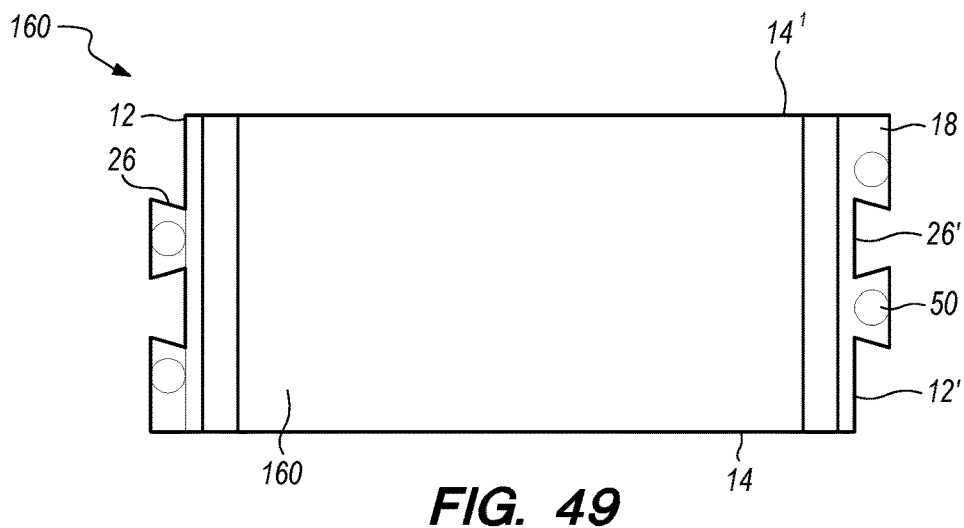
FIG. 49 illustrates a top view of a box-BIM.
Figure 53:
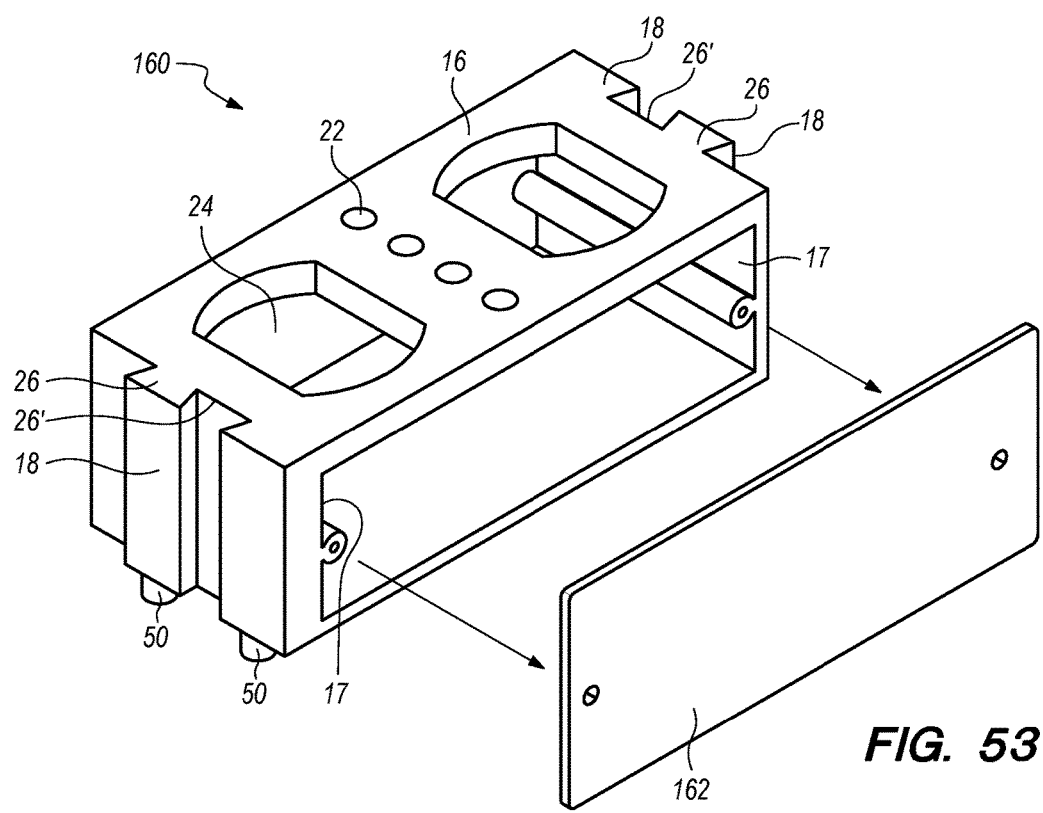
FIG. 53 illustrates a perspective view of a box-BIM with plate and screws.

FIGS. 48-49 illustrate a front view and a top view, respectively, of the box-BIM 160 of FIG. 53.

Figure 50:
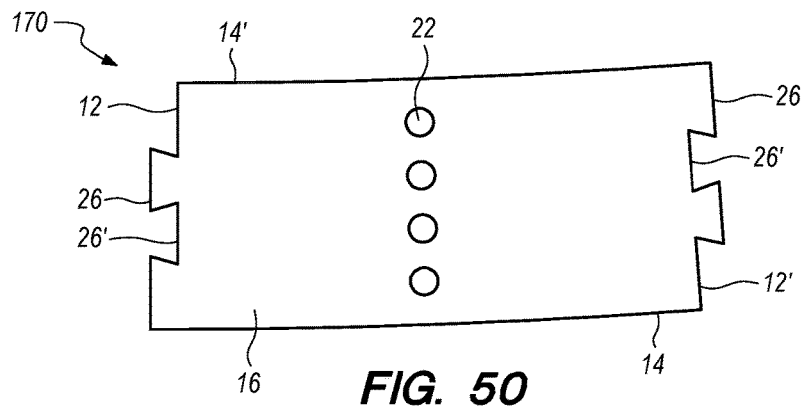
FIG. 50 illustrates a top view of an arc-BIM.

FIG. 50 illustrates a top view of an arc-BIM 170. There is shown the upper face 16, including apertures 22 generally aligned in the center of the upper face 16, along a width of the upper face 16. The arc-BIM 170 further includes end faces 12, 12' and side faces 14, 14'. Trapezoidal extensions 26 and trapezoidal joints 26' extend from end faces 12, 12'. Legs 18 emanate from the trapezoidal extensions 26 and extend in a generally perpendicular direction relative to the upper face 16.

Figure 51:
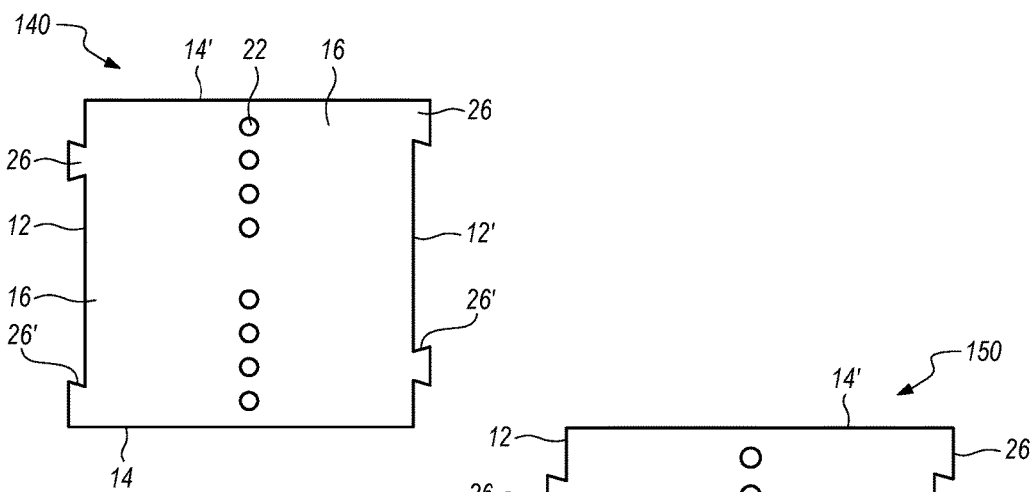
FIG. 51 illustrates a top view of a Lintel-BIM.

FIG. 51 illustrates a top view of a Lintel-BIM 140. The Lintel-BIM 140 as shown includes eight apertures 22 generally aligned in the center of the upper face 16, along a width of the upper face 16. The Lintel-BIM 140 further includes end faces 12, 12' and side faces 14, 14'. Trapezoidal extensions 26 and trapezoidal joints 26' extend from end faces 12, 12'. Legs 18 emanate from the trapezoidal extensions 26 and extend in a generally perpendicular direction relative to the upper face 16.

Figure 52:
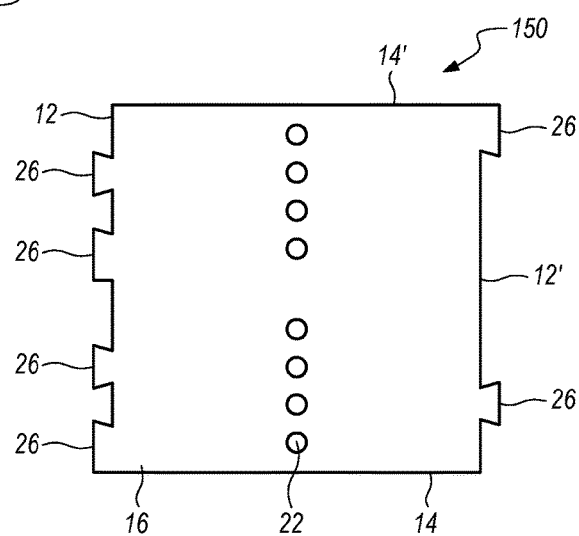
FIG. 52 illustrates a top view of a Lintel End-BIM.

FIG. 52 illustrates a top view of a Lintel End-BIM 150. The Lintel End-BIM 150 as shown includes eight apertures 22 generally aligned in the center of the upper face 16, along a width of the upper face 16. The Lintel-BIM 140 further includes end faces 12, 12' and side faces 14, 14'. Trapezoidal extensions 26 and trapezoidal joints 26' extend from end faces 12, 12'. Legs 18 emanate from the trapezoidal extensions 26 and extend in a generally perpendicular direction relative to the upper face 16.

FIG. 53 illustrates a perspective view of a box-BIM 160 with cover plate 162 and screws.

Figure 54:
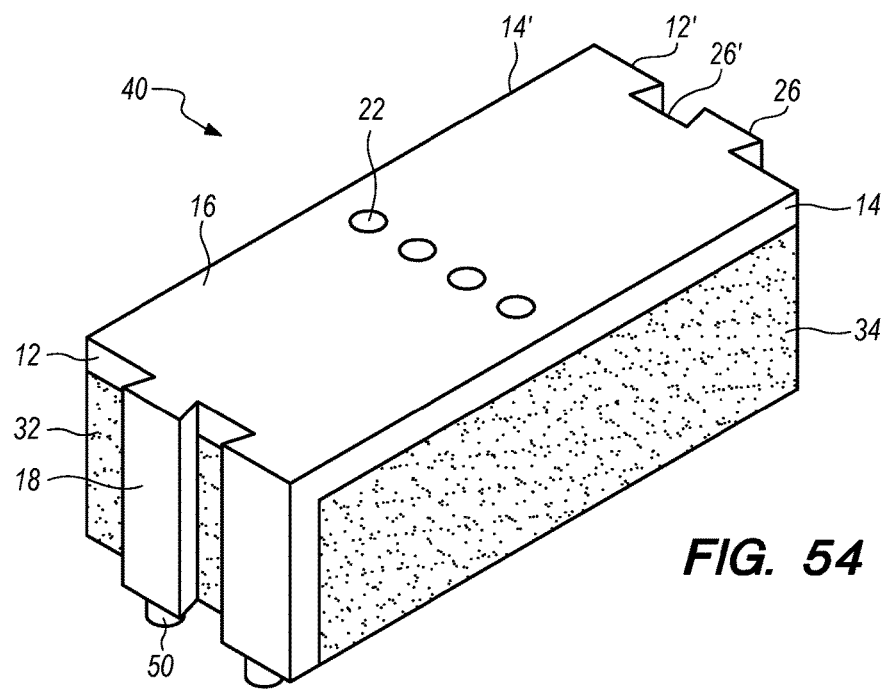
FIG. 54 illustrates a perspective view of a BIM (block interlocking module).

FIG. 54 illustrates a perspective view of a BIM ready unit 40. The BIM ready unit 40 includes a BIM 20 affixed to a block 30. In this illustration the block is a brick 30. The block 30 includes end face 32 and side face 34.

Figure 55:
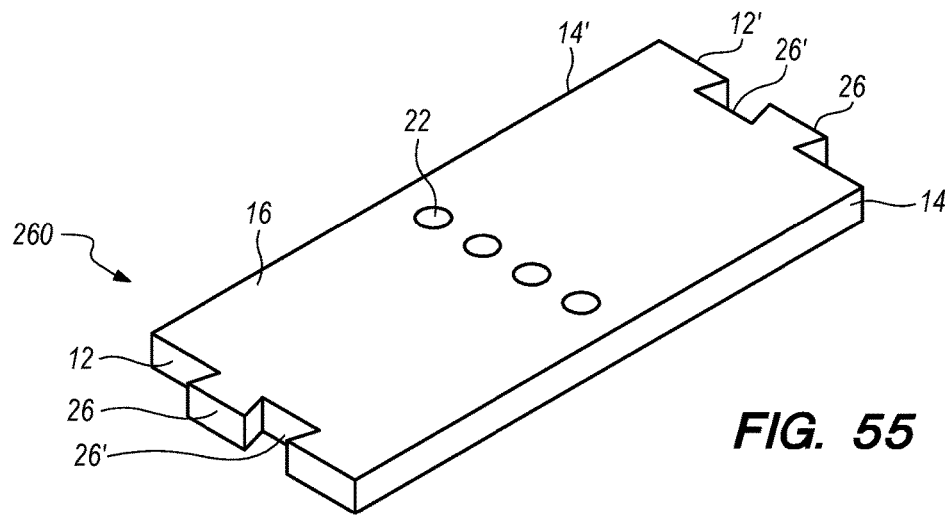
FIG. 55 illustrates a perspective projection of a layout arc-BIM.

FIG. 55 illustrates a perspective projection of a Layout arc-BIM 260. The Layout-arc BIM 260 includes end faces 12, 12', side faces 14, 14' and an upper face 16 and a lower face 16' (not shown).

The Layout arc-BIM 260 as shown further includes four aligned apertures 22 positioned generally in the center of the upper face 16, along a width of the center of the upper face 16. The Layout arc-BIM 260 further includes trapezoidal extensions 26 and trapezoidal joints extending from end faces 12, 12'.

Figure 56:
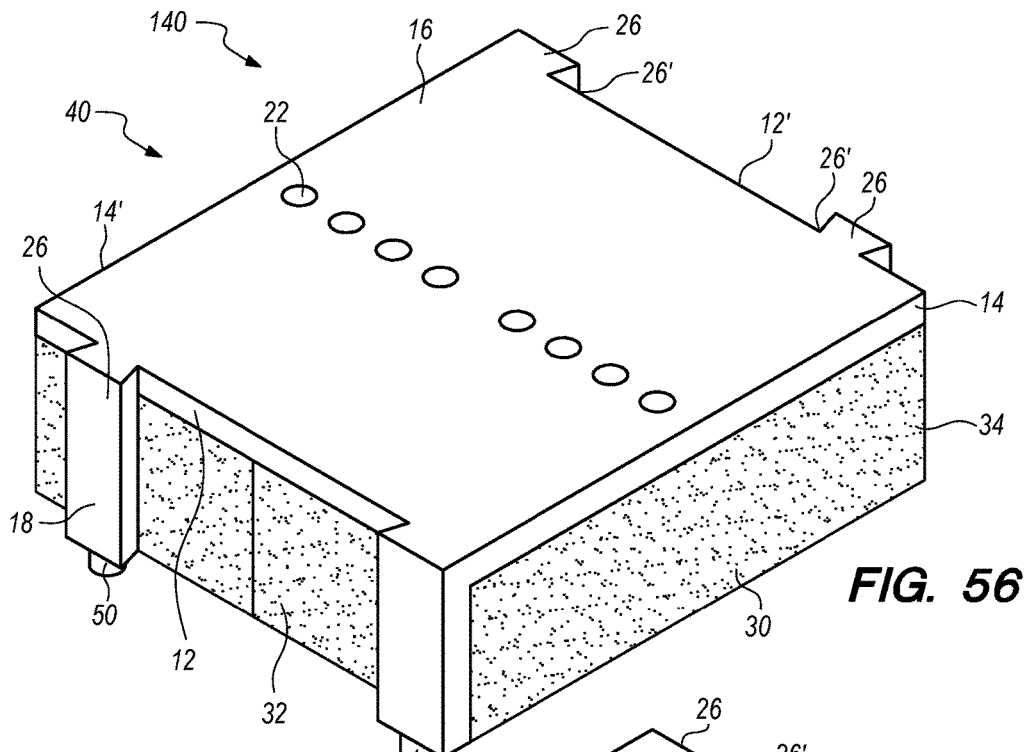
FIG. 56 illustrates a perspective view of a Lintel-BIM.
Figure 57:
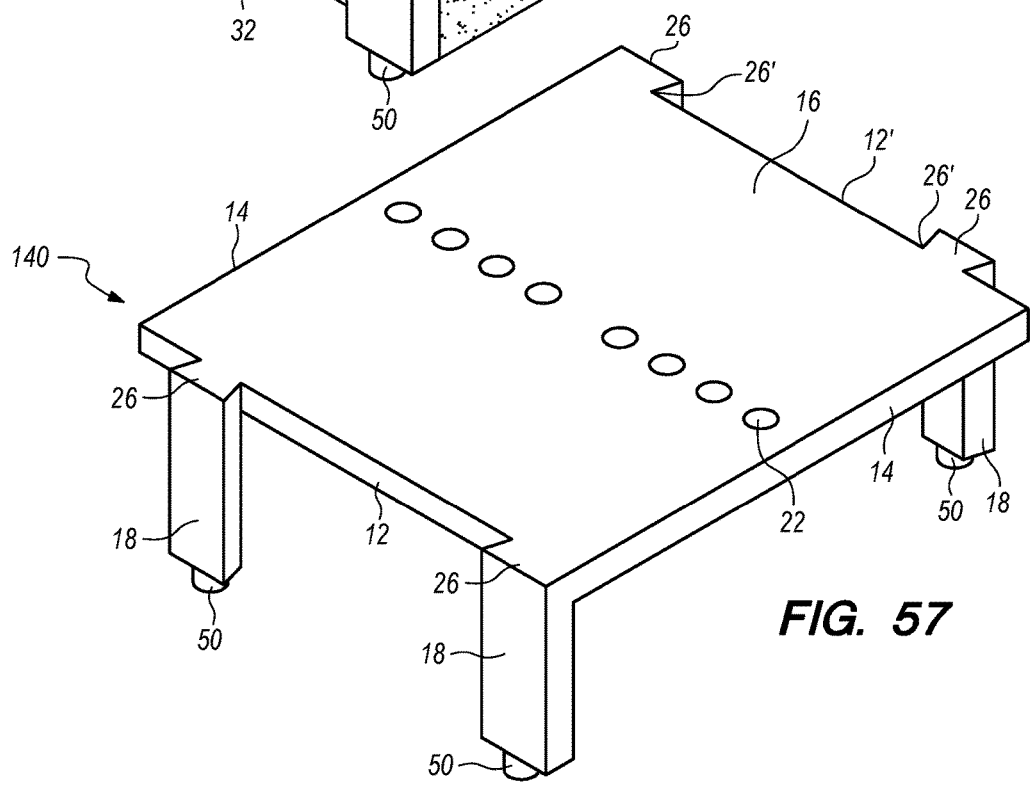
FIG. 57 illustrates a perspective view of a Lintel BIM.

FIGS. 56-57 illustrate a perspective view of the Lintel BIM 140 and the Lintel-BIM 140 affixed to block 30 to form a BIM ready unit 40.

Figure 58:
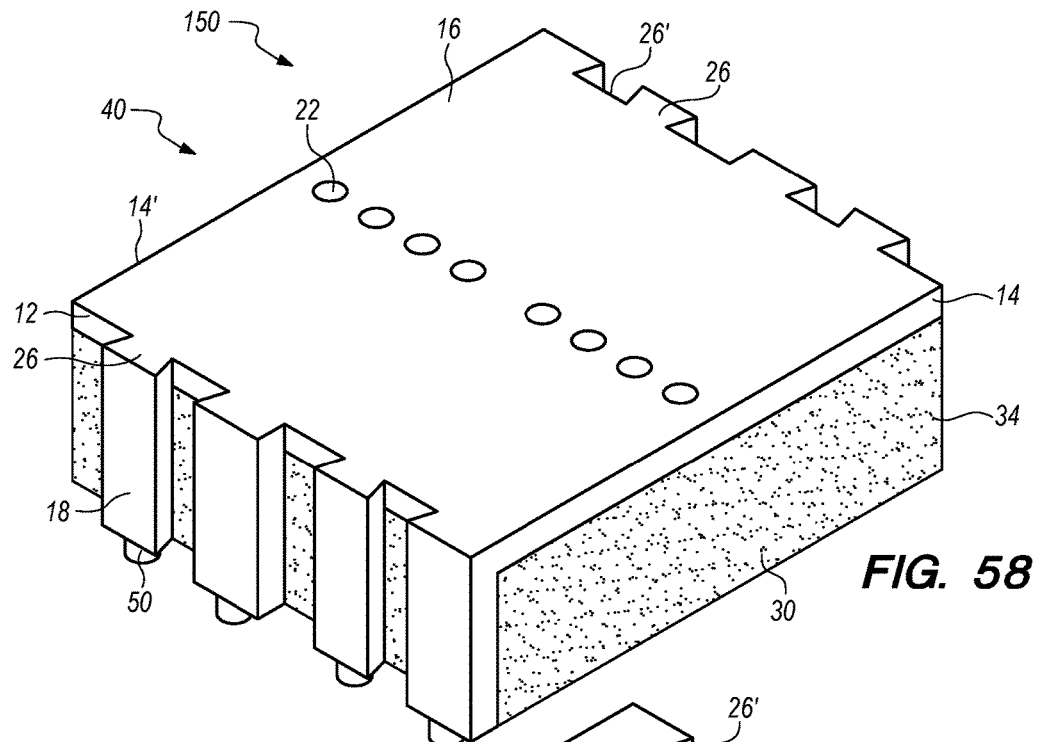
FIG. 58 illustrates a perspective view of a Lintel end-BIM.
Figure 59:
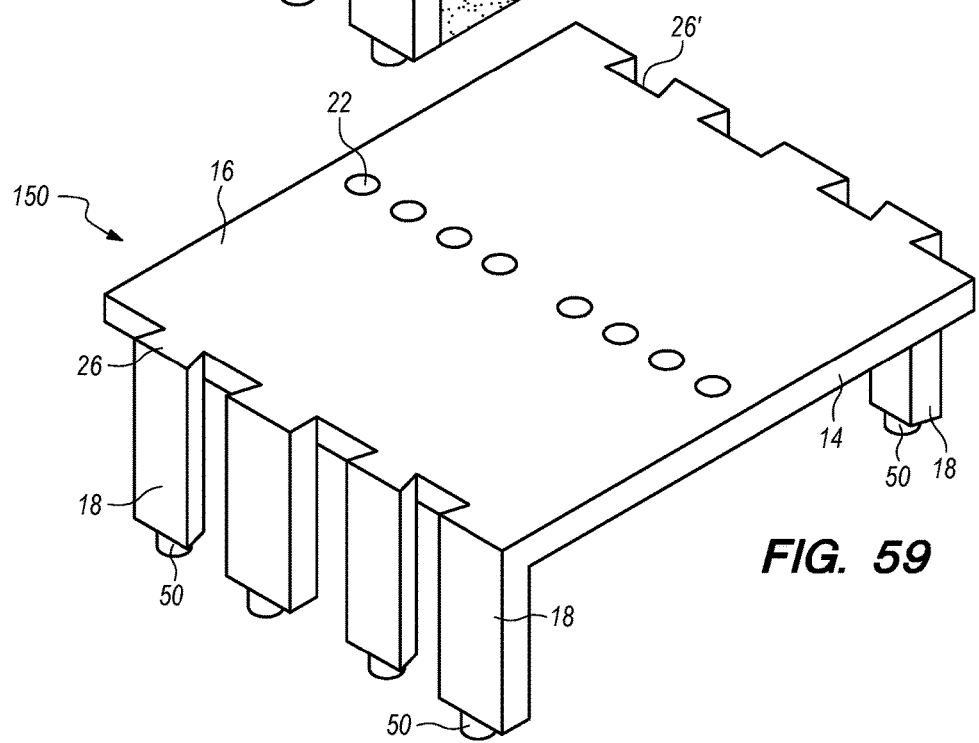
FIG. 59 illustrates a perspective view of a Lintel end-BIM.

FIGS. 58-59 illustrate a perspective view of the Lintel end-BIM 150 and the Lintel end-BIM 150 affixed to block 30 to form a BIM ready unit 40.

FIG. 60 illustrates a perspective view of a Single Wythe arc shaped wall 800 formed using a plurality of interlocking Layout arc-BIMs 260 and interlocking arc-BIMs 170.

Thus, while there has been shown and described, fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements and/or method steps which perform substantially the same function, in substantially the same way, to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore to be limited only as indicated by the scope of the claims appended hereto.

What is claimed is:

1. A first layout base module comprising:
   a first end face and a second end face, wherein the second end face is positioned opposite to and at a distance from the first end face, a first side face a second side face, wherein the second side face is positioned opposite to and at a distance from the first side face, and an upper face and a lower face;
   one or more trapezoidal elongations extending from any of the first end face, the second end face, the first side face, the second side face, the upper face or lower face, wherein the one or more trapezoidal elongations each include a dovetail joint, wherein each dovetail joint further includes a dovetail tail and a dovetail socket, and wherein the dovetail joints of the first layout base module interlock with trapezoidal elongations of a second layout base module;
   the upper face includes a plurality of apertures, wherein each of the plurality of apertures is configured for receiving a pin from a leg member of an interlocking module positioned above the first layout base module, and wherein the plurality of apertures are vertically aligned in a direction along a width of the upper face of the first layout base module; and
   the upper face of the first layout base module spans a portion of a bottom face of a building block, wherein the building block is positioned between the plurality of apertures of the first layout base module and a plurality of apertures of the second layout base module.

2. The layout base module of claim 1, wherein the first layout base module interlocks with the second layout base module adjacent to the first layout base module, such that a first portion of the building block is positioned on the first layout base module and a second portion of the building block is positioned on the second layout base module, and wherein the building block is positioned between the plurality apertures of the first layout base module and the plurality of apertures of the second layout base module.

3. The layout base module of claim 1, wherein the lower face adheres to a flooring or other building surface.

4. The layout base module of claim 1, further including cut out perforations positioned on the upper face, wherein a first cut out perforation is positioned on a first side of the apertures, and a second cut out perforation is positioned on a second side of the apertures, wherein the second side is opposite to and at a distance from the first side of the apertures.

5. The layout base module of claim 1, wherein a first set of two trapezoidal elongations extend from the first end of the layout base module and a second set of two trapezoidal elongations extend from the second end of the layout base module.

6. The layout base module of claim 1, wherein a first set of two trapezoidal elongations extend from a lower section of the first side face and a second set of two trapezoidal elongations extend from the second end face, such that the layout base module is configured to resemble the letter b in lower case.

7. The layout base module of claim 1, wherein a first set of two trapezoidal elongations extend from an upper section of the first side face, such that the layout base module is configured to resemble the letter F.

8. The layout base module of claim 1, wherein a first set of two trapezoidal extensions extend from a bottom section of the first side face and a second set of two trapezoidal elongations extend from an upper section of the first side face, such that the layout base module is configured to resemble the letter C.

9. The layout base module of claim 1, wherein a first set of two trapezoidal elongations extend from the first end face, such that the layout base module is configured to resemble the letter i in lower case.

10. The layout base module of claim 1, wherein a first set of two trapezoidal elongations extend from the first end face and the second set of two trapezoidal elongations extend from a bottom section of the second side face, such that the layout base module is configured to resemble the letter j in lower case.

11. The layout base module of claim 1, wherein a first set of two trapezoidal elongations extend from a lower section of the first side face and a second set of two trapezoidal elongations extend from the first end face, such that the layout base module is configured to resemble the letter L.

12. A first interlocking module comprising:
   a panel, the panel including a first end face and a second end face, wherein the second end face is positioned opposite to and at a distance from the first end face, a first side face a second side face, wherein the second side face is positioned opposite to and at a distance from the first side face, and an upper face and a lower face;
   one or more trapezoidal elongations extending from any of the first end face, the second end face, the first side face, the second end face, the upper face or the lower face, wherein the one or more trapezoidal elongations each include a dovetail joint, wherein each dovetail joint further includes a dovetail tail and a dovetail socket, and wherein the dovetail joints of the first interlocking module interlock with trapezoidal elongations of a second interlocking module;
   one or more leg members, wherein each of the one or more leg members emanates from each of the one or more trapezoidal elongations, and wherein each of the one or more leg members emanates in a perpendicular direction relative to each of the upper and the lower faces; and
   the upper face includes a plurality of apertures, wherein each of the plurality of apertures is configured for receiving a pin from a corresponding leg member of a respective interlocking module positioned above the first interlocking module, wherein the plurality of apertures are vertically aligned in a direction along a width of the upper face of the panel; and
   wherein the panel and the one or more leg members of the first interlocking module define a void space for receiving a standard sized building block within the void space, the building block being secured to the first interlocking module by the panel and the one or more leg members, and the building block is positioned relative to the panel of the first interlocking module such that the lower face of the panel of the first interlocking module spans a top face of the building block.

13. The interlocking module of claim 12, wherein the first side face includes an opening for an electrical outlet.

14. The interlocking module of claim 12, wherein the building block is affixed to the panel such that the lower face of the panel spans the top face of the building block.

15. The interlocking module of claim 12, wherein the standard sized building block is a brick.

16. The interlocking module of claim 12, wherein a first set of two trapezoidal elongations extend from a lower section of the first side face and a second set of two trapezoidal elongations extend from the second end face, such that the first interlocking module is configured to resemble the letter b in lower case.

17. The interlocking module of claim 12, wherein a first set of two trapezoidal elongations extend from an upper section of the first side face, such that the layout module is configured to resemble the letter F.

18. The interlocking module of claim 12, wherein a first set of two trapezoidal extensions extend from a bottom section of the first side face and a second set of two trapezoidal elongations extend from an upper section of the first side face, such that the layout module is configured to resemble the letter C.

19. The interlocking module of claim 12, wherein a first set of two trapezoidal elongations extend from the first end face, such that the interlocking module is configured to resemble the letter i in lower case.

20. The interlocking module of claim 12, wherein a first set of two trapezoidal elongations extend from the first end face and the second set of two trapezoidal elongations extend from a bottom section of the second side face, such that the interlocking module is configured to resemble the letter j in lower case.

21. The interlocking module of claim 12, wherein a first set of two trapezoidal elongations extend from a lower section of the first side face and a second set of two trapezoidal elongations extend from the first end face, such that the interlocking module is configured to resemble the letter L.

22. The interlocking module of claim 12, wherein a first trapezoidal extension and a second trapezoidal extension, emanate from the first end face of the interlocking module, and a third trapezoidal extension and a fourth trapezoidal extension, emanate from the second end face of the interlocking module.

23. The interlocking module of claim 12, further including a pin positioned at an end of each leg member, wherein the end of said each leg member is positioned opposite to and at a distance from the one or more trapezoidal elongations from which said each leg member emanates.

24. The interlocking module of claim 23, wherein a first pin of a first said leg member of the first interlocking module interlocks with a first aperture of the second interlocking module.

25. The interlocking module of claim 23, wherein a first pin of a first said leg member of the first interlocking module interlocks with an aperture of a layout base module positioned below the first interlocking module.

* * * * *